(12) United States Patent
Kondoh

(10) Patent No.: US 7,734,419 B2
(45) Date of Patent: Jun. 8, 2010

(54) VEHICLE DRIVING ASSIST SYSTEM

(75) Inventor: Takayuki Kondoh, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 798 days.

(21) Appl. No.: 11/593,046

(22) Filed: Nov. 6, 2006

(65) Prior Publication Data
US 2007/0106475 A1  May 10, 2007

(30) Foreign Application Priority Data
Nov. 9, 2005 (JP) .............. 2005-325065
Aug. 30, 2006 (JP) .............. 2006-233141

(51) Int. Cl.
*G08G 1/16* (2006.01)

(52) U.S. Cl. ............ 701/301; 340/435; 340/436; 340/903

(58) Field of Classification Search ......... 701/300–302, 701/96; 340/435–436, 903, 425.5
See application file for complete search history.

(56) References Cited

U.S. PATENT DOCUMENTS

| 5,457,439 | A | 10/1995 | Kuhn |
| 6,032,097 | A * | 2/2000 | Iihoshi et al. ............ 701/96 |
| 6,906,619 | B2 * | 6/2005 | Williams et al. ......... 340/425.5 |
| 7,145,441 | B2 | 12/2006 | Knoop et al. |
| 7,609,150 | B2 * | 10/2009 | Wheatley et al. ............ 340/436 |

FOREIGN PATENT DOCUMENTS

| DE | 19826283 A1 | 12/1998 |
| DE | 19940718 C1 | 5/2001 |
| DE | 10244205 A1 | 3/2004 |
| EP | 1215072 A1 | 6/2002 |
| EP | 1491978 A1 | 12/2004 |
| EP | 1580588 A1 | 9/2005 |
| JP | 2004-58919 | 2/2004 |
| WO | WO-2005084992 A1 | 9/2005 |
| WO | WO-2005084993 A1 | 9/2005 |

\* cited by examiner

*Primary Examiner*—Yonel Beaulieu
(74) *Attorney, Agent, or Firm*—Global IP Counselors, LLP

(57) ABSTRACT

A vehicle driving assist system is configured to convey a risk potential relating to a preceding obstacle to a driver using both visual information and haptic information. For example, the vehicle driving assist system executes accelerator pedal actuation reaction force control such that an actuation reaction force is generated in accordance with a risk potential that expresses a degree of convergence between the host vehicle and a preceding obstacle. In order to convey to the driver in a clear manner which preceding obstacle(s) is an obstacle targeted by the risk potential calculation and the reaction force control, the system displays a reference frame or marker at a position corresponding to the targeted obstacle (preceding vehicle). At least one of size, color, shape and brightness of the marker is set in accordance with the risk potential.

22 Claims, 34 Drawing Sheets

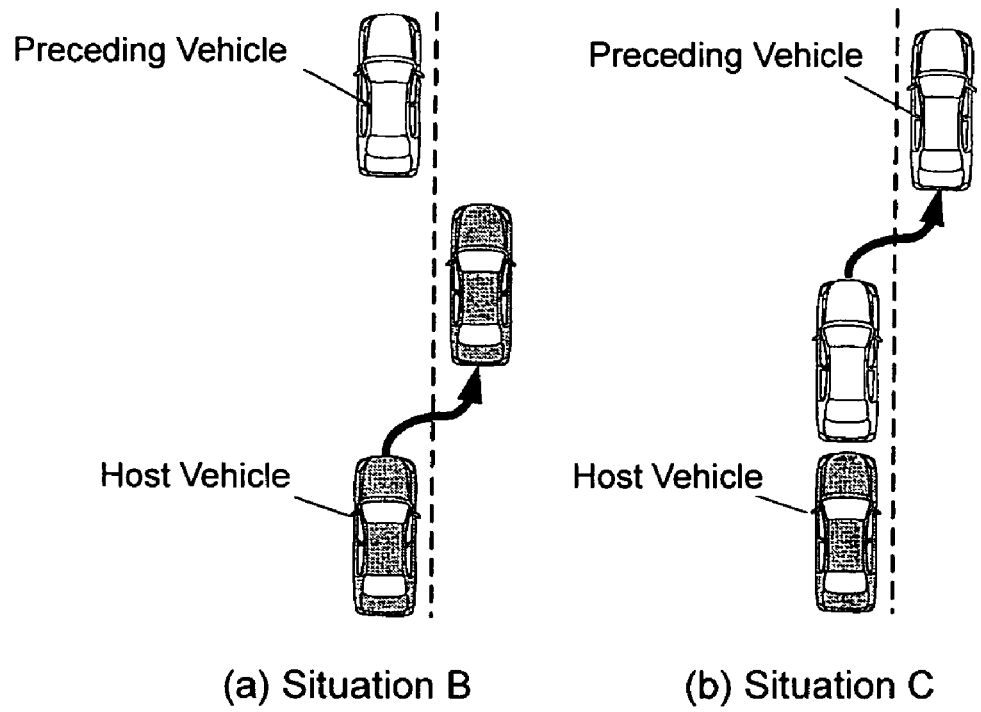
(a) Situation B  (b) Situation C
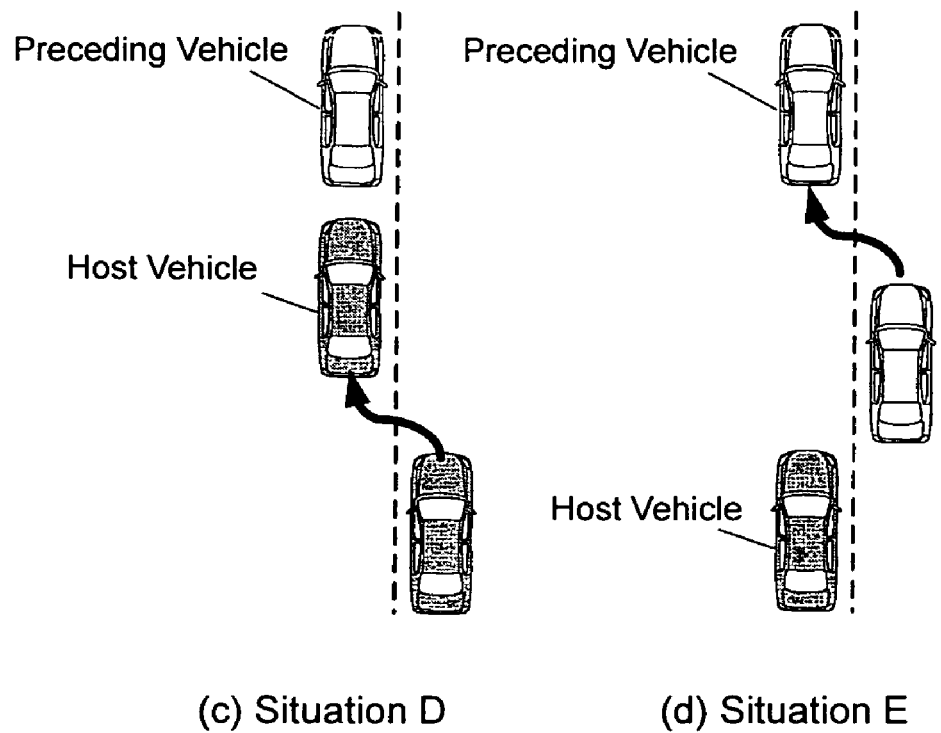
(c) Situation D  (d) Situation E
Fig. 5

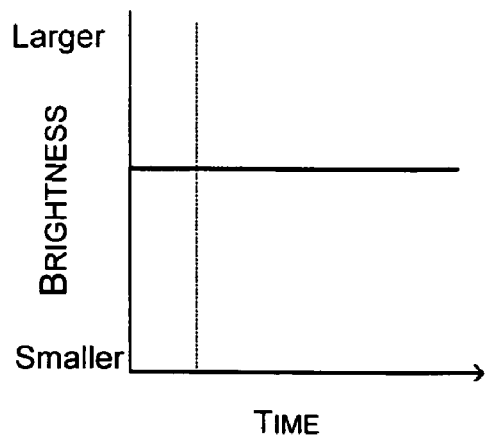
(a) Situation A (Following)
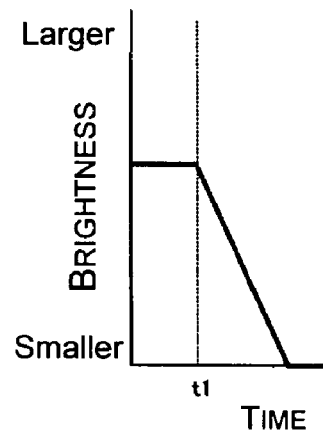
(b) Situation B
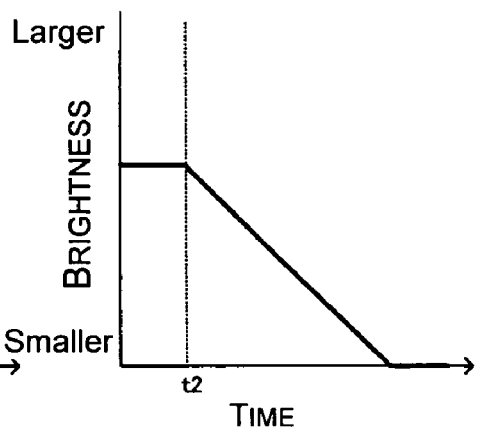
(c) Situation C
(d) Situation D
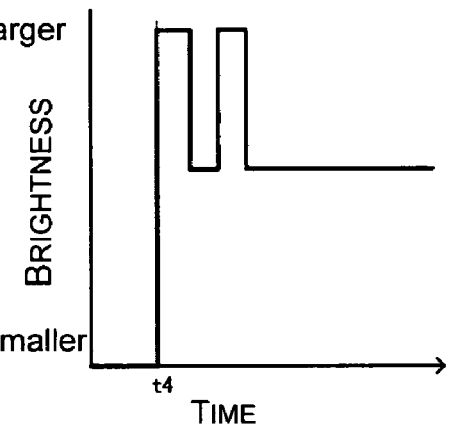
(e) Situation E
Fig. 13

| SITUATION | VEHICLE CHANGING LANES | PRECEDING VEHICLE | SYSTEM OPERATIONAL ACTION |
|---|---|---|---|
| Situation A (Following) | No | Detected | Leads driver to follow with appropriate following distance. |
| Situation B | Yes | Will stop being detected | Informs driver that preceding vehicle is no longer being detected. |
| Situation C | No | Will stop being detected | Informs driver that preceding vehicle is no longer being detected. Convey RP if new preceding vehicle is detected. |
| Situation D | Yes | Will start being detected | Informs driver that new preceding vehicle is detected. |
| Situation E | No | Will start being detected | Informs driver that new preceding vehicle is detected. Issue alarm if RP is high. |
| Situation F (No preceding vehicle | No | Not detected | -- |

Fig. 15

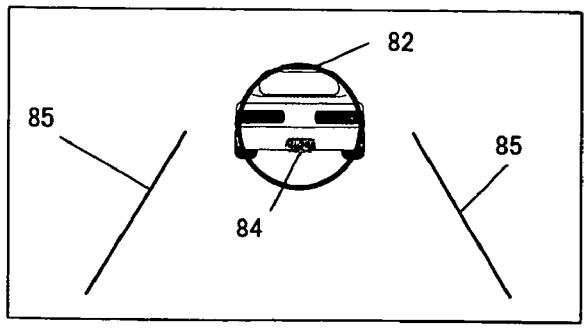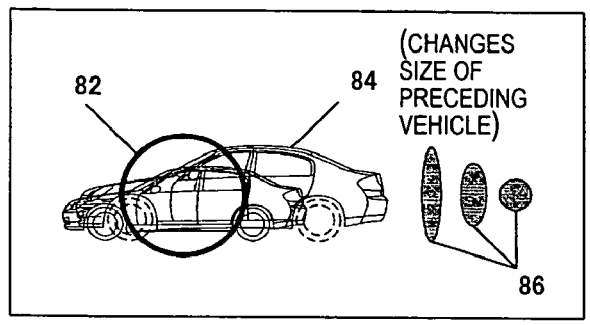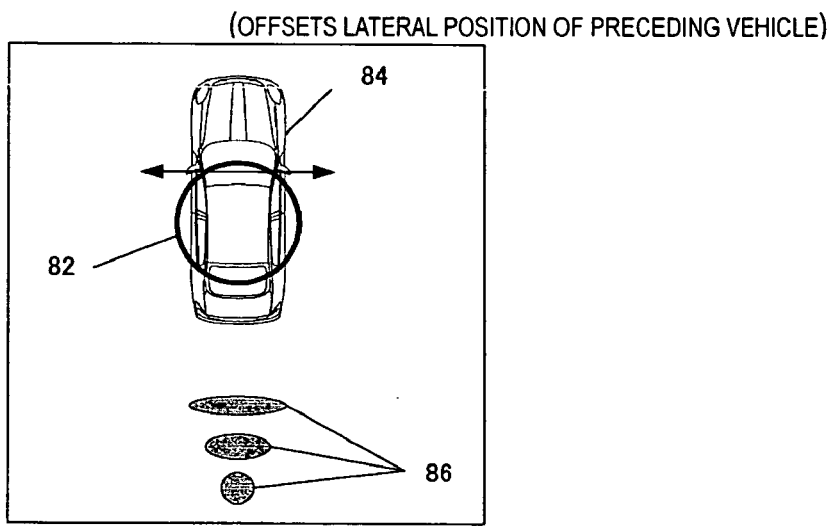
Fig. 17

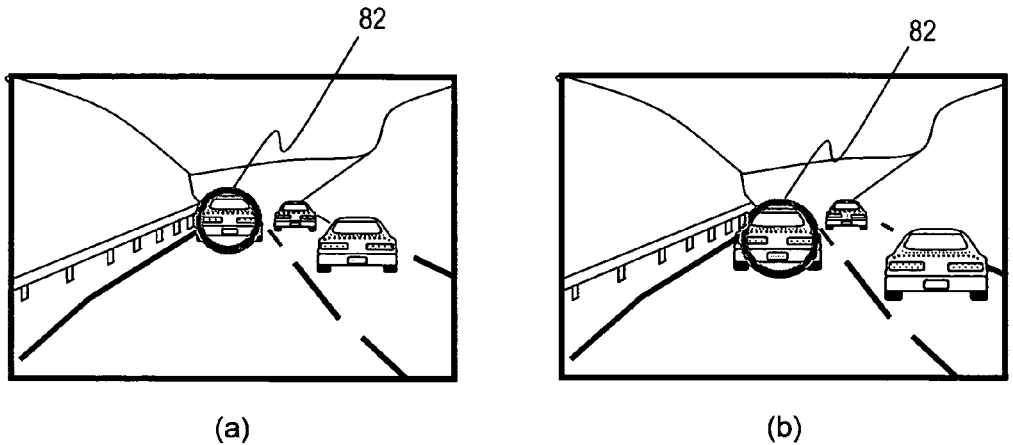
(a)            (b)
Fig. 22
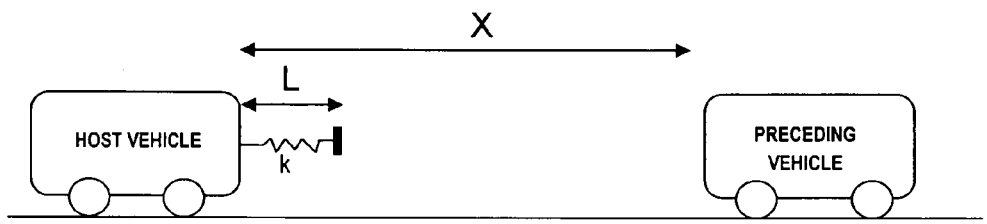
(a) CASE WHEN THE DISTANCE BETWEEN BOTH VEHICLES IS LONG
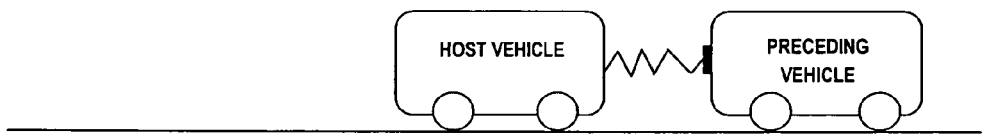
(b) CASE WHEN THE DISTANCE BETWEEN BOTH VEHICLES IS SHORT
Fig. 23

(a)          (b)          (c)

VEHICLE DRIVING ASSIST SYSTEM

CROSS-REFERENCE TO RELATED APPLICATIONS

This application claims priority to Japanese Patent Application Nos. 2005-325065, filed on Nov. 9, 2005, and 2006-233141, filed on Aug. 30, 2006. The entire disclosures of Japanese Patent Application Nos. 2005-325065 and 2006-233141 are hereby incorporated herein by reference.

BACKGROUND OF THE INVENTION

1. Field of the Invention

The present invention relates to a vehicle driving assist system configured to assist a driver with respect to the operation of a host vehicle. More specifically, the present invention relates to a vehicle driving assist system that visually conveys information to the driver about a preceding obstacle that is determined to be a potential risk to the host vehicle.

2. Background Information

Several conventional vehicle driving assist systems have been proposed for conveying information to a driver of a host about a preceding obstacle that is determined to be a potential risk to the host vehicle. One example of such a vehicle driving assist system is disclosed in Japanese Laid-Open Patent Publication No. 2004-58919. In the system of this publication, the vehicle driving assist system executes following distance control of the host vehicle and displays a preceding vehicle acquisition mark indicating the existence of a preceding vehicle (obstacle) when a preceding vehicle appears in front of the host vehicle. The preceding vehicle acquisition mark is displayed in overlapping manner.

SUMMARY OF THE INVENTION

A vehicle driving assist system provides information via the sense of touch by controlling an actuation reaction force of a driver-operated device in accordance with a risk potential calculated based on conditions related to obstacles existing in the vicinity of the host vehicle (hereinafter called the "obstacle situation"). However, a vehicle driving assist system that conveys information via the sense of touch alone does not provide the driver with visual information indicating which obstacle is being targeted by the control and how large the risk potential is for that obstacle. Therefore, there exist a need for a system that executes actuation reaction force control based on the risk potential and also conveys visual information to make the state of the actuation reaction force control more readily understandable to the driver.

In accordance with one aspect of the present invention, a vehicle driving assist system is provided that basically comprises an obstacle detecting section, a risk potential calculating section, a haptic information conveying section and a visual information conveying section. The obstacle detecting section is configured to detect a preceding obstacle existing in front of a host vehicle and selectively output an obstacle detection result. The risk potential calculating section is configured to calculate a risk potential indicative of a degree of risk potential of the host vehicle with respect to the preceding obstacle based on the obstacle detection result of the obstacle detecting section. The haptic information conveying section is configured to convey the risk potential calculated by the risk potential calculating section to a driver as haptic information through a driver-operated driving operation device. The visual information conveying section is configured to convey visual information of the preceding obstacle to the driver that is targeted as a targeted obstacle based on the risk potential calculated by the risk potential calculating section.

BRIEF DESCRIPTION OF THE DRAWINGS

Referring now to the attached drawings which form a part of this original disclosure:

FIG. 5 is a series of diagrams illustrating the specific traveling states of Situations B to E;

FIG. 13 is a series of graphs, diagrams (a) to (e), that illustrates how the brightness of the reference frame changes with time in each of Situations A to E in accordance with the first embodiment of the present invention;

FIG. 15 is a table explaining the operational actions accomplished in Situations A to F in accordance with the first embodiment of the present invention;

FIG. 17 is a series of displays, diagrams (a) to (c), that illustrates examples of displayed images depicting a preceding vehicle as seen from behind, from a side, and from above in accordance with the second embodiment of the present invention;

FIG. 22 is a pair of displays, diagrams (a) and (b), illustrating examples of what is displayed in accordance with the fourth embodiment of the present invention;

FIG. 23 is a pair of diagrams (a) and (b) illustrating the concept of the risk potential of the host vehicle in which the driving assist system is installed in accordance with the fourth embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
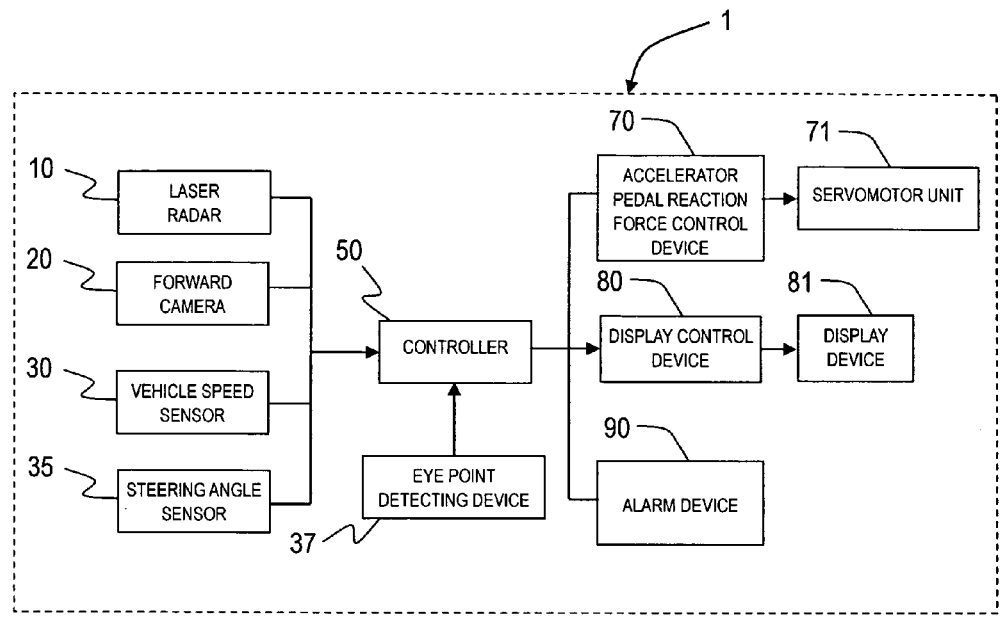
FIG. 1 is a system diagram of a vehicle driving assist system in accordance with a first embodiment of the present invention.
Figure 2:
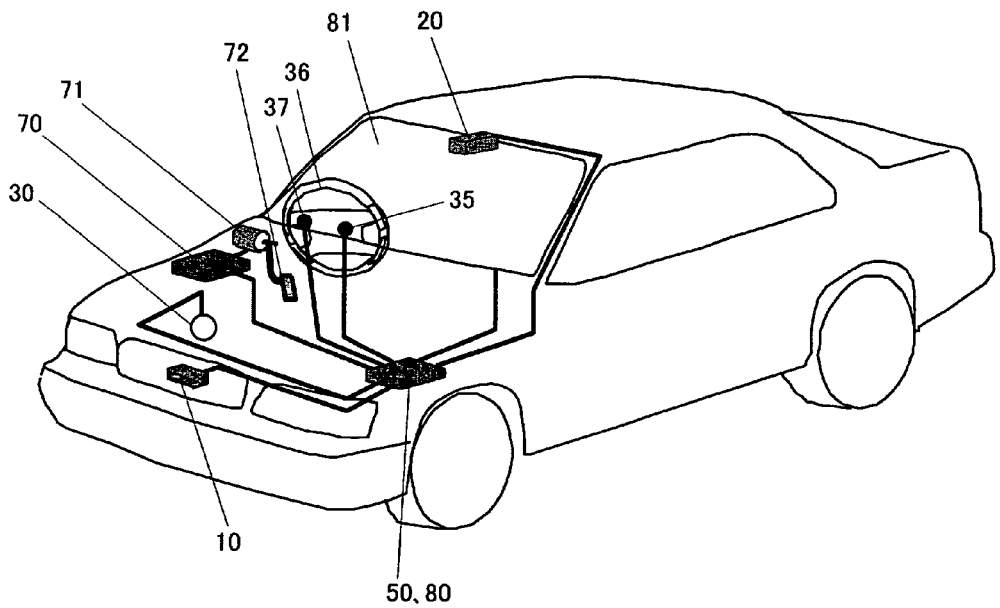
FIG. 2 is a diagrammatic view of a vehicle in which the vehicle driving assist system shown in FIG. 1 is installed.

Referring initially to FIGS. 1 and 2, a vehicle driving assist system 1 is illustrated that is installed on a host vehicle (FIG. 2) in accordance with a first embodiment of the present invention. In particular, FIG. 1 is a system diagram showing the constituent features of a vehicle driving assist system 1 in accordance with a first embodiment of the present invention, while FIG. 2 is a diagrammatic view of a vehicle having the host vehicle driving assist system installed therein. The main features of the vehicle driving assist system 1 will now be explained. The vehicle driving assist system 1 is equipped with a laser radar 10, a forward camera 20, a vehicle speed sensor 30, a steering angle sensor 35 for detecting a steering angle of a steering wheel 36, an eye point detecting device 37, a controller 50, a driving force control device 60, an accelerator pedal reaction force control device 70, a servomotor unit 71 built into a linkage mechanism of an accelerator pedal 72, a display control device 80, a display device 81 and an alarm device 90.

The laser radar 10 is a radar device that is preferably mounted to a front grill portion, a bumper portion, or the like of the host vehicle and serves to horizontally scan a region in front of the host vehicle with infrared laser light pulses in order to detect obstacles in front of the vehicle. The laser radar 10 then measures the reflected light resulting from the infrared light reflecting off of a plurality of objects located in front of the host vehicle (normally, the rear ends of preceding vehicles). By measuring the time required for the reflected light to arrive, the laser radar 10 detects a following distance, which is known as a time to headway THW, and relative velocity with respect to a preceding vehicle(s). The detected following distances and relative velocities are sent to the controller 50. The region in front of the host vehicle scanned by the laser radar 10 is, for example, ±6 degrees with respect to the front of the host vehicle and the system detects preceding objects existing within this angular range.

The forward camera 20 includes, for example, a small CCD camera or CMOS camera mounted on an upper portion of the front windshield serves to capture an image of the circumstances of a region of road in front of the host vehicle and send the image to the controller 50. The forward camera 20 constitutes a forward imaging section or device of the system 1. The detection region of the forward camera 20 is a region within ±30 degrees horizontally with respect to the longitudinal centerline of the host vehicle. The forward camera 20 captures an image of the forward road situation within this detection region The vehicle speed sensor 30 detects the speed of the host vehicle in which the system 1 is installed by measuring the rotational speed of the wheels or the rotational speed of the output side of the transmission and outputs the detected vehicle speed to the controller 50. The steering angle sensor 35 is an angle sensor installed in the vicinity of the steering wheel 36 or the steering column (not shown in figures). The steering angle sensor 35 detects the steering angle in terms of the rotation of the steering shaft and sends the detected steering angle to the controller 50.

The eye point detecting device 37 is provided to photograph the face of a seated driver in order to calculate the height from the ground surface to the driver's eyes (hereinafter called "eye point height"). The eye point detecting device 37 includes, for example, a small camera, e.g., an infrared camera, installed in the vicinity of the steering wheel 36. The controller 50 calculates the eye point height of the driver based on a signal from the eye point detecting device 37. The eye point detecting device 37 can also detect the longitudinal position of the driver's seat, the position of the seatbelt adjuster, and the retraction amount of the seatbelt and use the detected values to estimate the weight and height (physique) of the driver. The eye point height can then be calculated based on the estimated physique of the driver.

The controller 50 comprises a CPU and a ROM, a RAM, and other components peripheral to the CPU and serves to control the entire vehicle driving assist system 1. The controller 50 is configured to recognize the traveling situation of the host vehicle based on the distance information received from the laser radar 10, the information obtained from the forward camera 20 capturing a region in front of the host vehicle, the host vehicle speed obtained from the vehicle speed sensor 30, the steering angle from steering angle sensor 35, and the information from the eye point detecting device 37. Thus, the controller 50 recognizes the obstacle situation in the vicinity of the host vehicle, e.g., recognizes the traveling situation with respect to the obstacles in terms of relative distances and relative velocities of the host vehicle with respect to the preceding obstacles. The controller 50 recognizes the obstacle situation in front of the host vehicle by executing a prescribed image processing with respect to the image captured by the forward camera 20. Based on these traveling circumstances (the obstacle situation), the controller 50 calculates a risk potential that is a physical quantity indicating the degree of convergence between the host vehicle and the preceding obstacle (or "risk potentials" when there are two or more obstacles).

Based on the risk potential(s) with respect to the preceding obstacle(s), the controller 50 controls an actuation reaction force exerted by a driver-operated driving operation device operated by the driver in order to drive the host vehicle. In this embodiment, the driver-operated driving operation device is the accelerator pedal 72. Additionally, the status of the actuation reaction force control executed based on the risk potential is conveyed to the driver as visual information and display control is executed so as to encourage the driver to adjust his or her operation of the driving operation device (e.g., the accelerator pedal 72) in an appropriate direction. The control executed by the controller 50 will now be described in detail.

Based on a command from the controller 50, the accelerator pedal reaction force control device 70 controls the torque generated by the servomotor unit 71 built into a linkage mechanism of the accelerator pedal 72. The servomotor unit 71 controls the reaction force generated based on a command value from the accelerator pedal reaction force control device 70 and can freely control the actuation reaction force (depression force) generated when the driver operates the accelerator pedal 72. The normal reaction force characteristic that exists when actuation reaction force control is not being executed is, for example, the spring force of a coil spring and is set such that the actuation reaction force increases proportionally to the increase in the depression amount of the accelerator pedal 72.

In response to a command from the controller 50, the display control device 80 generates an image to be displayed on the display device 81. The display device 81 is preferably a head up display (HUD) that is configured to use the entire front windshield as an image projection surface. The display device 81 displays the image in accordance with a signal from the display control device 80 and is designed to convey information regarding the risk potential, etc., to the driver while the driver is looking forward. Since the obstacle targeted by the risk potential calculation can be conveyed as visual information in addition to conveying the risk potential as haptic information, the driver can be informed visually regarding which obstacle is being targeted by the haptic information conveyed via the driver-operated driving operation device.

The alarm device 90 equipped with a speaker is configured to emit an alarm sound or other audio information in response to a command from the controller 50 in order to alert, notify and/or inform the driver of a risk potential of a preceding obstacle.

Figure 3:
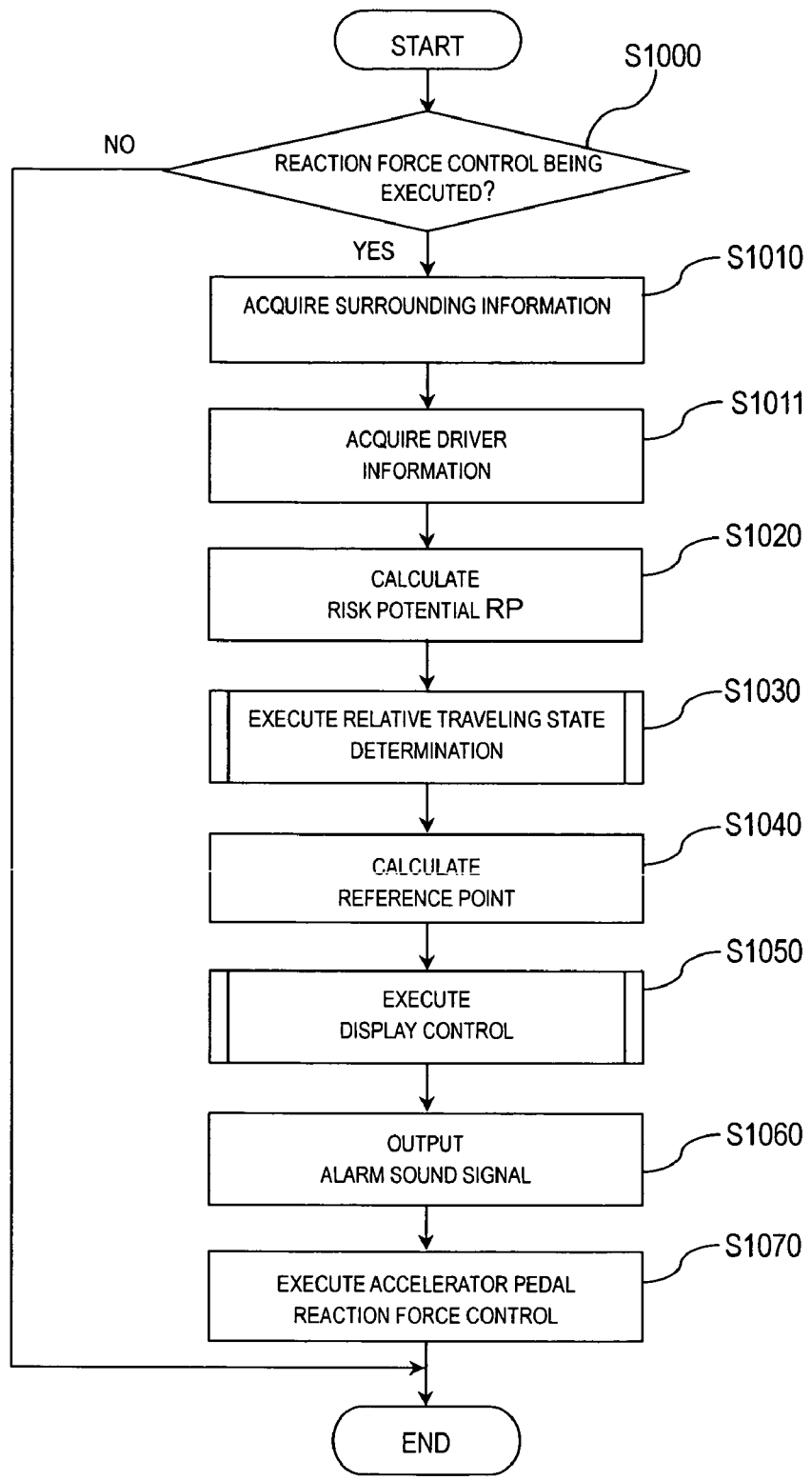
FIG. 3 is a flowchart showing the processing steps executed by a driving assistance control program in accordance with the first embodiment of the present invention.

The operation of the vehicle driving assist system 1 in accordance with the first embodiment of the present invention will now be explained in more detail with reference to FIG. 3. FIG. 3 is a flowchart showing the processing steps of a driving assistance control program executed by the controller 50. This control loop is executed continuously once per prescribed time period, e.g., every 50 msec.

In step S1000, the controller 50 determines if actuation reaction force control is currently being executed based on the risk potential. More specifically, the controller 50 determines if the laser radar 10 has detected an obstacle in front of the host vehicle, making it possible to execute actuation reaction force control based on the risk potential RP. If the result of step S1000 is positive, then the controller 50 proceeds to step S1010. If the result of step S1000 is negative, then the controller 50 ends the control loop.

In step S1010, the controller 50 reads traveling or surrounding information regarding the surroundings of the host vehicle. The surrounding information mentioned here constitutes information related to the traveling circumstances of the host vehicle, including information regarding obstacles in front of the host vehicle. Thus, the controller 50 reads in the following distance D between the host vehicle and the preceding obstacle detected by the laser radar 10, the relative velocity Vr with respect to the preceding obstacle, and the existence direction θ1 from the host vehicle to the preceding obstacle. The controller 50 also reads the traveling speed V of the host vehicle detected by the vehicle speed sensor 30 and the steering angle S detected by the steering angle sensor 35.

In step S1011, the controller 50 acquires driver information. More specifically, the controller 50 calculates an eye point height "he" of the driver based on a signal from the eye point detecting device 37. The controller 50 also calculates the longitudinal distance "dc" from the front end (front most portion) of the host vehicle to the driver's eyes ("eye point") and the longitudinal distance "dd" from the display device 81 to the eye point based on the seat position of the driver's seat. The longitudinal distances "dc" and "dd" can also be set to prescribed values in advance.

In step S1020, the controller 50 calculates the risk potential RP of the host vehicle with respect to the preceding obstacle. In step S1020, the controller 50 first calculates the time to collision TTC and the time to headway THW between the vehicle and the preceding obstacle.

The time to collision TTC is a physical quantity indicating the current degree of convergence of the host vehicle with respect to the preceding obstacle, which is, for example, a preceding vehicle. The time to collision TTC is a value that indicates how many seconds before the following distance D becomes zero and the host vehicle and the preceding vehicle contact each other assuming that the current traveling circumstances continue, i.e., assuming that the vehicle speed V, the preceding vehicle speed Vf, and the relative vehicle speed Vr remain constant. The relative velocity Vr equals the vehicle speed V minus the preceding vehicle speed Vf(Vr=V−Vf). The time to collision TTC is found using the Equation 1 shown below.

$$TTC=D/Vr \quad \text{(Equation 1)}$$

The smaller the time to collision TTC is, the more eminent the contact with the preceding vehicle is and the larger the degree of convergence with respect to the preceding vehicle is. For example, it is known that when approaching a preceding vehicle, most drivers start taking action to decelerate before the time to collision TTC reaches 4 seconds or less.

The time to headway THW is a physical quantity that is relevant when the vehicle is following a preceding vehicle and indicates the degree of influence changes in the speed of the preceding vehicle (which are assumed to occur in the future) will have on the time to collision TTC, i.e., the degree of influence under the assumption that the relative velocity Vr will change. The time to headway THW is found using the Equation 2 shown below.

$$THW=D/V \quad \text{(Equation 2)}$$

The time to headway THW equals the following distance D divided by the vehicle speed V and thus indicates the amount of time required for the vehicle to move from its current position to the current position of the preceding vehicle. The larger the time to headway THW is, the smaller is the amount of influence that the surroundings have on the degree of convergence. In other words, when the time to headway THW is large, any future change in the speed of the preceding vehicle will not have a large effect on the degree of convergence between the host vehicle and the preceding vehicle and, thus, the time to collision TTC will not change very much. When the vehicle is following a preceding vehicle and the vehicle speed V equals the preceding vehicle speed Vf, then the preceding vehicle speed Vf can be used in Equation 2 instead of the vehicle speed V to calculate the time to headway THW.

The risk potential RP is calculated with the Equation 3 below using the time to collision TTC and time to headway THW.

$$RP=A/THW+B/TTC \quad \text{(Equation 3)}$$

In the equation, A and B are constants serving to appropriately weight the inverse of the time to headway THW and the inverse of the time to collision TTC. The constants A and B are set in advance to appropriate values, e.g., A=1 and B=8 (A<B).

The term "risk potential" refers to the degree of risk or possibility of danger. In this embodiment, the risk potential is contrived to increase as the host vehicle and an obstacle existing in the vicinity of the vehicle draw closer together. Thus, it can be said that the risk potential is a physical quantity that expresses how close the host vehicle and the obstacle are to each other, i.e., the degree to which the host vehicle and the preceding obstacle have drawn near to each other (degree of convergence).

Figure 4:
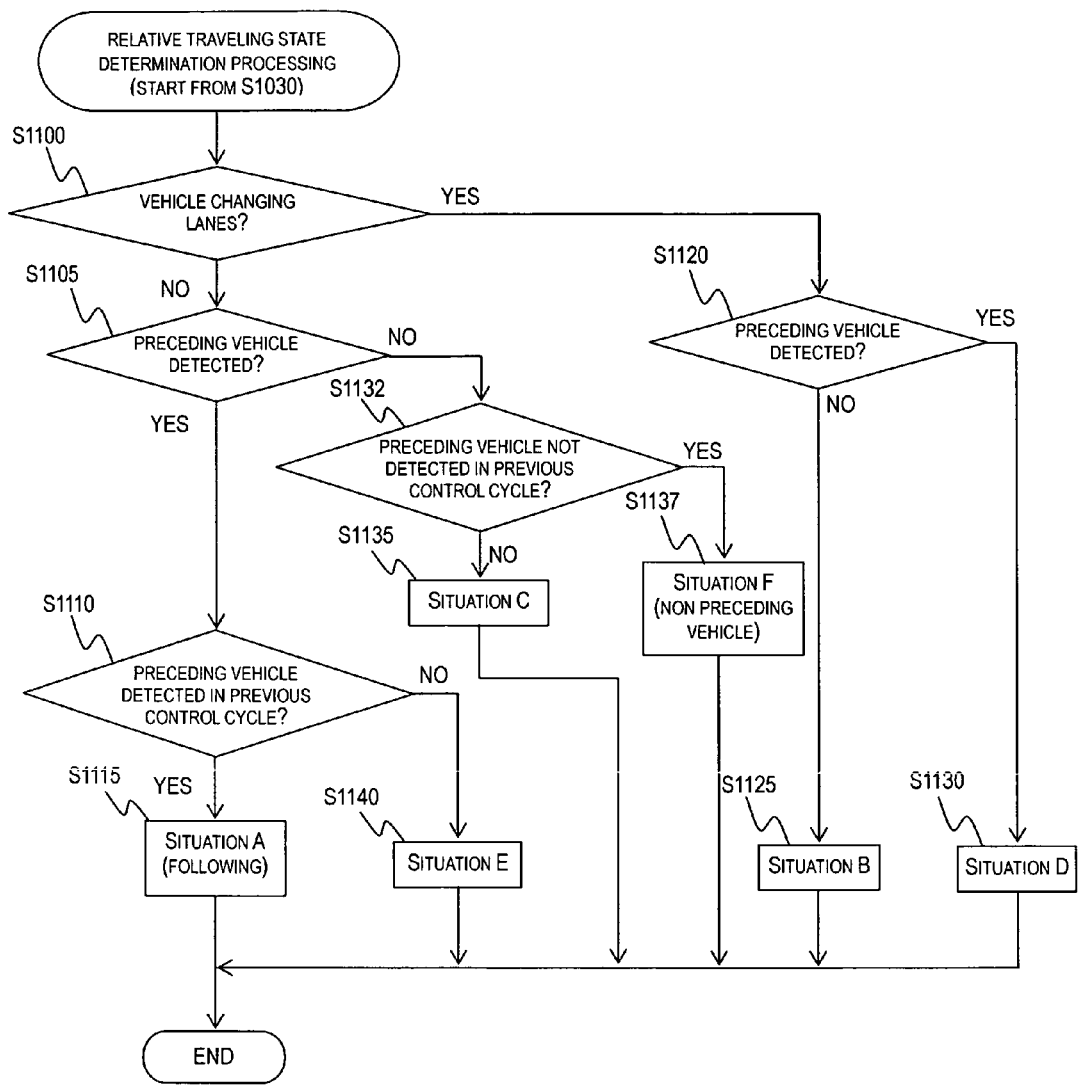
FIG. 4 is a flowchart for explaining the processing steps executed in order to determine the relative traveling state.

In step S1030, the controller 50 calculates the relative traveling state of the host vehicle with respect to the preceding obstacle. The control processing executed in order to accomplish step S1030 will now be explained with reference to the flowchart of FIG. 4.

In step S1100, the controller 50 estimates if the host vehicle is changing lanes based on the steering angle S read in step S1010. For example, it can be determined that the host vehicle is changing lanes when the detected steering angle S is larger than a standard range of steering angles beyond which the host vehicle generally does not depart when it is staying in the same lane. It is also possible to determine if the host vehicle is changing lanes based on the operation of a turn signal by the driver or an estimate of whether the driver intends to change lanes (obtained using any of various methods exist).

If it determines in step S1100 that the host vehicle is not changing lanes, then the controller 50 proceeds to step S1105 and determines if the laser radar 10 or the forward camera 20 detects an obstacle, e.g., a preceding vehicle, in front of the host vehicle. If a preceding vehicle is being detected, then the controller 50 proceeds to step S1110 and determines if a preceding vehicle was also detected in the previous control cycle. If the preceding vehicle was detected in the previous control cycle, then the controller proceeds to step S1115 and determines that the host vehicle is following a preceding vehicle ("Situation A").

If it determines in step S1100 that the vehicle is changing lanes, then the controller 50 proceeds to step S1120 and determines if a preceding vehicle is being detected. If a preceding vehicle is not detected, then the controller 50 proceeds to step S1125. In step S1125, the controller 50 determines that the preceding vehicle can no longer be detected because the host vehicle has changed lanes, as shown in diagram (a) of FIG. 5. This relative traveling state is called "Situation B." Meanwhile, if it determines in step S1120 that a preceding vehicle is detected, then the controller 50 proceeds to step S1130. In step S1130, the controller determines that a preceding vehicle came to be detected as a result of the host vehicle changing lanes, as shown in diagram (c) of FIG. 5. This relative traveling state is called "Situation D."

If it determines in step S1105 that a preceding vehicle is not detected, then the controller 50 proceeds to step S1132 and determines if a preceding vehicle was also not detected in the previous control cycle. If a preceding vehicle was detected in the preceding cycle, then the controller 50 proceeds to step S1135. In step S1135, the controller 50 determines that the preceding vehicle can no longer be detected because the preceding vehicle has changed lanes, as shown in diagram (c) of FIG. 5. This relative traveling state is called "Situation C." Meanwhile, if it determines in step S1132 that a preceding vehicle was not detected in the previous cycle, then the controller 50 proceeds to step S1137 and determines that a preceding vehicle has not been detected ("Situation F").

If it determines in step S1110 that a preceding vehicle was not detected in the previous control cycle, then the controller 50 proceeds to step S1140. In step S1140, the controller 50 determines that a preceding vehicle came to be detected because the preceding vehicle changed into the same lane as the vehicle, as shown in diagram (d) of FIG. 5. This relative traveling state is called "Situation E." Situation E includes cases in which the host vehicle approaches a preceding vehicle that was previously too far away to be detected (i.e., the preceding vehicle starts being detected not because of a lane change but because the host vehicle drew close enough to detect the preceding vehicle for the first time).

After the controller 50 determines the relative traveling state between the host vehicle and the preceding vehicle in step S1030, then the controller 50 proceeds to step S1400. In step S1040, the controller 50 calculates a reference point of the image displayed on the display device 81. Diagram (a) of FIG. 6 depicts a relationship between the host vehicle and the preceding vehicle, while diagram (b) of FIG. 6 illustrates an image of what is seen when the preceding vehicle is viewed through the display device 81 when such a relationship exists.

Figure 6:
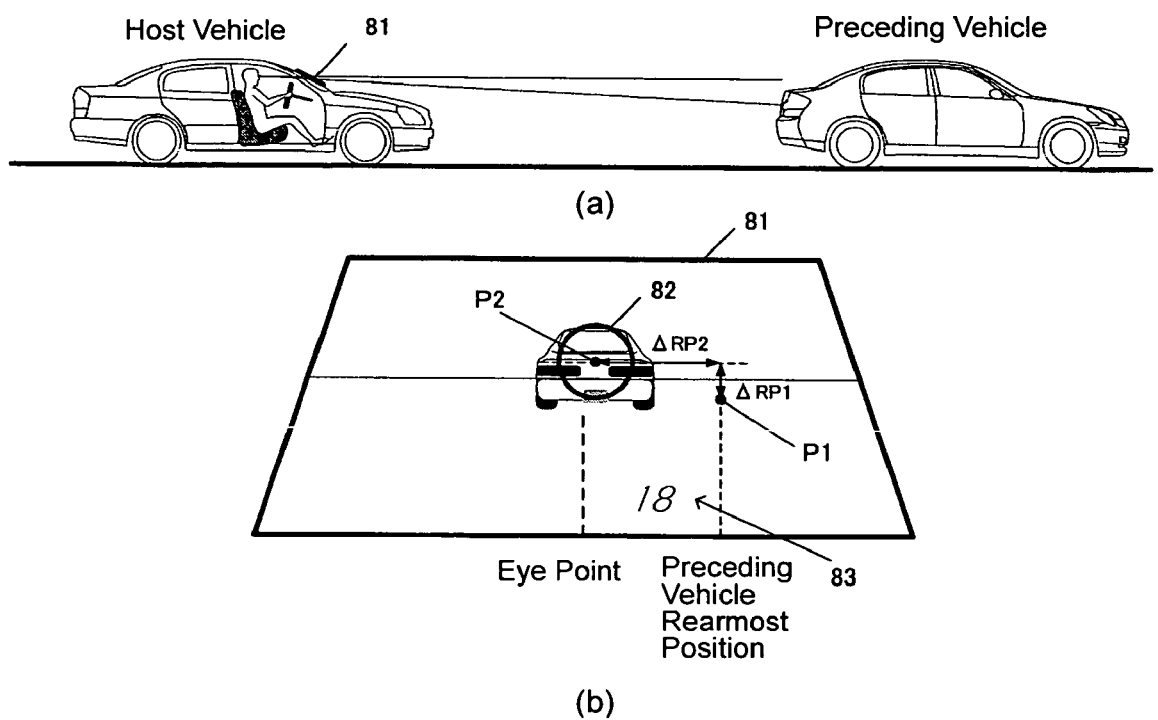
FIG. 6 is a pair of diagrams illustrating a relationship between the host vehicle and a preceding vehicle in diagram (a), and illustrating in diagram (b) how the region in front of the host vehicle appears through the head up display (HUD) when such a relationship exists.

In diagram (b) of FIG. 6, the eye point of the driver is indicated as "P1" and corresponds to a position aligned with the line of sight of the driver. The center position of the rearward most tail portion of the preceding vehicle is indicated as "P2." In this embodiment, the center position P2 of the rearward most tail portion is taken as the reference point. The eye point position P1 is set based on a driver center and the eye point height "he". A round reference frame or risk potential marker 82 is displayed on the display device 81 so as to be centered on the reference point P2. The reference frame or 82 indicates the obstacle targeted by the calculation of the risk potential RP and is displayed in such a position as to overlap the preceding vehicle when viewed by the driver. A time counter 83 is also displayed on the display device 81 and will be discussed later.

The reference position P2 is expressed in terms of a relative height (reference point height) ΔRP1 and relative lateral position (reference point lateral position) ΔRP2 with respect to the eye point position P1 on the display device 81. The method of calculating the reference point height ΔRP 1 will now be explained. Diagram (a) of FIG. 7 illustrates the relationship between the host vehicle and the preceding vehicle and diagram (b) of FIG. 7 depicts the concept of the calculation of the reference point height ΔRP1.

Figure 7:
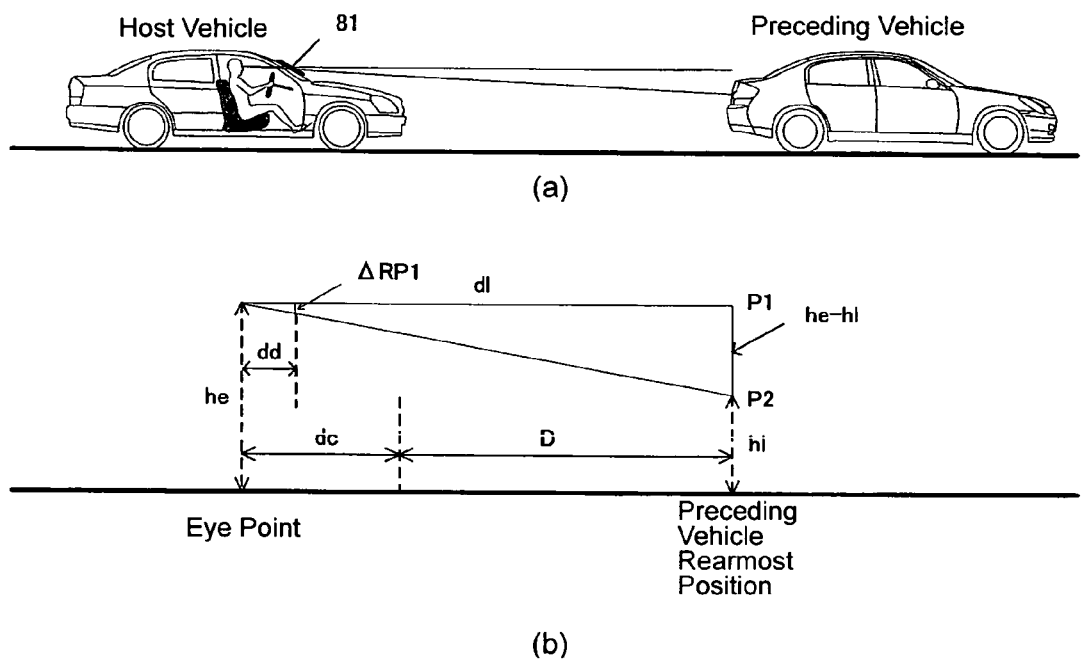
FIG. 7 illustrates the method of calculating the height of the reference point in accordance with the first embodiment of the present invention, with diagram (a) showing a side elevational view of the host vehicle and a preceding vehicle and diagram (b) showing the calculations for the relationship between the host vehicle and the preceding vehicle in diagram (a)

In diagram (b) of FIG. 7, the eye point height is indicated as "he", the distance from the eye point to the display device 81 is indicated as "dd", the distance from the eye point to the rearward most portion of the preceding vehicle is indicated as "dl", and the height of the center of the preceding vehicle is indicated as "hl". The distance "dl" from the eye point to the rearward most portion of the preceding vehicle is set to the value obtained by adding the distance "dc" from the eye point to the front most portion of the vehicle to the following distance D detected by the laser radar 10. The preceding vehicle height h1 is set to one half of the vehicle height of the preceding vehicle. The reference point height ΔRP1 on the display device 81 is calculated using the Equation 4 shown below.

$$\Delta RP1 = dd(he-hl)/dl \quad \text{(Equation 4)}$$

Figure 8:
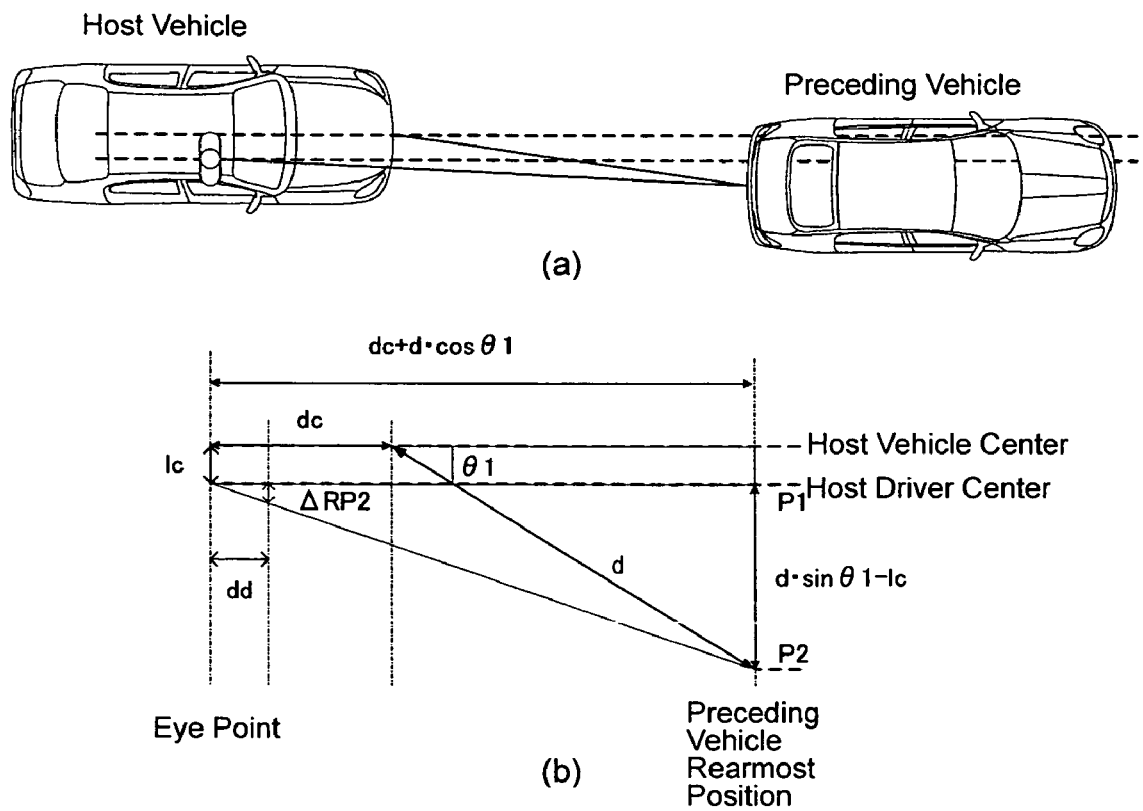
FIG. 8 illustrates the method of calculating the lateral position of the reference point in accordance with the first embodiment of the present invention, with diagram (a) showing a top plan elevational view of the host vehicle and the preceding vehicle and diagram (b) showing the calculations for the relationship between the host vehicle and the preceding vehicle in diagram (a)

Next, the method of calculating the reference point lateral position ΔRP2 will be explained. In FIG. 8, diagram (a) illustrates the relationship between the host vehicle and the preceding vehicle, while diagram (b) depicts the concept of the calculation of the reference point lateral position ΔRP2. In diagram (b) of FIG. 8, the existence direction (angle) of the preceding vehicle from the vehicle detected by the laser radar 10 is indicated as "θ1" and the distance from the longitudinal center line of the host vehicle (vehicle center) to the eye point of the driver (driver center) is indicated as "lc." The longitudinal distance from the eye point to the rearward most portion of the preceding vehicle is expressed as dc+d×cos θ1 and the distance from the eye point to the lateral center position of the preceding vehicle is expressed as d×sin θ1−lc. The reference point lateral position ΔRP2 on the display device 81 is calculated using the Equation 5 shown below.

$$\Delta RP2 = dd\{(d \times \sin \theta 1 - lc)/(d \times \cos \theta 1)\} \quad \text{(Equation 5)}$$

Figure 9:
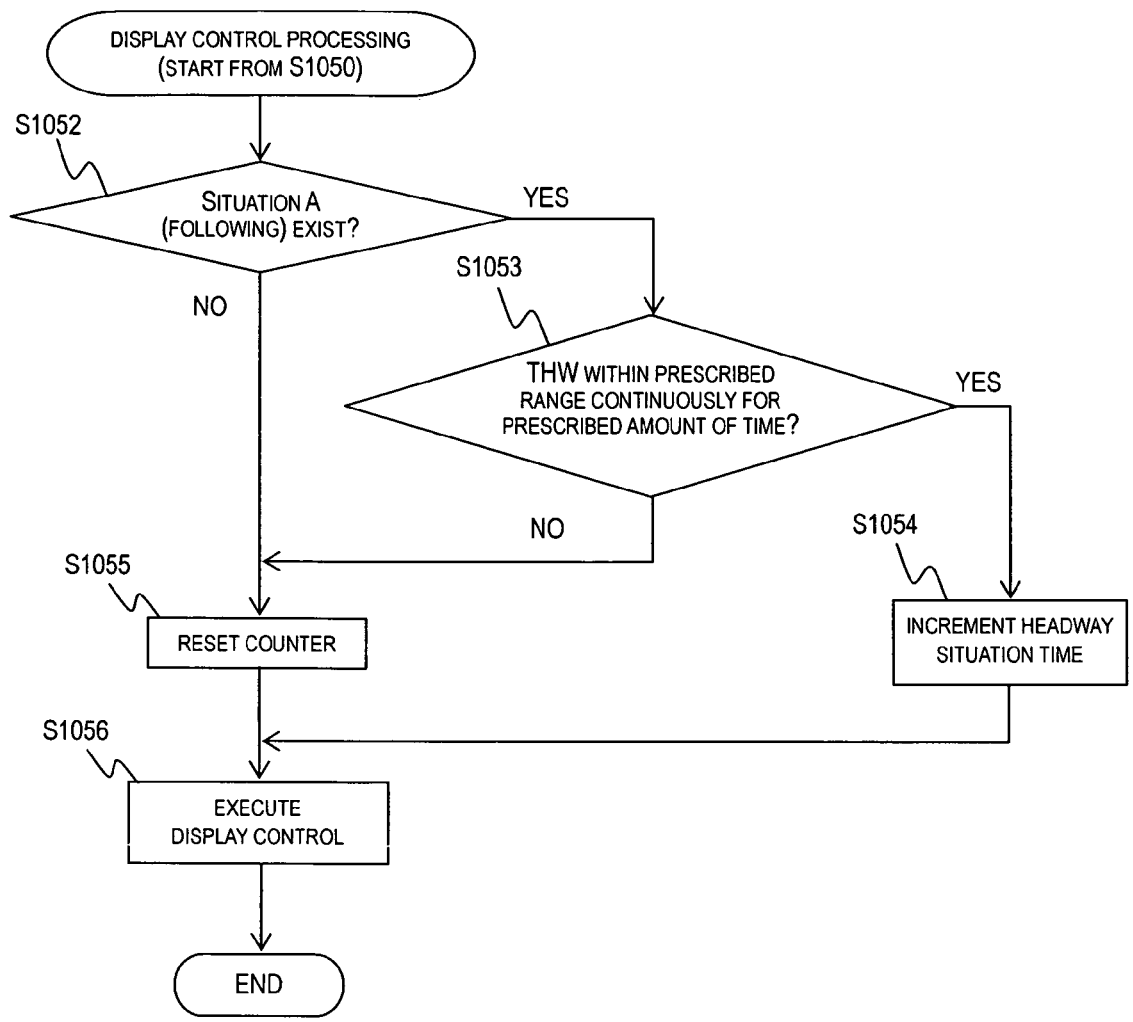
FIG. 9 is a flowchart showing the processing steps executed in order to accomplish the display control in accordance with the first embodiment of the present invention.

In step S1050, the controller 50 executes display control of the display device 81 based on the relative traveling state of the host vehicle with respect to the preceding vehicle determined in step S1030 and the reference point calculated in step S1040. The control processing executed in order to accomplish step S1050 will now be explained with reference to the flowchart of FIG. 9.

In step S1052, the controller 50 determines if the traveling situation determined in step S1030 was Situation A (following). If Situation A was determined, then the controller 50 proceeds to step S1053 and determines if the following state with respect to the preceding vehicle is stable. More specifically, the controller 50 determines if the time to headway THW calculated in step S1020 has been within a prescribed range in a continuous fashion. For example, the controller 50 might determine that the following state is stable if the time to headway THW has been within 2±0.25 seconds continuously for 5 seconds or more. If so, the controller 50 proceeds to step S1054. In step S1054, the controller 50 counts the amount of time the time to headway THW has satisfied the condition of being within the prescribed range continuously for at least the prescribed amount of time, i.e., the amount of time elapsed since the result of step S1053 first became positive (i.e., the amount of time the following situation has continued, hereinafter called "headway situation time").

If either step S1052 or step S1053 is negative, then the controller 50 proceeds to step S1055 and resets the headway situation time counter.

Figure 10:
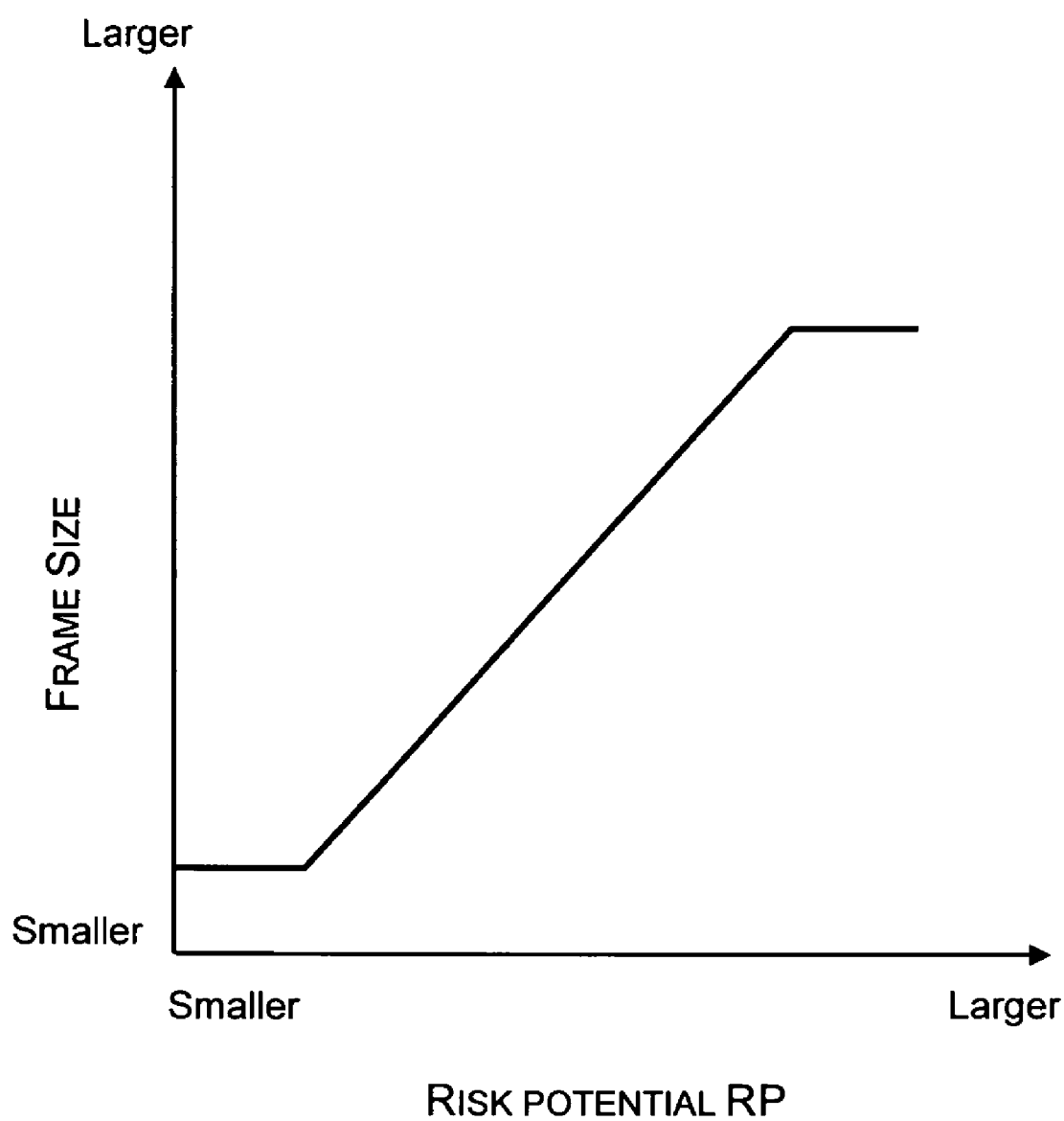
FIG. 10 is a graph that plots the reference frame size versus the risk potential in accordance with the first embodiment of the present invention.

In step S1056, the controller 50 determines a display format with which to display an image on the display device 81 based on the risk potential RP, the relative traveling state with respect to the preceding vehicle, the reference point position, etc., and executes display control processing. The risk potential marker 82 is displayed centered on the reference point P2 calculated in step S1040 so as to indicate the obstacle targeted by the calculation of the risk potential RP, i.e., targeted by the reaction force control. The degree of the risk potential marker 82 is set such that it increases as the risk potential RP increases, as indicated in FIG. 10. When the risk potential RP is equal to or above a prescribed value, e.g., 2, the risk potential marker 82 is displayed in a flashing fashion so as to alert the driver.

Figure 11:
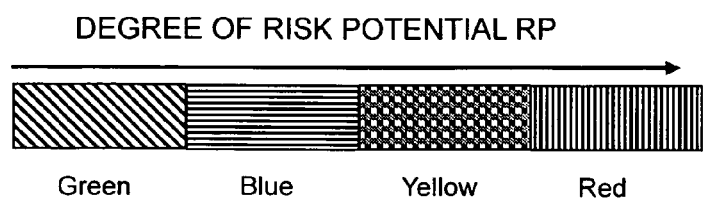
FIG. 11 is a bar graph that illustrates the relationship between the risk potential and the color of the reference frame associated with the risk potential in accordance with the first embodiment of the present invention.

In addition to the degree of the risk potential marker 82, the color of the risk potential marker 82 is also changed in accordance with the risk potential RP. More specifically, as shown in FIG. 11, the color of the risk potential marker 82 is varied gradually from green to blue, from blue to yellow, and from yellow to red as the risk potential RP increases. Although in this embodiment the color of the risk potential marker 82 is changed gradually from green to red, it is also possible to establish a plurality of predetermined ranges of risk potential RP values and assign a specific color to each range.

Figure 12:
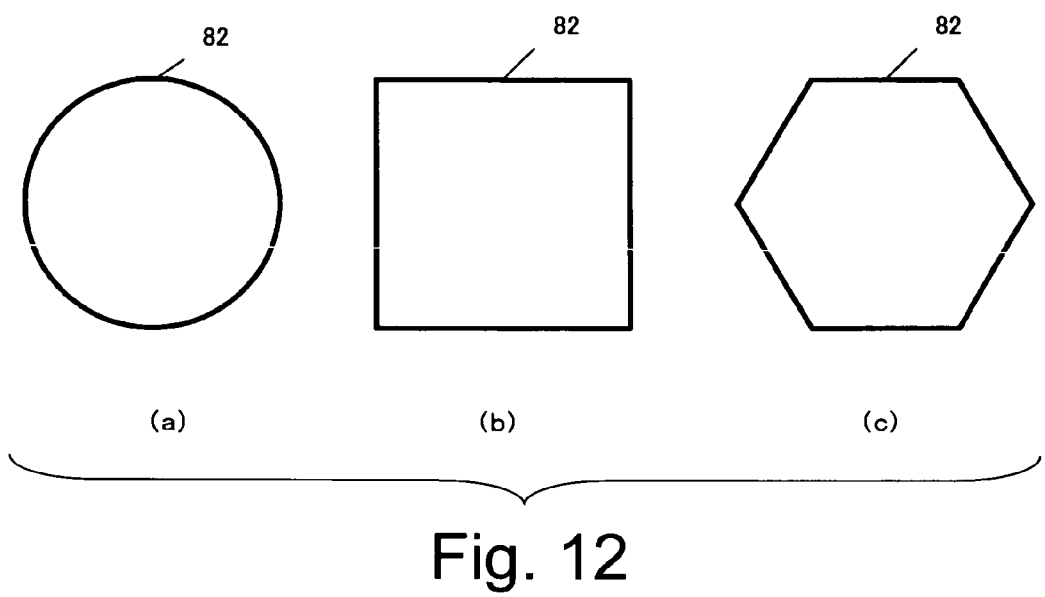
FIG. 12 illustrates three examples, diagrams (a) to (c), of reference frame shapes that can be used in accordance with the first embodiment of the present invention.

Several shapes are set in advance for the risk potential marker 82, e.g., a circular shape like that shown in diagram (a) of FIG. 12, a square shape like that shown in diagram (b) of FIG. 12, and a polygonal shape like that shown in diagram (c) of FIG. 12. Other shapes of risk potential marker 82 can also be set. The shape of the risk potential marker 82 is changed each time the preceding vehicle is replaced with a difference preceding vehicle. The line thickness of the risk potential marker 82 is set to such a thickness that the visibility in the frontward direction is not inhibited when the risk potential marker 82 is displayed on the display device 81 in such a manner that it overlaps the preceding vehicle.

The brightness of the risk potential marker 82 is set in accordance with the relative traveling state between the host vehicle and the preceding vehicle. Diagrams (a) to (e) of FIG. 13 illustrate how the brightness of the risk potential marker 82 changes with time in each of Situations A to E. When Situation A exists, i.e., when the host vehicle is following a preceding vehicle, the brightness of the risk potential marker 82 remains constant as shown in diagram (a) of FIG. 13. When Situation B occurs, the brightness is gradually decreased to zero starting from the time t1 when it is determined that Situation B exists, as shown in diagram (b) of FIG. 13. When Situation C occurs, the brightness is gradually decreased to zero starting from the time t2 when it is determined that Situation C exists, as shown in diagram (c) of FIG. 13. The rate at which the brightness changes is slower than in the case of Situation B.

When Situation D occurs, the brightness of the risk potential marker 82 is suddenly raised to the maximum brightness in a pulse-like manner at the time t3 when it is determined that Situation D exists, as shown in diagram (d) of FIG. 13. After the risk potential marker 82 is displayed at the maximum brightness for a moment, the brightness is dropped to a prescribed value and held constant. When Situation E occurs, the risk potential marker 82 is displayed at maximum brightness at the time t4 when it is determined that Situation E exists. The brightness is then dropped temporarily and raised to the maximum value again. After the risk potential marker 82 is displayed at the maximum brightness twice in a pulse-like fashion, the brightness is dropped to a prescribed value and held constant. The maximum brightness at which the risk potential marker 82 is displayed when the brightness is raised in a pulse like manner is set to an appropriate value such that the risk potential marker 82 does not inhibit the driver's ability to operate the vehicle.

In this way, the controller 50 determines the display format of the risk potential marker 82 and sends a signal to the display control device 80 such that the risk potential marker 82 is displayed on the display device 81 at the set size, color, and brightness. When the headway situation time is being counted because it has been determined that Situation A exists, i.e., that the vehicle is following a preceding vehicle, a time counter 83 indicating the headway situation time is displayed in addition to the risk potential marker 82, as shown in diagram (b) of FIG. 6. It is preferable for the time counter 83 to be displayed at the bottom of the display device 81 so as not to impede the driver's visibility in the frontward direction. When the headway situation time is not being counted, a random numerical value is displayed or the time counter 83 is turned off (not displayed).

In step S1060, the controller 50 sends a command to the alarm device 90 instructing it to emit an alarm sound. More specifically, if a preceding vehicle has been newly detected by the laser radar 10 or the forward camera 20, such as in the case of Situation D or Situation E, a notification sound (e.g., a single "ding") is emitted to inform the driver that the system has begun detecting a preceding vehicle. When the risk potential RP exceeds a prescribed value, e.g., 2, an alarm sound (e.g., a "beep-beep" sound) is emitted so as to alert the driver.

Figure 14:
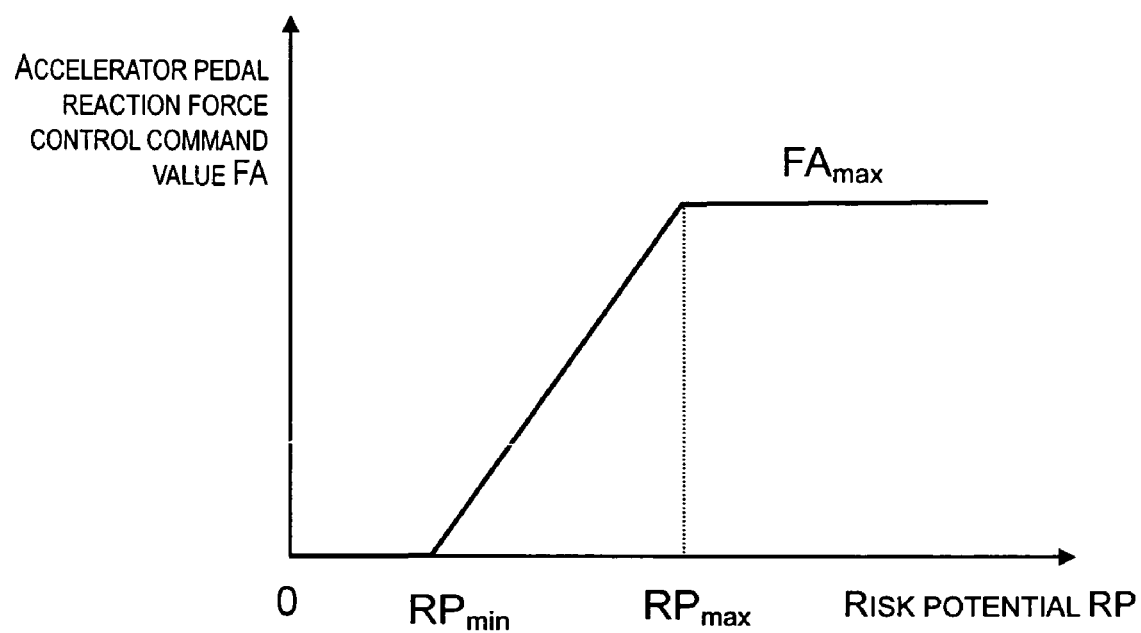
FIG. 14 is a graph that plots the accelerator pedal reaction force control command value versus the risk potential in accordance with the first embodiment of the present invention.

In step S1070, the controller 50 controls the actuation reaction force exerted by (generated in) the accelerator pedal 72 based on the risk potential RP calculated in step S1020. Using the map shown in FIG. 14, the controller 50 calculates an accelerator pedal reaction force control command value FA in accordance with the risk potential RP. As shown in FIG. 14, the accelerator pedal reaction force control command value FA is set such that it increases as the risk potential RP increases once the risk potential RP exceeds a prescribed value RPmin. When risk potential RP exceeds another prescribed value RPmax, the reaction force control command value FA is held constant at a maximum value FAmax.

The controller 50 outputs the calculated accelerator pedal reaction force control command value FA to the accelerator pedal reaction force control device 70. The accelerator pedal reaction force control device 70 controls the actuation reaction force exerted by the accelerator pedal 72 based on the command value received from the controller 50. More specifically, the accelerator pedal reaction force control device 70 causes the accelerator pedal 72 to exert a reaction force equal to the value obtained by adding the reaction force control command value FA to the normal reaction force, which is determined based on a characteristic that expresses the reaction force versus the accelerator pedal actuation amount SA. After the command values are sent, the current control loop ends.

The operational action achieved with a vehicle driving assist system 1 in accordance with the first embodiment of the present invention will now be explained. FIG. 15 summarizes the operational actions executed by the system 1 in the case of each of Situations A to F. In the case of Situation A, the vehicle is not changing lanes and is simply following the preceding vehicle. Consequently, the system 1 leads the driver to operate the accelerator pedal such that the vehicle follows the preceding vehicle while maintaining an appropriate following distance. On the display device 81, the risk potential marker 82 is displayed at a constant brightness in a position overlapping the obstacle that is targeted by the reaction force control and the time counter 83 indicates the amount of time elapsed since the vehicle entered a stable following state. The time counter 83 functions as an indicator informing the driver that the stable following state is continuing.

In the case of Situation B, the system 1 informs the driver that the preceding vehicle can no longer be detected because the vehicle has changed lanes. The risk potential marker 82 displayed over the preceding vehicle is turned off in such a fashion that it fades out gradually. In this way, the driver can be informed visually in a reliable manner that the accelerator pedal reaction force will decrease because the preceding vehicle that was targeted by the reaction force control is no longer there.

In the case of Situation C, the system 1 informs the driver that the preceding vehicle can no longer be detected because the preceding vehicle has changed lanes. Here, too, the risk potential marker 82 displayed over the preceding vehicle is turned off in such a fashion that it fades out gradually. Since the preceding vehicle can no longer be detected due to the behavior of the preceding vehicle, the risk potential marker 82 is slowly faded out. In this way, the driver can be informed visually in a reliable manner that the accelerator pedal reaction force will decrease because the preceding vehicle that was targeted by the reaction force control is no longer there. If another preceding vehicle is detected after the first preceding vehicle stops being detected, the risk potential marker 82 is displayed with a different shape and a notification sound (e.g., a single "ding") is emitted. The notification sound enables the driver to be informed aurally that a preceding vehicle has been detected.

In the case of Situation D, the system 1 informs the driver that a preceding vehicle has come to be detected as a result of the vehicle changing lanes. After the risk potential marker 82 is displayed brightly for a moment (i.e., in a pulse-like manner), it is displayed overlapping the preceding vehicle, which is targeted by a new execution of the reaction force control. A notification sound ("ding") is also emitted. As a result, the driver can be notified in a clear manner which obstacle is the obstacle with respect to which the risk potential RP is being calculated and the reaction force is being executed. Since the size and color of the risk potential marker 82 change in accordance with the risk potential RP, the driver can check the actuation reaction force exerted by the accelerator pedal 72 visually (i.e., the reaction force can be conveyed with visual information).

In the case of Situation E, the system 1 informs the driver that a new targeted preceding vehicle has been detected as a result of the preceding vehicle changing lanes or that a new preceding vehicle has begun being detected. Since the preceding vehicle comes to be detected regardless of the operation of the vehicle, the risk potential marker 82 is flashed brightly in two pulses to ensure in a reliable manner that the driver recognizes that the preceding vehicle has been detected. Then, the risk potential marker 82 is displayed overlapping the preceding vehicle, which is targeted by a new execution of the reaction force control. A notification sound ("ding") is also emitted. As a result, the driver can be notified in a clear manner which obstacle is the obstacle with respect to which the risk potential RP is being calculated and the reaction force is being executed. Since the size and color of the risk potential marker 82 change in accordance with the risk potential RP, the driver can check the actuation reaction force exerted by the accelerator pedal 72 visually (i.e., the reaction force can be conveyed with visual information).

In the case of Situation F, accelerator pedal reaction force control and display control are not executed because a preceding vehicle does not exist.

The first embodiment described heretofore can thus provide the following operational effects.

The vehicle driving assist system 1 is configured to detect an obstacle existing in front of the host vehicle in which the system 1 is installed and calculate a risk potential RP of the vehicle with respect to the obstacle based on the obstacle detection results. The system 1 conveys the calculated risk potential RP to the driver as haptic information through a driver-operated device used by the driver in order to operate the vehicle and also conveys the risk potential RP as visual information. More specifically, the system 1 conveys the obstacle that is targeted by the calculation of the risk potential RP (targeted obstacle) to the driver as visual information. Since the risk potential RP is transmitted to the driver both as haptic information and as visual information, the status of the conveyance of the haptic information through the driver-operated device can be checked visually be the driver, thereby assisting the driver in grasping the haptic information and making the control more readily understandable. By conveying the targeted obstacle visually (as visual information), the driver can be made aware of which obstacle is targeted by the actuation reaction force exerted by the driver-operated device.

The vehicle driving assist system 1 is configured to convey the haptic information by controlling the actuation reaction force exerted by the driver-operated driving operation device based on the risk potential RP. Since the risk potential RP is communicated to the driver through the actuation reaction force exerted by a driver-operated device that the driver contacts frequently in order to drive the vehicle, the risk potential RP can be communicated to the driver continuously in an intuitive manner.

The vehicle driving assist system 1 is configured to convey the degree of the risk potential RP with respect to the targeted obstacle using visual information. As a result, the degree of the risk potential RP of the vehicle can be conveyed to the driver visually in addition to being conveyed through the size of the actuation reaction force.

The vehicle driving assist system 1 is configured to overlay the targeted obstacle with a marker indicating the risk potential RP. As a result, which obstacle is the targeted obstacle can be communicated to the driver in a readily understandable manner.

The vehicle driving assist system 1 is equipped with the head up display (HUD) 81 and configured to display the risk potential marker 82 indicating the risk potential RP on the display device 81 in an overlapping manner at a position corresponding to the targeted obstacle. For example, as shown in diagram (b) of FIG. 6, the risk potential marker 82 is displayed at the position on the display device 81 corresponding to the preceding vehicle such that the risk potential marker 82 appears to overlap the preceding vehicle from the driver's point of view. In this example, the risk potential marker 82 is the marker indicating the risk potential RP. As a result, the driver can immediately and accurately recognize which obstacle is targeted by the calculation of the risk potential RP and the control of the actuation reaction force while looking forward and driving the vehicle.

The controller 50 is configured to change the shape of the marker indicating the risk potential RP when the targeted obstacle changes. For example, circular, square, and polygonal risk potential markers 82 like those shown in diagrams (a) to (c) of FIG. 12 can be prepared and the risk potential marker 82 of a different shape can be displayed each time the preceding vehicle changes due to a lane change or a preceding vehicle is newly detected. As a result, the driver can be readily recognize the change when the targeted obstacle changes.

The controller 50 is configured to change the size of the marker indicating the risk potential RP in accordance with the degree of the risk potential RP. More specifically, the degree of the risk potential marker 82 is controlled such that it increases in accordance with the risk potential RP, i.e., the larger the risk potential RP becomes, the larger the degree of the risk potential marker 82 becomes. As a result, the degree of the risk potential RP can be conveyed to the driver visually in a readily understandable manner.

The controller 50 is configured to change the color of the marker indicating the risk potential RP in accordance with the degree of the risk potential RP. More specifically, the color of the risk potential marker 82 is controlled such that it changes from green to blue to yellow to red in accordance with the degree of the risk potential RP, i.e., as the risk potential RP increases from a small value to a larger value, the color of the risk potential marker 82 changes gradually from green to red, passing through blue and yellow along the way. Since the color of the risk potential marker 82 changes in the manner of a traffic signal installed on a road, the increase in risk potential RP can be recognize intuitively by the driver.

The controller 50 is configured to flash the marker indicating the risk potential RP on and off depending on the degree of the risk potential RP. More specifically, when the risk potential RP is high (e.g., RP≧2) and the possibility that the vehicle will contact the preceding vehicle is high, the risk potential marker 82 is flashed in order to alert the driver and urge caution.

The controller 50 is configured to identify the relative traveling state existing between the vehicle and the targeted obstacle and change the brightness of the marker indicating the risk potential RP in accordance with the relative traveling state. More specifically, as shown in FIG. 15, the relative traveling states that can exist between the vehicle and a preceding vehicle are categorized into six situations and the brightness of the risk potential marker 82 is changed as shown in diagrams (a) to (e) of FIG. 13 depending on which situation exists. When Situation B or C exists and the preceding vehicle will stop being detected, the brightness is gradually decreased such that the risk potential marker 82 fades out. In this way, the driver can be informed visually that the risk potential RP that exists with respect to the current preceding vehicle will soon disappear in the future. When Situation D or E exists and a preceding vehicle will start being detected, the risk potential marker 82 is illuminated at the highest brightness momentarily in a pulse-like manner. In this way, driver can be informed visually that actuation reaction force control will be started with respect to a new obstacle.

Second Embodiment

A vehicle driving assist system in accordance with a second embodiment of the present invention will now be explained. The basic constituent features of a vehicle driving assist system in accordance with the second embodiment are the same as those of the first embodiment shown in FIGS. 1 and 2. The second embodiment will be explained chiefly by describing its differences with respect to the first embodiment.

Figure 16:
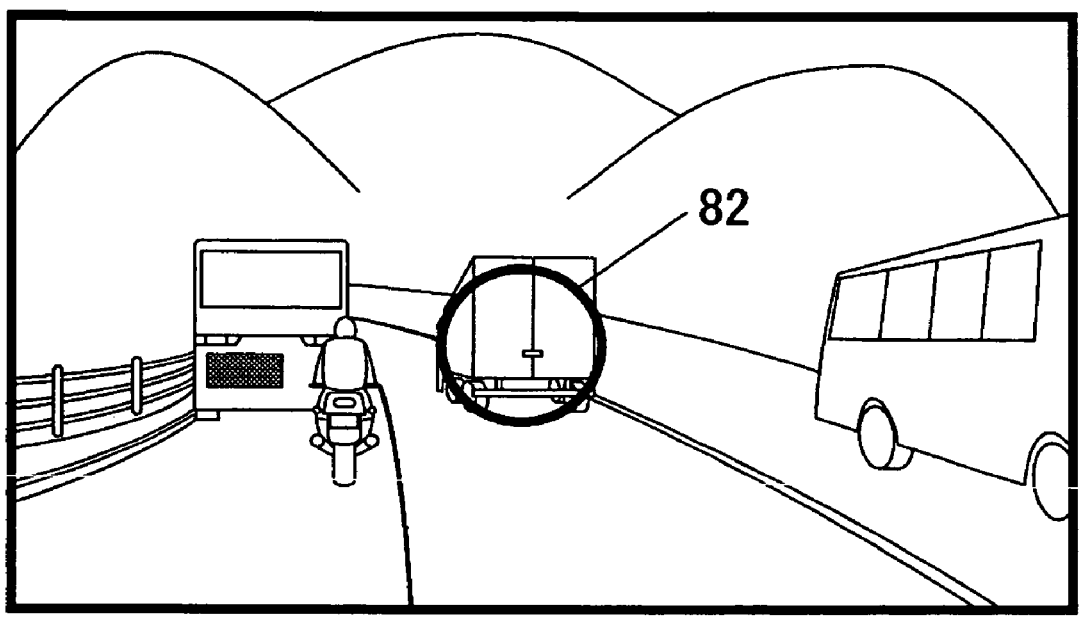
FIG. 16 is a diagram of a display that illustrates an example of what is displayed in accordance with a second embodiment of the present invention.

A vehicle driving assist system in accordance with the second embodiment uses the display monitor of a navigation system as the display device 81 instead of an HUD. When actuation reaction force control in accordance with the risk potential RP starts, an image of a region in front of the host vehicle captured by the forward camera 20 is displayed on the display monitor 81. Additionally, a risk potential marker 82 is displayed overlapping the preceding obstacle that is targeted by the calculation of the risk potential RP. FIG. 16 illustrates an example of the image displayed on the display monitor 81.

The display format of the image displayed on the display monitor 81 is determined in the same manner as in the first embodiment except that the size and position of the risk potential marker 82 are adjusted to the screen of the display monitor 81. The risk potential marker 82 can also be displayed using a method other than that explained in the first embodiment. For example, the display position can be determined and the overlapping display can be accomplished by applying a pattern recognition processing or other image processing to the image captured with the forward camera 20. More specifically, a preceding vehicle existing in the same lane as the vehicle can be recognized using pattern recognition and the reference point P2 can be set to the center position of the recognized preceding vehicle on the display monitor 81.

Furthermore, instead of the display monitor of a navigation system, it is also possible to use an LCD monitor installed inside the instrument cluster of the dashboard as the display device 81.

In addition to the operational effects exhibited by the first embodiment, the second embodiment also achieves the following additional effects.

The vehicle driving assist system 1 is equipped with a forward camera 20 configured and arranged to photograph a region in front of the host vehicle. A marker indicating the risk potential RP is displayed in a position corresponding to the targeted obstacle on the image captured by the front camera such that the marker overlaps the image of the targeted obstacle. For example, as shown in FIG. 16, the risk potential marker 82 is displayed so as to overlap a preceding vehicle existing in front of the host vehicle in the same lane. Although the image captured by the forward camera 20 in FIG. 16 includes a plurality of obstacles, the risk potential marker 82 enables the driver to readily recognize which obstacle is targeted by the calculation of the risk potential RP and the execution of the actuation reaction control.

The vehicle driving assist system 1 is configured to display an image of the region in front of the host vehicle and the marker indicating the risk potential on a monitor device 81 of a navigation system. Since the monitor device 81 of a navigation system is used as the display device, the cost of this system 1 can be curbed because it is not necessary to provide a separate display device.

Variation on Second Embodiment

In this variation, instead of displaying the image captured by the forward camera 20, an image of the obstacle targeted by the calculation of the risk potential RP is generated based on the detection results of the laser radar 10 and the forward camera 20 and the generated image is displayed on the display monitor 81. The system 1 is further configured such that plurality of images are generated showing the obstacle from different directions and the driver can select which of the images is displayed.

Diagrams (a) to (c) of FIG. 17 illustrate examples of generated images. A risk potential marker 82 indicating the target of the calculation of the risk potential RP is displayed in an overlapping manner over the image 84 of a preceding vehicle. The size, color, and shape of the risk potential marker 82 are determined in the same manner as described regarding the first embodiment. Diagram (a) of FIG. 17 is an example of a generated image showing the preceding vehicle from the rear. This image illustrates the preceding vehicle 84 as it would actually look when viewed by the driver from inside the vehicle and also includes the risk potential marker 82 and lane markers 85 demarcating the lane in which the vehicle is traveling.

Diagram (b) of FIG. 17 is an example of a generated image showing the preceding vehicle from a side. In this image, the displayed size of the preceding vehicle image 84 is changed in accordance with the relative traveling state between the host vehicle and the preceding vehicle. More specifically, the displayed size of the preceding vehicle image 84 is reduced when Situation B or C exists and the preceding vehicle will no longer be detected because the preceding vehicle is changing lanes or the like. Meanwhile, the displayed size of the preceding vehicle image 84 is enlarged when Situation D or E exists and a preceding vehicle will start being detected because the preceding vehicle is changing lanes or the like. Also, an indicator 86 is also displayed in a position located behind the preceding vehicle 84 in the image on the screen. The indicator 86 indicates the following distance D between the host vehicle and the preceding vehicle and the degree of the risk potential RP.

Diagram (c) of FIG. 17 is an example of a generated image showing the preceding vehicle from above. In this image, as indicated with the arrows, the lateral position of the displayed preceding vehicle 84 is changed in accordance with the relative traveling state between the host vehicle and the preceding vehicle. For example, if the vehicle changes lanes in the rightward direction, the preceding vehicle image 84 will shift leftward on the display screen. Similarly, if the vehicle changes lanes in the leftward direction, the preceding vehicle image 84 will shift rightward on the display screen. Also, an indicator 86 is also displayed in a position located behind the preceding vehicle 84 in the image on the screen. The indicator 86 indicates the following distance D between the host vehicle and the preceding vehicle and the degree of the risk potential RP.

The driver can change the displayed image by, for example, operating a joystick (not shown) provided in the vicinity of the display monitor 81. It is also possible to configure the system such that the driver can change the displayed image using a toggle key or button provided on the navigation system. Instead of the display monitor of a navigation system, it is also possible to use an LCD monitor installed inside the instrument cluster of the dashboard as the display device 81.

Thus, the controller 50 is configured to generate at least an image that illustrates the targeted object as viewed from the rear, from a side, or from above and display a marker indicating the risk potential in such a manner that the marker overlaps the generated image of the targeted obstacle. As a result, the relationship between the vehicle and the targeted obstacle can be displayed from a variety of angles.

Third Embodiment

A vehicle driving assist system in accordance with a third embodiment of the present invention will now be explained. The basic constituent features of a vehicle driving assist system in accordance with the third embodiment are the same as those of the first embodiment shown in FIGS. 1 and 2. The third embodiment will be explained chiefly by describing its differences with respect to the first embodiment.

Figure 18:
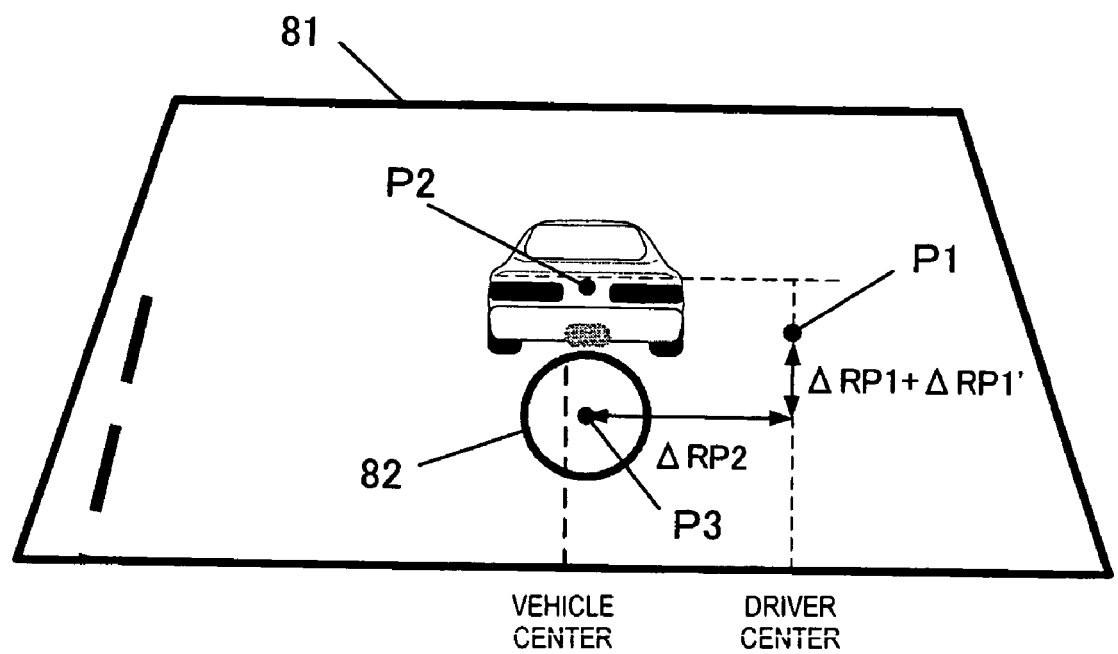
FIG. 18 is a diagram of a display that illustrates how the region in front of the host vehicle appears through the head up display (HUD) in accordance with a third embodiment of the present invention.

In the third embodiment, the display position of the risk potential marker 82 displayed on the display device 81 is changed in accordance with the degree of convergence between the host vehicle and the preceding vehicle. More specifically, when the host vehicle draws closer to the preceding vehicle, position of the risk potential marker 82 is lowered so as to approach the vehicle in a virtual (imaginary) manner. Meanwhile, when the host vehicle draws farther away from the preceding vehicle, the position of the risk potential marker 82 is raised so as to move away from the host vehicle in a virtual (imaginary) manner. FIG. 18 is an image of what is seen when the preceding vehicle is viewed through the display device 81 in a case in which the vehicle is drawing close to the preceding vehicle. The position of the risk potential marker 82 has been shifted downward from the reference point P2 by an offset amount ΔRP1' in accordance with the degree of convergence.

Figure 19:
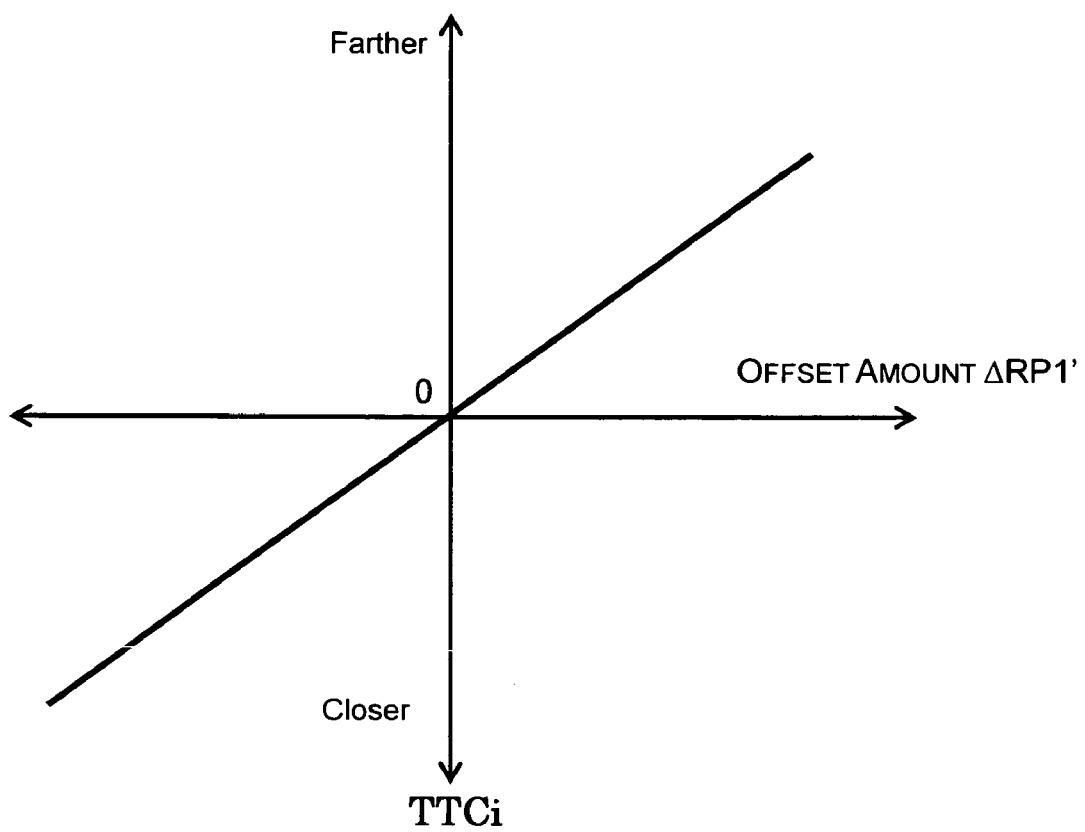
FIG. 19 is a graph that plots the degree of convergence between the host vehicle and a preceding vehicle versus the reference frame offset amount in accordance with the third embodiment of the present invention.

FIG. 19 is a plot of the inverse TTCi of the time to collision TTC versus the offset amount ΔRP1'. The closer the host vehicle and the preceding vehicle draw to each other (TTCi>0), the larger the value to which the offset amount RP1' is set becomes in the negative direction. Meanwhile, the farther apart the host vehicle and the preceding vehicle draw from each other (TTC1<0), the larger the offset amount RP1' becomes in the positive direction. The relative height of the center position P3 of the risk potential marker 82 with respect to the eye point position P1 is expressed as ΔRP1+ΔRP1'.

In addition to the operational effects exhibited by the first embodiment, the third embodiment also achieves the following additional effects.

The controller 50 is configured to calculate the degree of convergence between the vehicle and the targeted obstacle and offset (shift) the position of the marker indicating the risk potential RP in accordance with the calculated degree of convergence. The inverse TTCi of the time to collision TTC or the relative velocity Vr, for example, is used as the degree of convergence. By offsetting the display position of the marker indicating the risk potential RP, the driver can informed visually that the degree of convergence between the vehicle and the targeted obstacle is changing.

The controller 50 is configured to offset the marker indicating the risk potential RP downward relative to the targeted obstacle when the vehicle is drawing closer to the targeted obstacle and offset the marker indicating the risk potential RP upward relative to the targeted obstacle when the vehicle is drawing farther away from the targeted obstacle. When the vehicle is drawing closer to the targeted obstacle and the risk potential RP can be expected to rise in the future, the driver can be informed visually that the risk potential RP will rise in the future by offsetting the risk potential marker 82 downward such that it appears to be drawing closer to the vehicle. When the vehicle is drawing farther away from the targeted obstacle and the risk potential RP can be expected to decrease in the future, the driver can be informed visually that the risk potential RP will decrease in the future by offsetting the risk potential marker 82 upward such that it appears to be moving away from the host vehicle.

The third embodiment can also be combined with the second embodiment. In other words, the idea of offsetting the risk potential marker 82 with respect to the targeted obstacle in accordance with the degree of convergence can be applied to a system in which the risk potential marker 82 is displayed overlapping an image captured by a forward camera 20. The same idea can also be applied to a system in which the risk potential marker 82 is displayed over a generated image as shown in diagrams (a) to (c) of FIG. 17. In the case of an image in which the targeted obstacle is shown in a side view, as shown in diagram (b) of FIG. 17, the risk potential marker 82 is offset to the left and right, i.e., in the frontward and rearward directions of the vehicle, based on the degree of convergence.

In the first to third embodiments, the risk potential RP is calculated using the time to collision TTC and the time to headway THW between the host vehicle and the preceding obstacle. However, the invention is not limited to this method of calculating the risk potential RP. For example, the inverse of the time to collision TTC, the inverse of the time to headway THW, or the following distance D can be used as the risk potential RP It is also possible to assume a virtual elastic body exists on the front of the host vehicle and calculate a repelling force exerted by the virtual elastic body when it is assumed to be compressed due to contact with the preceding vehicle. The calculated repelling force can be used as the risk potential RP.

In the first embodiment, the display device 81 is configured to occupy the entire front windshield. However, the present invention is not limited to such a configuration and it is acceptable for the display device 81 to occupy only a portion of the front windshield so long as it is in a region on the driver's side that includes the lane in which the host vehicle is traveling when the driver looks forward. In the second embodiment, an image of a region in front of the host vehicle (frontward image) and a risk potential marker 82 are displayed on the monitor device 81 of a navigation system when actuation reaction force control is being executed based on the risk potential RP. It is also possible to provide a switch or the like that enables one to switch between displaying the map information of the navigation system and displaying the frontward image.

In the first to third embodiments, the size and color of the risk potential marker 82 is changed in accordance with the degree of the risk potential RP. However, it is also possible to configure the system such that only one or the other of the size and color is changed. It is also possible to leave the shape of the risk potential marker 82 constant even when the preceding vehicle is replaced with a different preceding vehicle (i.e., a different preceding vehicle moves in front of the host vehicle). Also, although the brightness of the risk potential marker 82 is changed in accordance with the relative traveling state between the host vehicle and the preceding vehicle in the preceding embodiments, it is also possible to configure the system such that the risk potential marker 82 is simply illuminated when a targeted obstacle starts being detected and turned off when a targeted obstacle stops being detected. In the case of Situations C and D, the rates at which the brightness is decreased is not limited to those described in the previous embodiment so long as the risk potential marker 82 can be turned off in a fade-out manner. Although the risk potential marker 82 is flashed in a pulse-like manner in Situations D and E in the previous embodiments, the number of times the risk potential marker 82 is flashed is not limited to the number times described in the previous embodiments.

In the first to third embodiments, the accelerator pedal reaction force control command value FA is calculated based on the risk potential RP using FIG. 14. However, the relationship between the risk potential RP and the reaction force control value FA is not limited to the relationship shown in FIG. 14. For example, it is also possible to configure the system such that the reaction force command value FA increases exponentially (in the manner of an exponential function) with respect to increases in the risk potential RP. It is also possible to arrange for an actuation reaction force based on the risk potential RP to be generated in the brake pedal, steering wheel 36, or another driver-operated device other than the accelerator pedal 72.

In the first to third embodiments, a reference point height ΔRP1 and a reference point lateral position ΔRP2 are calculated as shown in diagrams (a) and (b) of FIG. 7 diagrams (a) and (b) of FIG. 8, respectively. However, the invention is not limited to the calculation methods described in those figures and any of various other methods can also be used. Additionally, although different values (dl and dc+d cos θ1, respectively) are used for the distance from the eye point to the rearward most part of the preceding vehicle when calculating the reference point height ΔRP1 and the reference point lateral position ΔRP2 in the preceding embodiments, it is also possible to use the same value in both calculations. However, a more precise calculation of the reference point can be accomplished by using different values as described previously.

In the first to third embodiments, the laser radar 10 and forward camera 20 functions as the traveling situation detecting section of the system in these embodiments. The controller 50 functions as the risk potential calculating section, the relative traveling state determining section, and the convergence degree calculating section of the system in these embodiments. The controller 50 and the accelerator pedal reaction force control device 70 function as the haptic information conveying section and the actuation reaction force control section of the system in these embodiments. The controller 50, the display control device 80 and the display device 81 function as the visual information conveying section of the system in these embodiments. The forward camera 20 functions as the photographing or imaging section of the system in these embodiments. However, theses sections of the system in these embodiments of the present invention are not limited to using these particular devices. For example, instead of the laser radar 10, a milliwave radar of a different format can be used as the obstacle detecting section. The explanations presented above are merely examples. When interpreting the present invention, the invention should not be limited or restrained in any way by the corresponding relationships between the embodiments and the claims.

Fourth Embodiment

Figure 20:
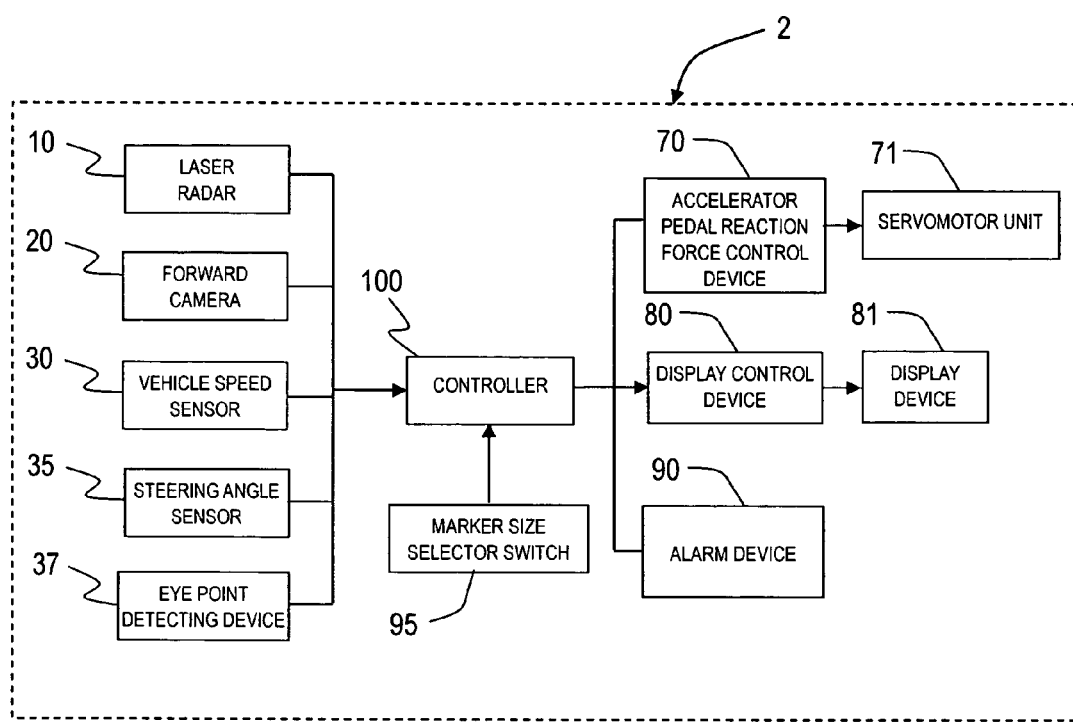
FIG. 20 is a system diagram of a vehicle driving assist system in accordance with a fourth embodiment of the present invention.

A vehicle driving assist system in accordance with a fourth embodiment of the present invention will now be explained. FIG. 20 is a system diagram showing the constituent features of a vehicle driving assist system 2 in accordance with the fourth embodiment. In FIG. 20, parts having the same functions as the parts of the first embodiment shown in FIGS. 1 and 2 are indicated with the same reference numerals. The fourth embodiment will be explained chiefly by describing its differences with respect to the first embodiment.

The vehicle driving assist system 2 is equipped with the laser radar 10, the forward camera 20, the vehicle speed sensor 30, the steering angle sensor 35, the eye point detecting device 37, the accelerator pedal reaction force control device 70, the display control device 80, and the alarm device 90 of the prior embodiment, while the controller of the prior embodiment is replaced with a controller 100 containing different programming. The system 2 is also provided with a selector switch 95 that enables the driver to select the method of determining the display size of the risk potential marker 82 (i.e., reference frame or mark). The methods of determining the degree of the risk potential marker 82 will be discussed later.

Based on the risk potential(s) with respect to the obstacle(s), the controller 100 controls an actuation reaction force exerted by a driving operation device operated by the driver in order to drive the host vehicle. The driving operation device is, for example, an accelerator pedal 72. Additionally, the status of the actuation reaction force control executed based on the risk potential is conveyed to the driver as visual information and display control is executed so as to encourage the driver to adjust his or her operation of the driving operation device in an appropriate direction. More specifically, the marker 82 is displayed on the display device 81 in such a fashion that it overlaps the obstacle targeted by the reaction force control. The size of the marker 82 is varied such that the driver's impression of the size of the marker 82 is matched to the degree of the risk potential RP.

Figure 21:
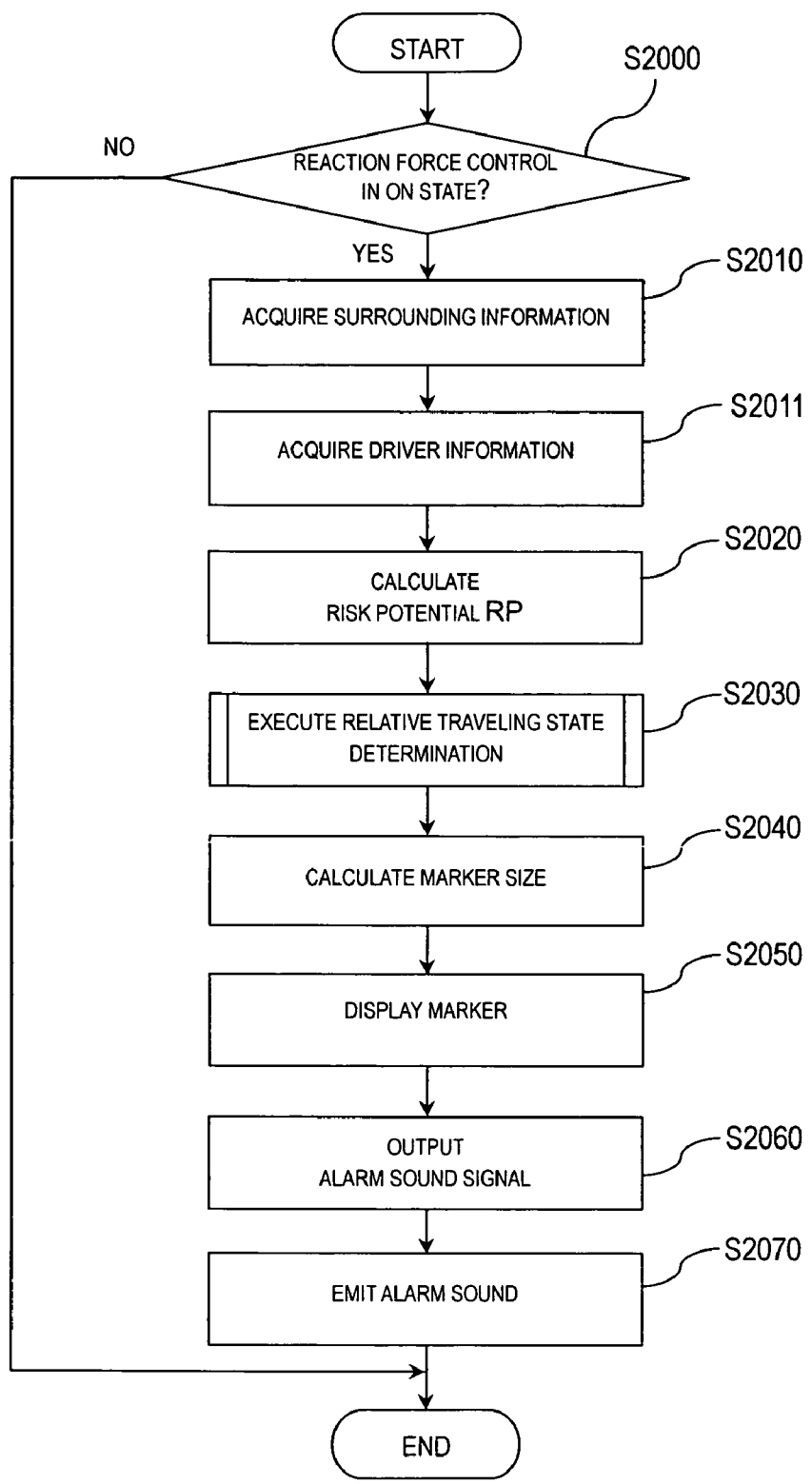
FIG. 21 is a flowchart showing the processing steps executed by a driving assistance control program in accordance with the fourth embodiment of the present invention.

The operation of a vehicle driving assist system 2 in accordance with the fourth embodiment of the present invention will now be explained in more detail with reference to FIG. 21. FIG. 21 is a flowchart showing the processing steps of a driving assistance control program executed by the controller 100. This control loop is executed continuously once per prescribed time period, e.g., every 50 msec.

In step S2000, the controller 100 determines if actuation reaction force control is currently being executed based on the risk potential. More specifically, the controller 50 determines if the laser radar 10 has detected an obstacle in front of the host vehicle, making it possible to execute actuation reaction force control based on the risk potential RP. If the result of step S2000 is positive, then the controller 100 proceeds to step S2010. If the result of step S2000 is negative, then the controller 100 ends the control loop.

In step S2010, the controller 100 reads information regarding the surroundings of the host vehicle. The surrounding information mentioned here constitutes information related to the traveling circumstances of the host vehicle, including information regarding obstacles in front of the host vehicle. Thus, the controller 100 reads in the following distance D between the host vehicle and the preceding obstacle, the relative velocity Vr with respect to the obstacle, and the existence direction θ1 from the host vehicle to the obstacle detected by the laser radar 10. The controller 100 also reads the traveling speed V of the host vehicle detected by the vehicle speed sensor 30.

In step S2011, the controller 100 acquires driver information. More specifically, the controller 100 calculates the eye point height "he" of the driver based on a signal from the eye point detecting device 37. The controller 100 also calculates the longitudinal distance "dc" from the front end (front most portion) of the host vehicle to the driver's eyes ("eye point") and the longitudinal distance "dd" from the display device 81 to the eye point based on the seat position of the driver's seat. The longitudinal distances "dc" and "dd" can also be set to prescribed values in advance.

In step S2020, the controller 100 calculates the risk potential RP of the host vehicle with respect to the preceding obstacle. The risk potential RP is calculated with the previously described Equation 3 using the time to collision TTC and time to headway THW. In step S2030, the controller 100 calculates a reference point P2 of the image displayed on the display device 81. The method of calculating the reference point P2 is the same as in step S1040 of the flowchart shown in FIG. 3 (see FIGS. 6 to 8).

In step S2040, the controller 100 calculates the size of the marker 82 based on the risk potential RP calculated in step S2020. The marker 82 is a circular frame displayed on the display device 81 such that it overlaps the obstacle targeted by the actuation reaction force control. The "size" of the marker 82 refers to the external diameter of the marker 82 displayed on the display device 81. Assuming Ms is the size of the marker 82 corresponding to a reference value RPs of the risk potential RP, the size Mc of the marker 82 corresponding to any given risk potential RP ("RP1") can be calculated with the Equation 6 shown below.

$$Mc=Ms \times (RP1/RPs) \quad \text{(Equation 6)}$$

The reference value RPs of the risk potential RP is set to, for example, approximately 0.8. The reference size Ms of the marker 82 is set to approximately 3 degrees of viewing angle from the eye point of the driver. For example, if the distance from the eye point to the display device 81 is 1 m, the reference size Ms of the marker 82 is approximately 5 cm. As a result, when the risk potential RP is larger than the reference value RPs, the size of the marker 82 is larger than the reference size Ms. Conversely, when the risk potential RP is smaller than the reference value RPs, the size of the marker 82 is smaller than the reference size Ms.

In step S2050, the controller 100 sends a signal to the display control device 80 such that the marker 82 is displayed on the display device 81 at the size set in step S2040 and centered on the reference point P2 calculated in step S2030.

In step S2060, the controller 100 sends a command to the alarm device 90 instructing it to emit an alarm sound. More specifically, if a preceding vehicle has been newly detected by the laser radar 10 or the forward camera 20, a sound, e.g., a single "ding," is emitted to inform the driver that the system has begun detecting a preceding vehicle. When the risk potential RP exceeds a prescribed value, e.g., 2, an alarm sound (e.g., a "beep-beep" sound) is emitted so as to alert the driver.

In step S2070, the controller 100 controls the actuation reaction force exerted by (generated in) the accelerator pedal 72 based on the risk potential RP calculated in step S2020. More specifically, in the same manner as step S1070 of the flowchart shown in FIG. 3, the controller 100 calculates an accelerator pedal reaction force control command value FA based on the risk potential RP using the map shown in FIG. 14 and sends the calculated accelerator pedal reaction force control command value FA to the accelerator pedal reaction force control device 70. The accelerator pedal reaction force control device 70 controls the actuation reaction force exerted by the accelerator pedal 72 based on the command value received from the controller 100. After the command values are sent, the current control loop ends.

Diagrams (a) and (b) of FIG. 22 illustrate examples of how the marker 82 looks when it is displayed. The marker 82 is displayed overlapping the obstacle (preceding vehicle) that is targeted by the reaction force control. When the vehicle is following the preceding vehicle while maintaining a substantially constant following distance and a substantially constant speed, the risk potential RP does not change and the size of the marker 82 displayed over the preceding vehicle as shown in diagram (a) of FIG. 22 does not change. If, later, the host vehicle and the preceding vehicle draw closer together and the risk potential RP increases, the size of the marker 82 will increase. As a result, displayed size of the marker 82 can be increased in accordance with the driver's sense that the risk is increasing.

The display format of the marker 82 is changed when the obstacle targeted by the reaction force control changes, such as when the vehicle or the obstacle changes lanes. For example, the driver can be made readily aware that the targeted obstacle has changed by changing the shape of the marker 82 from a circle to a rectangle, polygon, or the like.

Instead of calculating the size Mc of the marker 82 using the risk potential RP, it is also possible to calculate the size Mc of the marker 82 using the accelerator pedal reaction force control command value FA calculated based on the risk potential RP.

The fourth embodiment described heretofore can thus provide the following operational effects.

The vehicle driving assist system 2 is configured to detect an obstacle existing in front of the host vehicle in which the system 2 is installed and calculate a risk potential RP of the vehicle with respect to the obstacle based on the obstacle detection results. The system 2 conveys the calculated risk potential RP to the driver as haptic information through a driver-operated device used by the driver in order to operate the vehicle and also conveys the risk potential RP with respect to the vehicle targeted by the haptic information conveyance control as visual information. More specifically, the vehicle driving assist system 2 conveys the degree of the risk potential RP with respect to the targeted obstacle using visual information. As a result, the driver can visually check the status of the conveyance of the haptic information through the driver-operated device, thereby assisting the driver in grasping the haptic information and making the control more readily understandable. By conveying the targeted obstacle visually (as visual information), the driver can be made aware of which obstacle is targeted by the actuation reaction force exerted by the driver-operated device and how large the actuation reaction force is.

The controller 100 is configured to change the display format of the marker indicating the risk potential RP when the targeted obstacle changes. For example, the controller 100 changes the shape of the marker 82 displayed overlapping the targeted obstacle. As a result, the driver can be readily informed that the obstacle targeted by the actuation reaction force control has changed.

Variation on Fourth Embodiment

Instead of calculating the size of the marker 82 based on the risk potential RP exclusively, the system 2 can be configured such that the driver can select the desired method of calculating the size of the marker 82 from among a plurality of calculation methods.

Examples of the methods for calculating the size of the marker 82 from which the driver might select include the following: (a) calculation based on the risk potential RP; (b) calculation based on the following distance D between the host vehicle and the preceding obstacle; (c) calculation based on a projected surface area; (d) calculation in accordance with the perceived size of a projected surface area; (e) calculation based on a control repelling force; and (f) calculation in accordance with details of a deceleration control.

In this variation, the driver can select any one of the methods (a) to (f) by operating a marker size selector switch 95. The system 2 is configured such that the method (a) (calculating the size of the marker 82 based on the risk potential RP) is set as the default calculation method.

Each of the calculation methods will now be explained. The method (a) of calculating the size of the marker 82 based on the risk potential RP is omitted here because it has already been explained.

Method (b)—Calculation Based on Following Distance D

The larger the following distance D between the vehicle and an obstacle in front of the host vehicle becomes, the smaller the width and height of the obstacle appears to the driver of the vehicle. Conversely, larger the following distance D becomes, the larger the width and height of the obstacle appears. Assuming Ms is the size of the marker 82 corresponding to a reference value Ds of the following distance D, the size Mc of the marker 82 corresponding to any given following distance D ("D1") can be calculated with the Equation 7 shown below.

$$Mc = Ms \times (Ds/D1) \quad \text{(Equation 7)}$$

The reference value Ds of the following distance D is set to, for example, approximately 20 m. The reference size Ms of the marker 82 is set to approximately 3 degrees of viewing angle from the eye point of the driver. As a result, when the following distance D is larger than the reference value Ds, the size of the marker 82 is smaller than the reference size Ms. Conversely, when the following distance D is smaller than the reference value Ds, the size of the marker 82 is larger than the reference size Ms.

Method (c)—Calculation Based on Projected Surface Area

The apparent size of an obstacle seen by the driver changes in accordance with the distance between the host vehicle and the preceding obstacle. Therefore, in this calculation, the projected area of the marker 82 is set to be proportional to the square of the following distance D. Assuming Ms is the size of the marker 82 corresponding to a reference value Ds of the following distance D, the size Mc of the marker 82 corresponding to any given following distance D ("D1") can be calculated with the Equation 8 shown below.

$$Mc = Ms \times (Ds/D1)^2 \quad \text{(Equation 8)}$$

The reference value Ds of the following distance D is set to, for example, approximately 20 m. The reference size Ms of the marker 82 is set to approximately 3 degrees of viewing angle from the eye point of the driver. As a result, when the following distance D is larger than the reference value Ds and the apparent surface area of the preceding obstacle is smaller, the size of the marker 82 is smaller than the reference size Ms. Conversely, when the following distance D is smaller than the reference value Ds and the apparent surface area of the preceding obstacle is larger, the size of the marker 82 is larger than the reference size Ms.

Method (d)—Calculation in Accordance with Perceived Size of Projected Surface Area It has been reported that according to Stevens' power law, the relationship between a surface area and the perceived intensity of the surface area can be expressed as a power function having the exponent 0.7. In other words, when a viewer moves toward and away from an object, the viewer perceives the surface area (physical size) of the object to be a size value equal to the actual apparent size raised to the power of 0.7. Assuming Ms is the size of the marker 82 corresponding to a reference value Ds of the following distance D, the size Mc of the marker 82 corresponding to any given following distance D ("D1") can be calculated with the Equation 9 shown below.

$$Mc = \{Ms \times (Ds/D1)^2\}^{0.7} \quad \text{(Equation 9)}$$

The reference value Ds of the following distance D is set to, for example, approximately 20 m. The reference size Ms of the marker 82 is set to approximately 3 degrees of viewing angle from the eye point of the driver. As a result, when the following distance D is larger than the reference value Ds and the apparent perceived surface area of the preceding obstacle is smaller, the size of the marker 82 is smaller than the reference size Ms. Conversely, when the following distance D is smaller than the reference value Ds and the apparent perceived surface area of the preceding obstacle is larger, the size of the marker 82 is larger than the reference size Ms.

Method (e)—Calculation Based on Control Repelling Force

In the embodiments described heretofore, the actuation reaction force exerted by a driver-operated driving operation device is controlled based on the risk potential RP of the vehicle with respect to an obstacle. However, the present invention is not limited to controlling an actuation reaction force. It is also acceptable, for example, to control a braking/driving force acting on the vehicle based on the risk potential RP. While it is certainly feasible to execute the braking/driving force control based on a risk potential RP calculated using the aforementioned Equation 3, it is also possible to execute the braking/driving force control based on the concept described in the following paragraphs.

Figure 24:
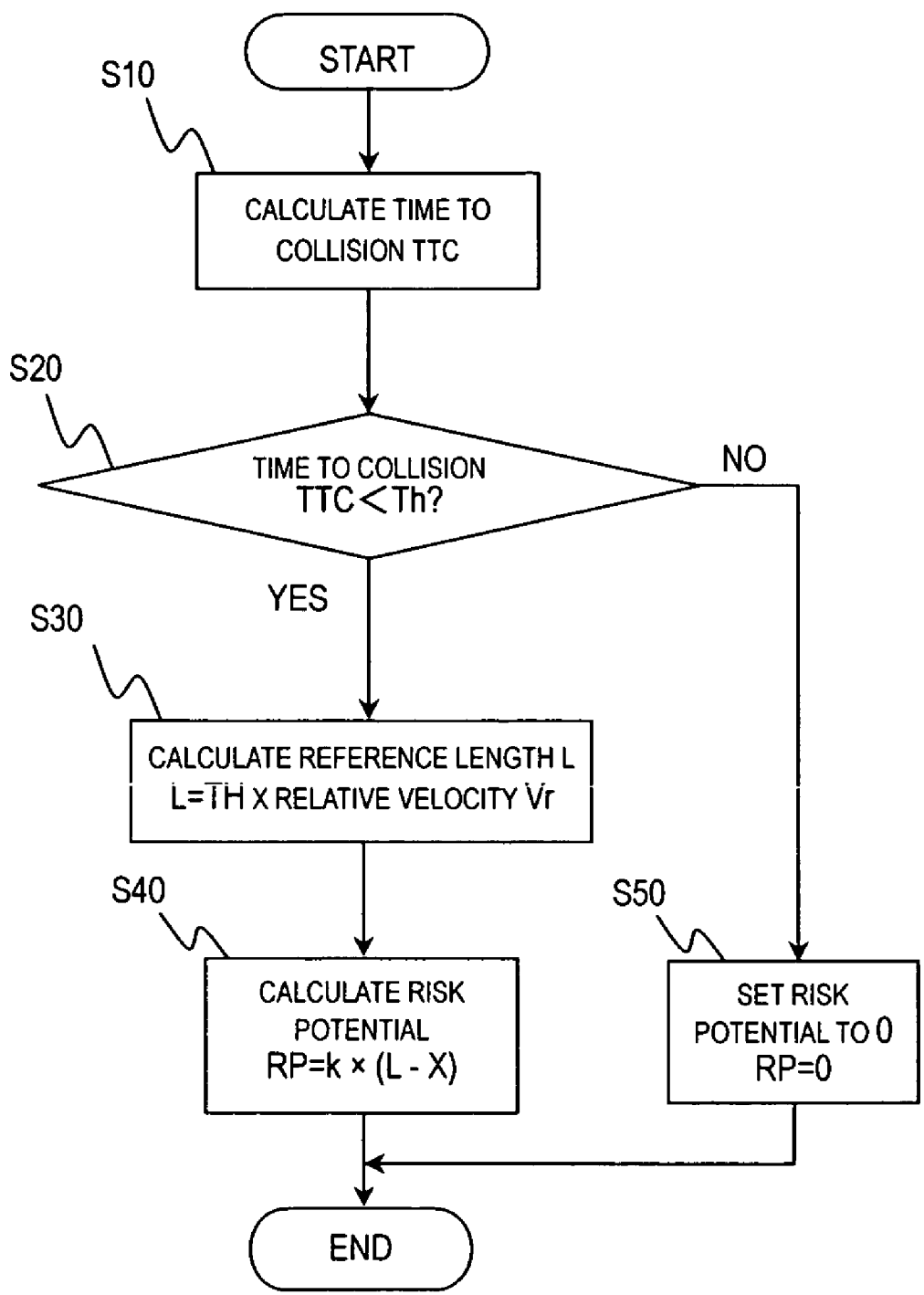
FIG. 24 is a flowchart for explaining the processing steps executed in order to calculate the risk potential in accordance with the fourth embodiment of the present invention.

Consider a model in which it is assumed that an imaginary elastic body 220 is provided on the front of the host vehicle 210 in which the driving assistance system 2 is installed, as shown in diagram (a) of FIG. 23. The imaginary elastic body 220 is assumed to touch against a preceding obstacle 230, e.g., a preceding vehicle, and is compressed, thereby generating a pseudo traveling resistance against the movement of the vehicle 210. Here, the risk potential RP with respect to the preceding obstacle is defined to be the spring force that results when, as shown in diagram (b) of FIG. 23, the imaginary elastic body 220 contacts the preceding vehicle 230 and is compressed. The method of calculating the risk potential RP will now be explained with reference to the flowchart of FIG. 24.

In step S10, the controller 100 calculates the time to collision TTC between the host vehicle and the preceding vehicle. In step S20, the controller 100 determines if the time to collision TTC calculated in step S10 is smaller than a threshold value Th. The threshold value Th is set in advance to an appropriate value for determining if braking/driving force control based on the risk potential RP should be started. If the time to collision TTC is smaller than the threshold value Th, then the controller 100 proceeds to step S30 and calculates a reference length L indicating the length of the imaginary elastic body 220.

The reference length L is calculated using Equation 10 shown below based on the time to collision threshold value Th and the relative velocity Vr between the host vehicle and the preceding vehicle.

$$L = Th \times Vr \quad \text{(Equation 10)}$$

In step S40, the controller 100 uses the reference length L calculated in step S30 in Equation 11 shown below in order to calculate the risk potential RP of the vehicle with respect to the obstacle.

$$RP = K \times (L - D) \quad \text{(Equation 11)}$$

In the equation, K is the spring constant of the imaginary elastic member 220. Thus, the shorter the following distance D of the vehicle with respect to the obstacle becomes, the more the imaginary elastic body 220 is compressed and the risk potential RP increases.

If the result of step S20 is negative, i.e., if the time to collision TTC is ≧than the threshold value Th, then the controller 100 determines that the risk of contact between the host vehicle and the preceding vehicle is low and proceeds to step S50, where it sets the risk potential RP to 0 (RP=0).

Figure 25:
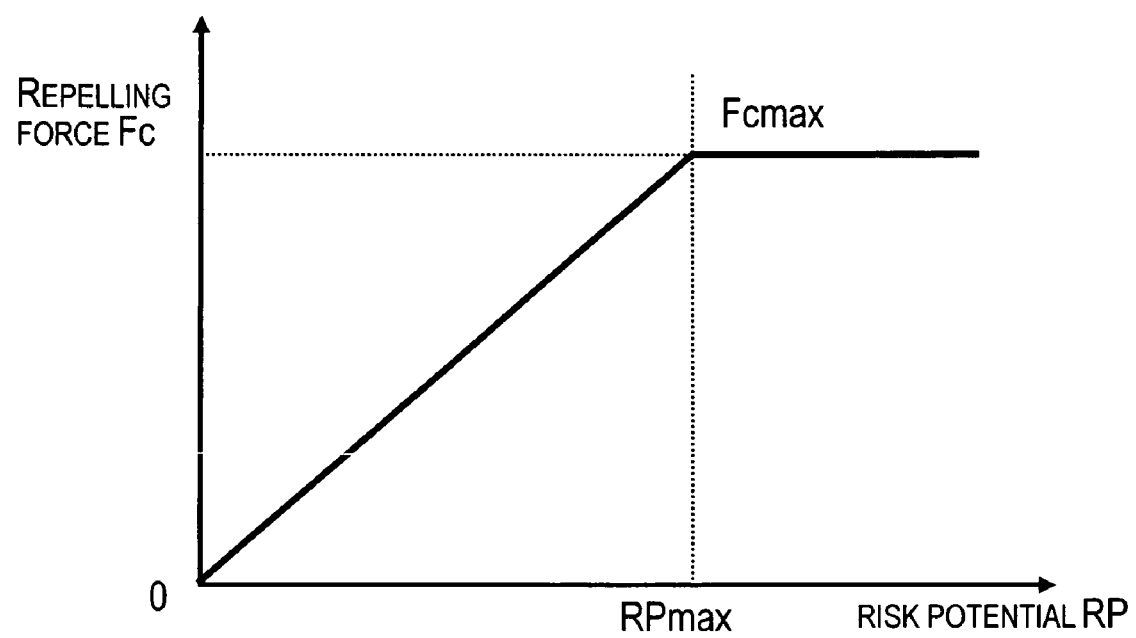
FIG. 25 is a graph that plots the accelerator pedal reaction force control command value versus the risk potential in accordance with the fourth embodiment of the present invention.

After calculating the risk potential RP, the controller 100 calculates a repelling force Fc to be used for calculating a driving force correction amount and a braking force correction amount to be used in the braking/driving force control. The repelling force Fc can be thought of as the spring force of the imaginary elastic body 220 shown in diagrams (a) and (b) of FIG. 23. The repelling force Fc is calculated according to a relationship like that shown in FIG. 25 such that the larger the risk potential RP is, the larger the calculated value of the repelling force Fc becomes. After calculating the repelling force Fc, the braking and driving force correction amounts are calculated such that driving force is reduced and/or the braking force is increased in accordance with the size of the repelling force Fc. The braking and driving force correction amounts are then used to execute braking/driving force control in accordance with the risk potential RP.

When executing braking/driving force control as just described, the size of the marker 82 can be set based on the repelling force Fc, which is the control amount on which the braking/driving force control is based. Assuming Ms is the size of the marker 82 corresponding to a reference value Freps of the repelling force Fc, the size Mc of the marker 82 corresponding to any given repelling force Fc ("Frepc") can be calculated with the Equation 12 shown below.

$$Mc = Ms \times (Frepc/Freps) \quad \text{(Equation 12)}$$

The reference value Freps of the repelling force Fc is set to, for example, approximately 400 N. The reference size Ms of the marker 82 is set to approximately 3 degrees of viewing angle from the eye point of the driver. As a result, when the repelling force Fc is larger than the reference value Freps, the size of the marker 82 is larger than the reference size Ms. Conversely, when the repelling force Fc is smaller than the reference value Freps, the size of the marker 82 is smaller than the reference size Ms.

Method (f)—Calculation in Accordance with Details of Deceleration Control

When the braking/driving force control described above is executed such that the vehicle is decelerated, the size of the marker 82 can be set based on the deceleration rate of the vehicle. The deceleration rate resulting from the braking/driving force control can be calculated based on the previously described repelling force Fc. Assuming Ms is the size of the marker 82 corresponding to a reference value "as" of the deceleration, the size Mc of the marker 82 corresponding to any given deceleration "ac" can be calculated with the Equation 13 shown below.

$$Mc = Ms \times (ac/as) \quad \text{(Equation 13)}$$

The reference value "as" of the deceleration is set to, for example, approximately 0.02 G. The reference size Ms of the marker 82 is set to approximately 3 degrees of viewing angle from the eye point of the driver. As a result, when the deceleration is larger than the reference value "as", the size of the marker 82 is larger than the reference size Ms. Conversely, when the deceleration is smaller than the reference value "as", the size of the marker 82 is smaller than the reference size Ms.

Fifth Embodiment

A vehicle driving assist system in accordance with a fifth embodiment of the present invention will now be explained. The basic constituent features of a vehicle driving assist system in accordance with the fifth embodiment are the same as those of the fourth embodiment shown in FIG. 20. The fifth embodiment will be explained chiefly by describing its differences with respect to the fourth embodiment.

Figure 26:
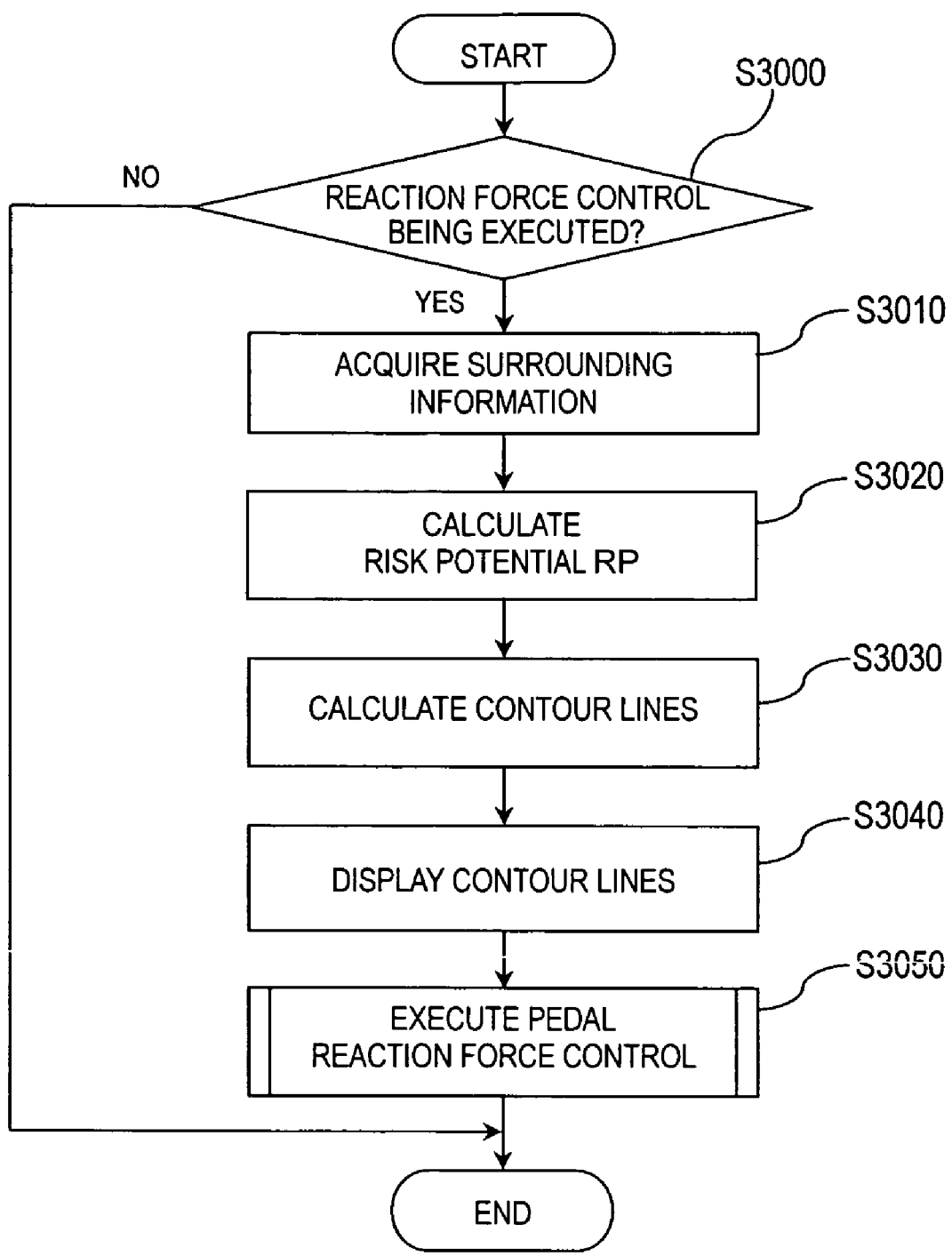
FIG. 26 is a flowchart showing the processing steps executed by a driving assistance control program in accordance with a fifth embodiment of the present invention.

In the fifth embodiment, a distribution of the risk potential of the vehicle with respect to an obstacle is indicated with contour lines. The operation of a vehicle driving assist system 2 in accordance with the fifth embodiment will now be explained in detail with reference to FIG. 26. FIG. 26 is a flowchart showing the processing steps of a driving assistance control program executed by the controller 100. This control loop is executed continuously once per prescribed time period, e.g., every 50 msec.

In step S3000, the controller 100 determines if actuation reaction force control is currently being executed based on the risk potential. If the result of step S3000 is positive, then the controller 100 proceeds to step S3010. If the result of step S3000 is negative, then the controller 100 ends the control loop. In step S3010, the controller 100 reads information regarding the surroundings of the vehicle. The surrounding information mentioned here constitutes information related to the traveling circumstances of the vehicle, including information regarding obstacles in front of the host vehicle. Thus, the controller 100 reads in the following distance D between the host vehicle and the preceding obstacle, the relative velocity Vr with respect to the obstacle, and the existence direction θ1 from the vehicle to the obstacle detected by the laser radar 10. The controller 100 also reads the traveling speed V of the vehicle detected by the vehicle speed sensor 30. Additionally, the controller 100 collects information regarding other vehicles existing around the vehicle (e.g., information regarding adjacent vehicles existing in an adjacent lane) and lane information regarding the lane in which the vehicle is traveling.

In step S3020, the controller 100 calculates the risk potential RP of the vehicle with respect to each of the obstacles existing around the vehicle. In order to simplify the explanation, it will now be assumed that the targeted obstacle (preceding vehicle targeted by the control) existing in front of the host vehicle is the only vehicle detected. The risk potential RP with respect to the preceding vehicle is calculated using the aforementioned Equation 3.

Figure 27:
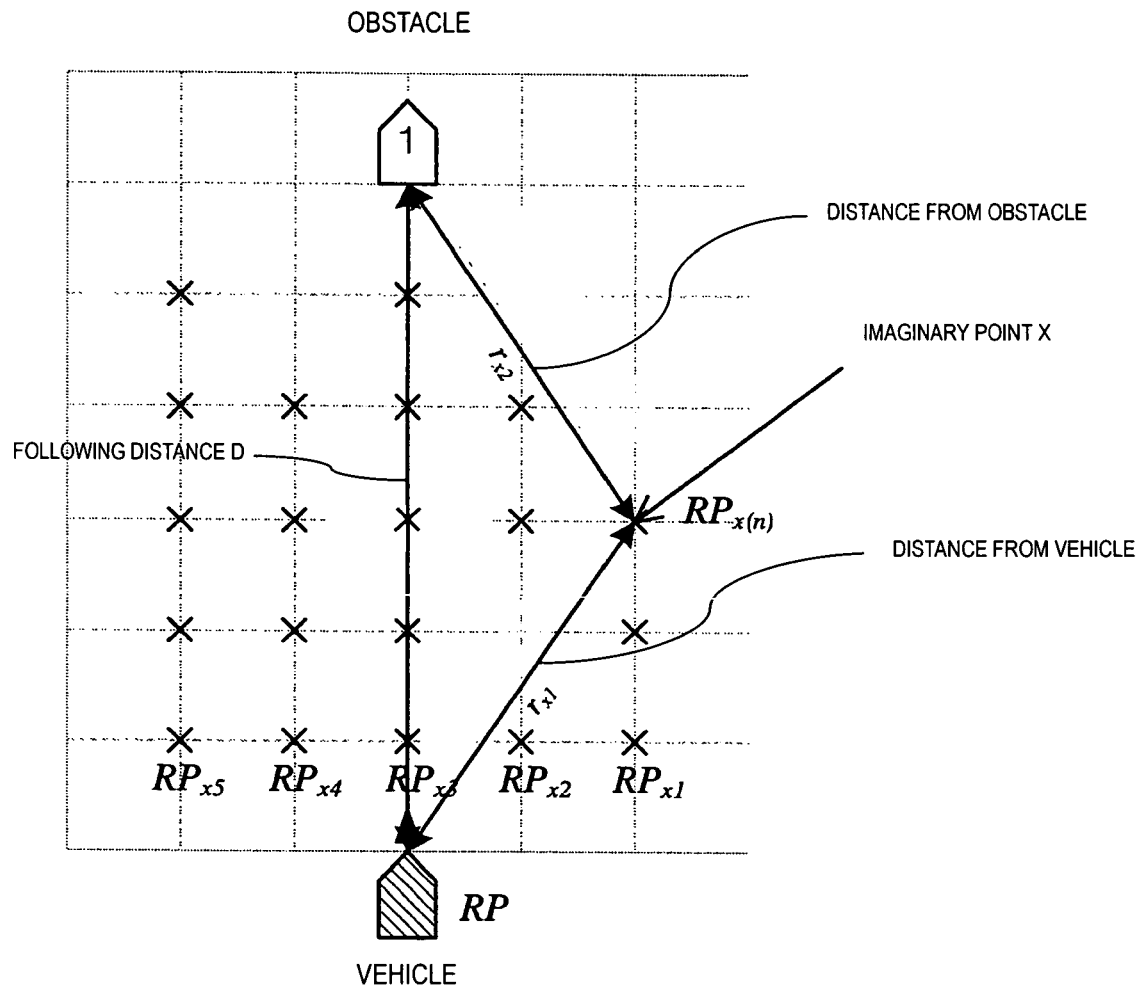
FIG. 27 illustrates the method of calculating the risk potential at an imaginary point in accordance with the fifth embodiment of the present invention.

In step S3030, the controller 100 calculates contour lines to be displayed on the display device 81. In order to calculate the contour lines, a risk map is created on an imaginary plane as shown in FIG. 27. Imaginary points spaced 2 m apart vertically and horizontally are set on the imaginary plane and the risk potential RPx at an imaginary point x is calculated.

The risk potential RP calculated using Equation 3 can be expressed according to the Equation 14 shown below, where RPsteady, i.e., A/THW, is a transient risk potential resulting from the state of convergence between the host vehicle and the preceding obstacle changing due to changes in the relative velocity Vr and the following distance D and RPtransient, i.e., B/TTC is a steady-state risk potential resulting from a steady following state in which the relative velocity Vr is substantially 0 and the following distance D is substantially constant.

$$RP = RPsteady + RPtransient = A/THW + B/TTC \quad \text{(Equation 14)}$$

The risk potential RPx at the imaginary point x can be calculated using the equation 15 below based on the following distance D between the host vehicle and the preceding obstacle, the distance rx1 between the vehicle and the imaginary point x, and the distance rx2 between the obstacle and the imaginary point x.

$$RPx = RPsteady \times (rx1/D) + RPtransient \times (rx2/D) \quad \text{(Equation 15)}$$

After it calculates the risk potential RPx (using Equation 15) for each imaginary point x on the imaginary plane, the controller 100 calculates contour lines centered on the vehicle by joining imaginary points where the risk potential RP is the same at prescribed intervals, e.g., 0.5, of risk potential value.

Figure 28:
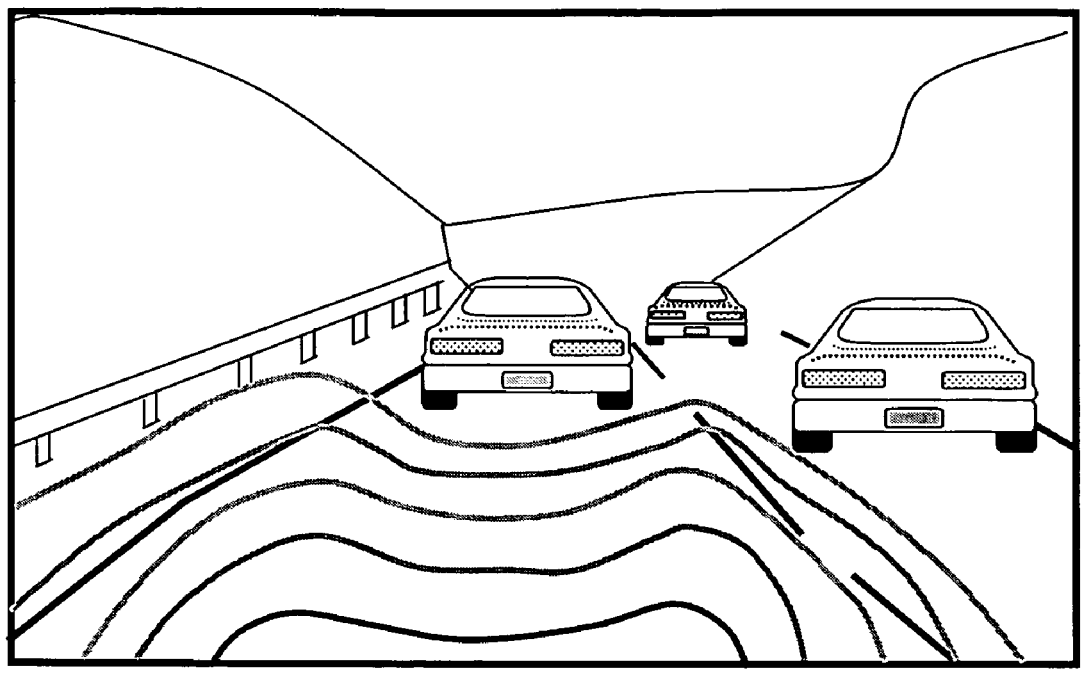
FIG. 28 is a diagram illustrating an example of what is displayed in accordance with the fifth embodiment.
Figure 29:
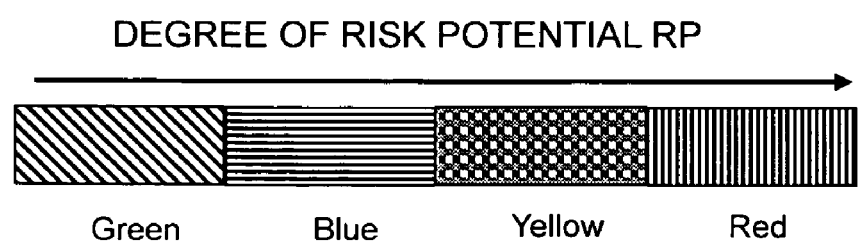
FIG. 29 is a bar graph that illustrates the relationship between the risk potential and the display color of the contour lines associated with the risk potential in accordance with the fifth embodiment of the present invention.

In step S3040, the computer 100 displays the contour lines calculated in step S3030 on the display device 81. An example of contour lines expressing the risk potential RP distribution is shown in FIG. 28. The color of the contour lines is varied according to the degree of the risk potential RP. More specifically, as shown in FIG. 29, the colors of the contour lines vary gradually from green to blue to yellow to red as the risk potential RP increases.

In the example shown in FIG. 28, the two contour lines closest to the vehicle are displayed in red and the colors of the other contour lines change from yellow to blue to green as one moves farther from the vehicle. Although in this embodiment the colors of the contour lines vary gradually from green to red, it is also possible to establish a plurality of predetermined ranges of risk potential RP values and assign a specific color to each range.

Finally, in step S3050, the controller 100 controls the actuation reaction force exerted by (generated in) the accelerator pedal 72 based on the risk potential RP calculated in step S3020. After the command values are sent, the current control loop ends.

When two or more obstacles are detected around (in the vicinity of) the vehicle by laser radar 10 and/or the forward camera 20, the risk potential RPx at each imaginary point x is calculated using the Equation 16 shown below.

$$RPx = \Sigma RPx(n) = \Sigma\{RPsteady(n) \times (rx1/D) + RPtransient(n) \times (rx2/D)\} \quad \text{(Equation 16)}$$

When a plurality of obstacles is detected around the vehicle, the risk potential RP with respect to the obstacle targeted by the actuation reaction force control executed by the vehicle driving assist system 2 can be weighted differently from the risk potential RP with respect to the other obstacles. For example, when the risk potential RPx at each imaginary point x is calculated according to Equation 16, the weight of the risk potential RP (=RPsteady+RPtransient) with respect to the targeted obstacle in front of the host vehicle can be set higher than the weight of the risk potential RP (=RPsteady+RPtransient) with respect to another obstacle existing in an adjacent lane or other position.

The fifth embodiment just described can provide the following operational effects in addition to the effects provided by the fourth embodiment. The vehicle driving assist system 2 is configured to display contour lines indicating the degree of the risk potential RP with respect to the targeted obstacle on a display device 81. As a result, the distribution of the risk potential RP around the vehicle can be indicated in real time with contour lines. By configuring the system 2 to vary the colors of the contour lines in accordance with the degree of the risk potential RP, the size and distribution of the risk potential RP can be readily grasped by the driver based on the colors and spacing of the contour lines.

Sixth Embodiment

A vehicle driving assist system in accordance with a sixth embodiment of the present invention will now be explained. The basic constituent features of a vehicle driving assist system in accordance with the sixth embodiment are the same as those of the fourth embodiment shown in FIG. 20. The sixth embodiment will be explained chiefly by describing its differences with respect to the fourth embodiment.

Figure 30:
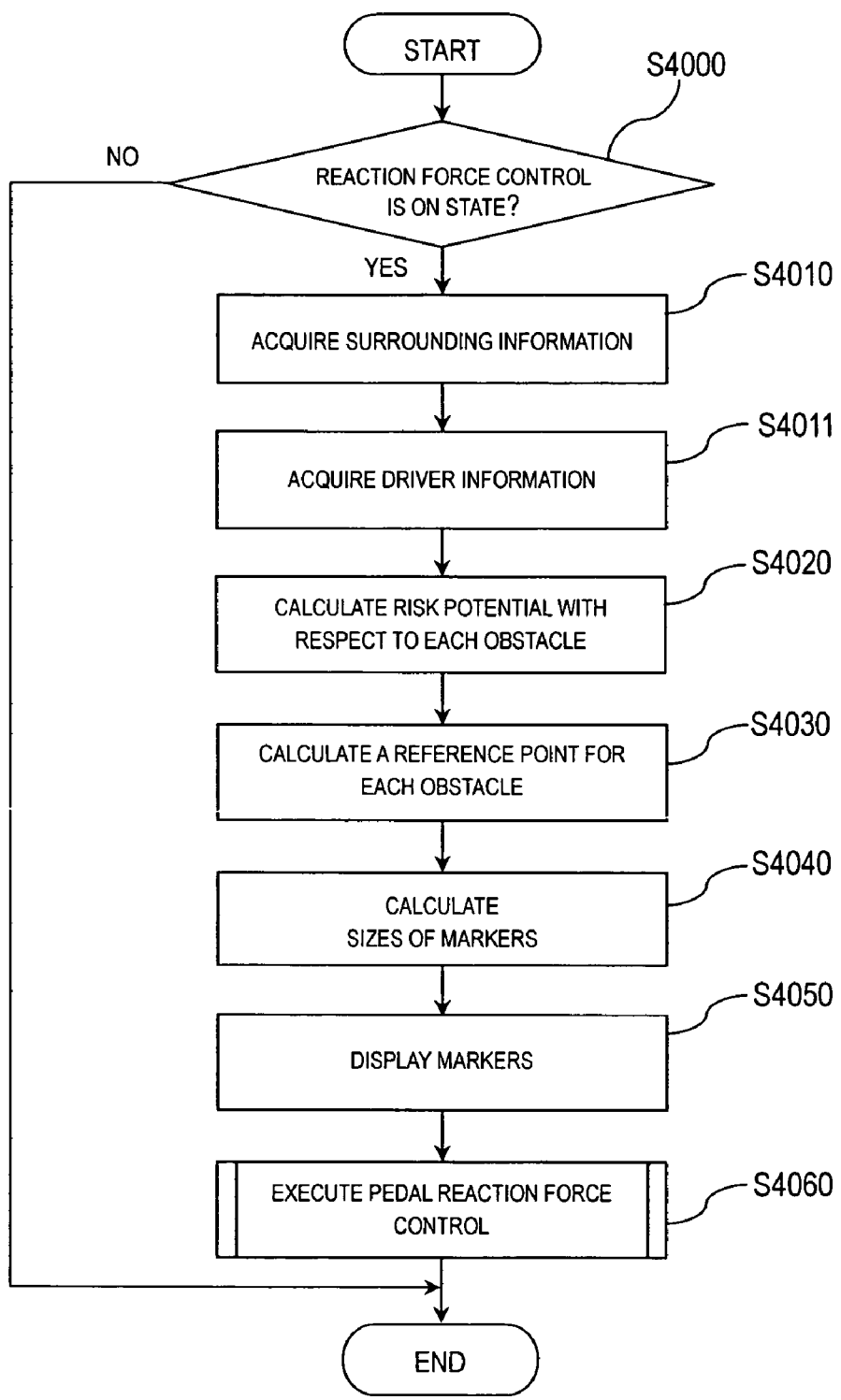
FIG. 30 is a flowchart showing the processing steps executed by a driving assistance control program in accordance with a sixth embodiment of the present invention.

In the sixth embodiment, the risk potentials RP of the vehicle with respect to all obstacles detected around the vehicle by a sensor(s) are indicated with markers 82. The operation of a vehicle driving assist system 2 in accordance with the sixth embodiment will now be explained in detail with reference to FIG. 30. FIG. 30 is a flowchart showing the processing steps of a driving assistance control program executed by the controller 100. This control loop is executed continuously once per prescribed time period, e.g., every 50 msec.

In step S4000, the controller 100 determines if actuation reaction force control is currently being executed based on the risk potential. If the result of step S4000 is positive, then the controller 100 proceeds to step S4010. If the result of step S4000 is negative, then the controller 100 ends the control loop. In step S4010, the controller 100 reads various information regarding the surroundings of the host vehicle. The surrounding information mentioned here constitutes information related to the traveling circumstances of the vehicle, including information regarding obstacles in front of the host vehicle. Thus, the controller 100 reads in the following distance D between the host vehicle and the preceding obstacle, the relative velocity Vr with respect to the obstacle, and the existence direction θ1 from the vehicle to the obstacle detected by the laser radar 10. The controller 100 also reads the traveling speed V of the vehicle detected by the vehicle speed sensor 30. Additionally, the controller 100 collects information regarding other vehicles existing around the vehicle (e.g., information regarding adjacent vehicles existing in an adjacent lane) and lane information regarding the lane in which the host vehicle is traveling.

In step S4011, the controller 100 acquires driver information. More specifically, the controller 100 calculates the eye point height "he" of the driver based on a signal from the eye point detecting device 37. The controller 100 also calculates the longitudinal distance "dc" from the front end (front most portion) of the vehicle to the driver's eyes ("eye point") and the longitudinal distance "dd" from the display device 81 to the eye point based on the seat position of the driver's seat. The longitudinal distances "dc" and "dd" can also be set to prescribed values in advance.

In step S3020, the controller 100 calculates the risk potential RP of the vehicle with respect to each of the obstacles existing around the vehicle. When a preceding vehicle existing in front of the host vehicle in the same lane is detected, the risk potential RP with respect to the preceding vehicle is calculated using the aforementioned Equation 3. When another vehicle exists in an adjacent lane, the risk potential RP is calculated with an equation similar to Equation 3 using the longitudinal distance between the vehicle and the other vehicle (corresponds to the following distance), the difference between the vehicle speed V and the speed of the other vehicle (corresponds to the relative velocity), and the vehicle speed V.

Regarding obstacles that do not exist in the direction along which the vehicle is moving and will not have a large effect on the ability of the vehicle to travel, e.g., another vehicle in an adjacent lane, the value obtained by multiplying the risk potential RP calculated with Equation 3 by a prescribed coefficient ko (ko<1) is used as the risk potential RP. The prescribed coefficient ko is set to, for example, approximately 0.2 in consideration of the degree to which an obstacle in a different lane affects the ability of the vehicle to continue traveling in comparison to the degree to which an obstacle in the same lane affects the ability of the vehicle to continue traveling.

Additionally, the risk potential RP with respect to an obstacle existing around the vehicle is treated as 0 (RP=0) when the calculated risk potential RP is equal to or below a prescribed value. In this embodiment, the prescribed value is set to, for example, approximately 0.2.

In step S4030, the controller 100 calculates a reference point P2 of the image displayed on the display device 81 with respect to each obstacle for which the risk potential RP calculated in step S4020 is larger than 0 (RP>0). The method of calculating the reference point P2 is the same as in step S1040 of the flowchart shown in FIG. 3 (see FIGS. 6 to 8).

In step S4040, the controller 100 calculates the size of each of the markers 82 corresponding to the respective obstacles based on the respective risk potentials RP calculated in step S4020. The size of each marker 82 is calculated, for example, using the aforementioned Equation 6 based on the degree of the risk potential RP of the respective obstacle over which the marker 82 will be displayed.

Figure 31:
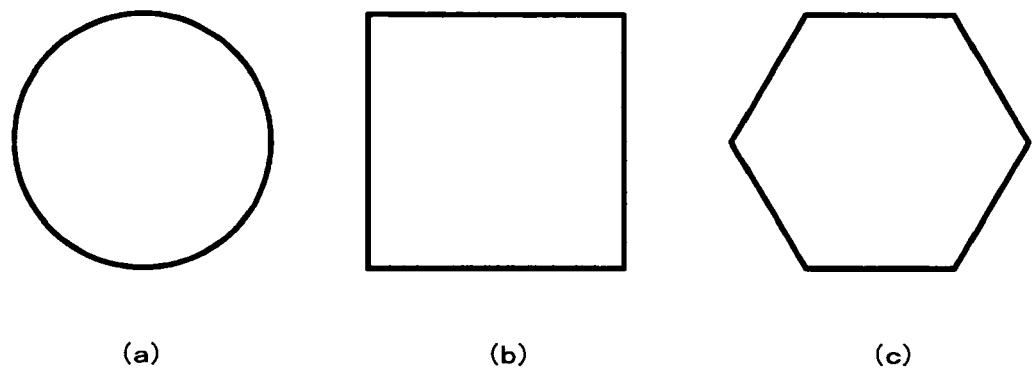
FIG. 31 illustrates three examples, diagrams (a) to (c), of marker shapes that can be used in accordance with the sixth embodiment of the present invention.

In step S4050, the controller 100 sends a signal to the display control device 80 such that the marker 82 corresponding to each obstacle is displayed on the display device 81 at the respective size set in step S4040 and centered on the respective reference point P2 calculated in step S4030. When the markers 82 are displayed, a differently shaped marker 82 is assigned to each obstacle. Several shapes are set in advance for the risk potential marker 82, e.g., a circular shape like that shown in diagram (a) of FIG. 31, a square shape like that shown in diagram (b) of FIG. 31, and a polygonal shape like that shown in diagram (c) of FIG. 31. The same shape of marker is displayed over a given obstacle so long as that obstacle is detected in a continuous manner.

In step S4060, the controller 100 controls the actuation reaction force exerted by the accelerator pedal 72 based on the largest risk potential RP value among the risk potentials RP calculated with respect to the detected obstacles in step S4020. After the command values are sent, the current control loop ends.

Figure 32:
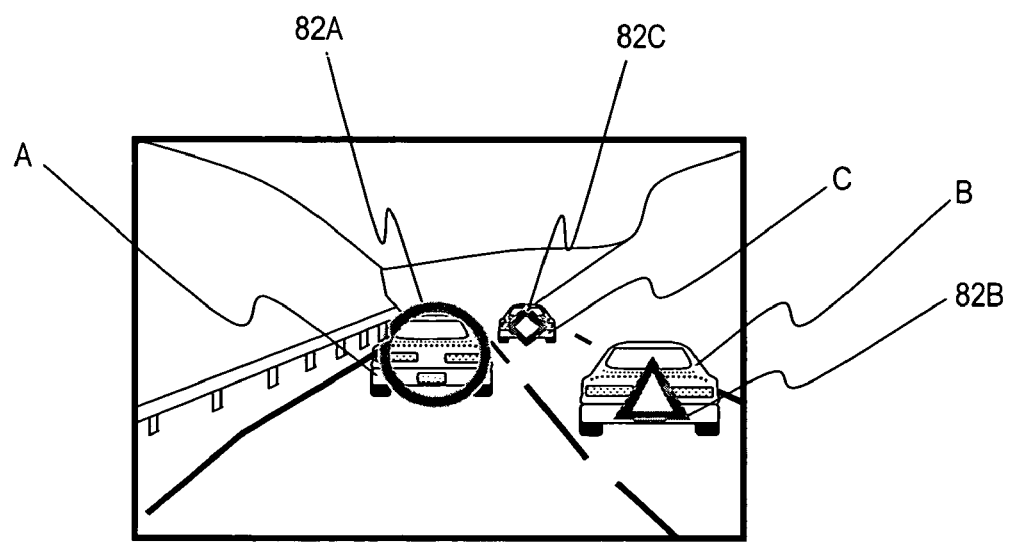
FIG. 32 a display illustrating an example of what is displayed in accordance with the sixth embodiment.

FIG. 32 illustrates an example of how the markers 82 appear on the display device 81. FIG. 32 illustrates an example in which three obstacles A, B, and C are detected in a region in front of the host vehicle. The risk potential RP calculated in step S4020 with respect to the preceding vehicle A is the largest risk potential value and a circular marker 82A is displayed over the preceding vehicle A. Meanwhile, a triangular marker 82B is displayed over another vehicle B that is located close to the vehicle in the right-hand adjacent lane and a diamond shaped marker 82C is displayed over another vehicle C located farther away than the other vehicle B. The colors of the markers 82A, 82B, 82C are each set in accordance with the risk potential RP with respect to the corresponding other vehicle. When the risk potential RP of the vehicle with respect to each obstacle changes, the size of the corresponding marker 82A, 82B, 82C is also changed.

The sixth embodiment just described can provide the following operational effects in addition to the effects provided by the fourth and fifth embodiments.

The vehicle driving assist system 2 is configured to calculate a risk potential RP with respect to each of a plurality of obstacles existing in front of the host vehicle in which the system 2 is installed and display the risk potential RP with respect to each obstacle on a display device 81. More specifically, as shown in FIG. 32, the markers 82A, 82B, and 82C are displayed with respect to a plurality of obstacles detected in a region in front of the host vehicle by the laser radar 10 and/or the forward camera 20. As a result, the risk potential RP of each of a plurality of obstacles detected with a sensor(s) can be displayed.

The vehicle driving assist system 2 is configured to display the risk potential RP of the vehicle with respect to only those obstacles for which the risk potential RP is equal to or larger than a prescribed value. As a result, even when multiple obstacles are detected, only the risk potentials RP of those obstacles that actually pose a risk to the ability of the vehicle to travel are displayed.

It is also possible to display the marker 82 on the display screen of a navigation system instead of the display device 81. When the display screen of a navigation system is used, an image of a region in front of the host vehicle is captured with the forward camera 20 and displayed on the display screen. The markers 82 are displayed over the images of the respective obstacles on the display screen. Thus, when a display device other than the display device 81 is used, the same operational effects can be obtained as when the display device 81 is used.

Seventh Embodiment

Figure 33:
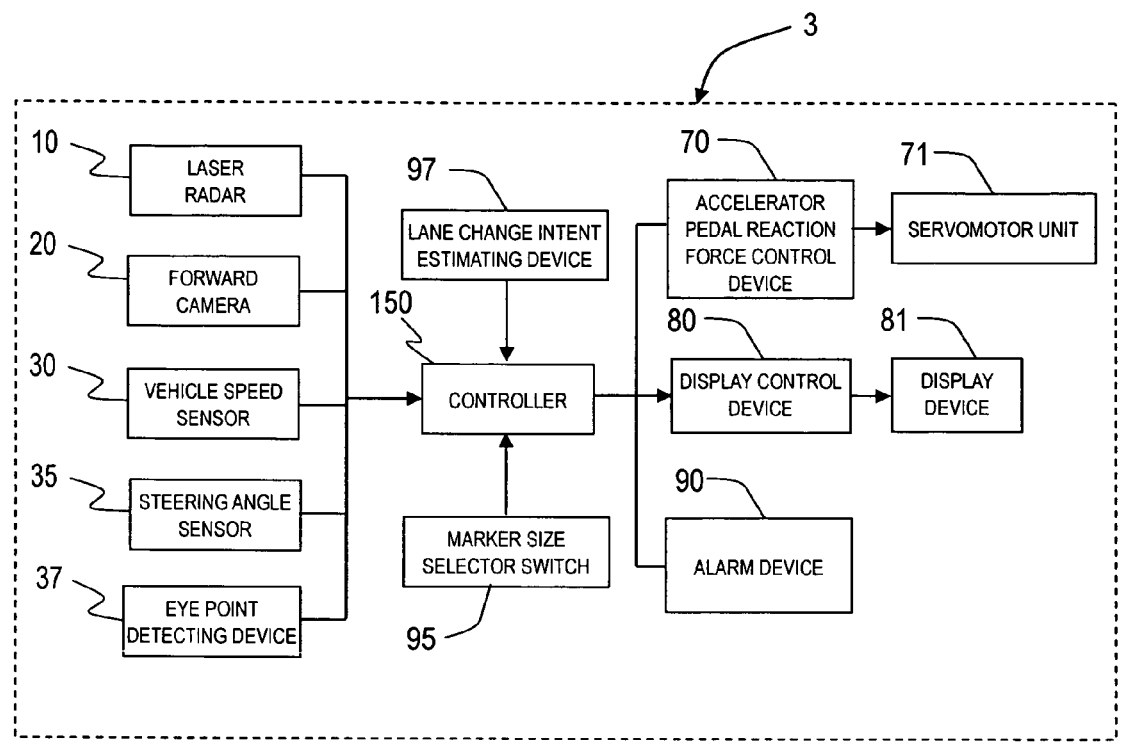
FIG. 33 is a system diagram of a vehicle driving assist system in accordance with a seventh embodiment of the present invention.

A vehicle driving assist system in accordance with a seventh embodiment of the present invention will now be explained. FIG. 33 is a system diagram showing the constituent features of a vehicle driving assist system 3 in accordance with the seventh embodiment. In FIG. 33, parts having the same functions as the parts of the fourth embodiment shown in FIG. 20 are indicated with the same reference numerals. The seventh embodiment will be explained chiefly by describing its differences with respect to the fourth embodiment.

As shown in FIG. 33, the vehicle driving assist system 3 is equipped with a lane change intent estimating device 97 configured to estimate if the driver has an intent to change lanes. The lane change intent estimating device 97 is configured to determine if the driver is about to change lanes by acquiring, for example, an operation signal from a turn signal lever. It is also possible to configure the lane change intent estimating device 97 to estimate the lane change intent using any of various other methods.

In the seventh embodiment, an obstacle that could become the target of the actuation reaction force control is displayed in advance in accordance with the direction of the vehicle. As described previously regarding the sixth embodiment, when a plurality of obstacles is detected around the vehicle with the sensor(s), the obstacle with respect to which the risk potential RP is the largest is treated as the obstacle targeted by the reaction force control. However, when there is another obstacle (e.g., another vehicle) in an adjacent lane and the relative deviation of direction (relative angle) of the vehicle with respect to that obstacle is small, there is a possibility that that obstacle become will become the targeted obstacle in the future due to the vehicle changing lanes. Therefore, in the seventh embodiment, when two or more obstacles are detected in the vicinity of the vehicle, a marker or the like is displayed with respect to an obstacle that could possibly become the targeted obstacle in the future. That is, a marker is displayed before that obstacle actually does become the targeted obstacle.

Figure 34:
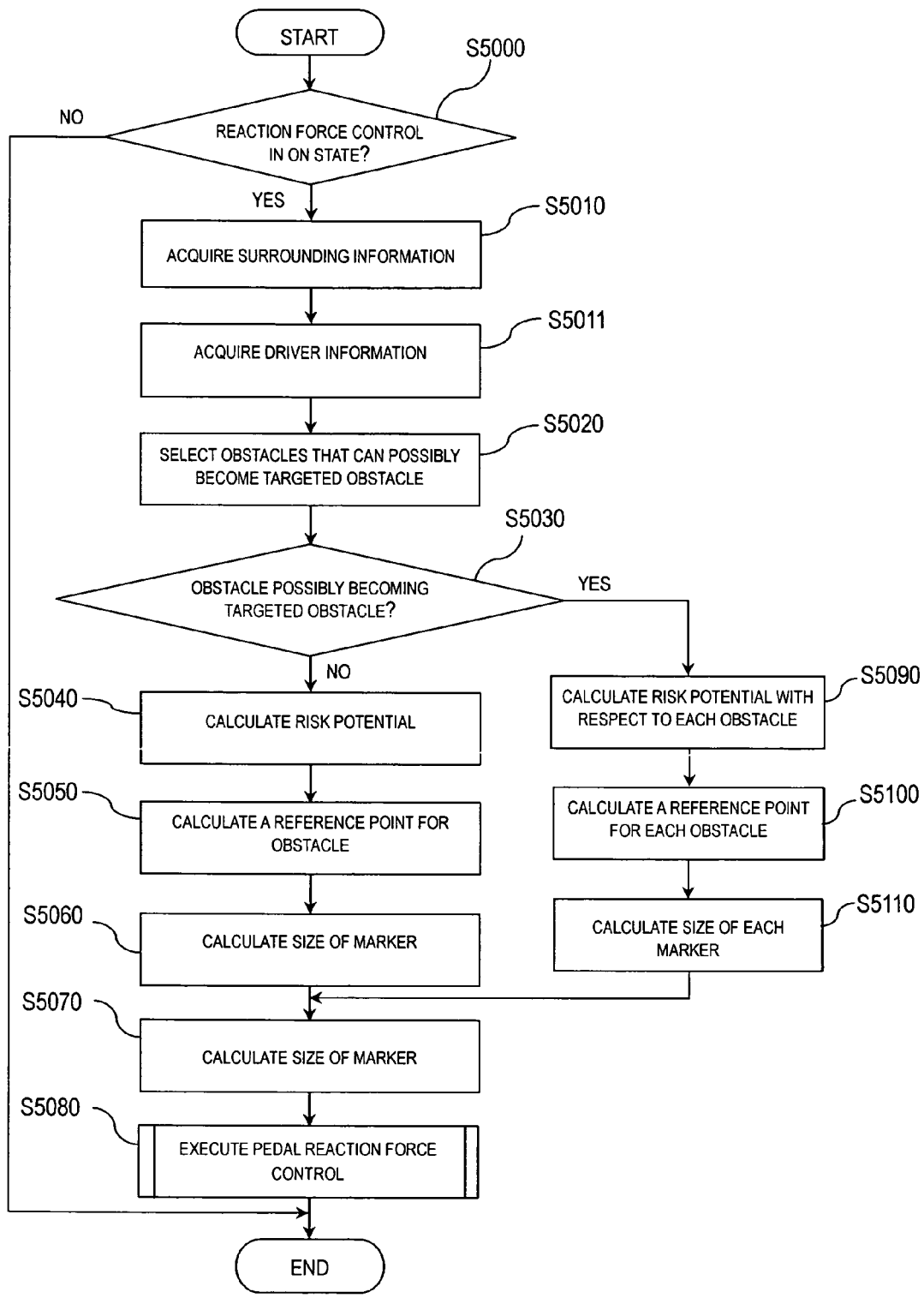
FIG. 34 is a flowchart showing the processing steps executed by a driving assistance control program in accordance with the seventh embodiment of the present invention.

The operation of a vehicle driving assist system 3 in accordance with the seventh embodiment will now be explained in detail with reference to FIG. 34. FIG. 34 is a flowchart showing the processing steps of a driving assistance control program executed by the controller 150. This control loop is executed continuously once per prescribed time period, e.g., every 50 msec.

In step S5000, the controller 150 determines if actuation reaction force control is currently being executed based on the risk potential. If the result of step S5000 is positive, then the controller 150 proceeds to step S5010. If the result of step S5000 is negative, then the controller 150 ends the control loop. In step S5010, the controller 150 reads information regarding the surroundings of the host vehicle. The surrounding information mentioned here constitutes information related to the traveling circumstances of the vehicle, including information regarding obstacles in front of the host vehicle. Thus, the controller 150 reads in the following distance D between the host vehicle and the preceding obstacle, the relative velocity Vr with respect to the obstacle, and the existence direction (relative angle) θ1 from the vehicle to the obstacle detected by the laser radar 10. The controller 150 also reads the traveling speed V of the host vehicle detected by the vehicle speed sensor 30. Additionally, the controller 150 collects information regarding other vehicles existing around the host vehicle (e.g., information regarding adjacent vehicles existing in an adjacent lane) and lane information regarding the lane in which the host vehicle is traveling. The controller 150 also acquires a signal related to the driver's operation of a turn signal from the lane change intent estimating device 97.

In step S5011, the controller 150 acquires driver information. More specifically, the controller 150 calculates the eye point height "he" of the driver based on a signal from the eye point detecting device 37. The controller 150 also calculates the longitudinal distance "dc" from the front end (front most portion) of the vehicle to the driver's eyes ("eye point") and the longitudinal distance "dd" from the display device 81 to the eye point based on the seat position of the driver's seat. The longitudinal distances "dc" and "dd" can also be set to prescribed values in advance.

In step S5020, the controller 150 selects the obstacles that could become the obstacle targeted by the actuation reaction force control executed by the vehicle driving assist system 3 from among the obstacles detected in step S5010. More specifically, all obstacles for which the direction of the vehicle with respect to the obstacle, i.e., the relative angle θ1, is within a prescribed range are selected as obstacles that could become the targeted obstacle. The obstacles that could become the targeted obstacle include the obstacle currently targeted by the actuation reaction force control and any other obstacles that could possibly become the targeted obstacle in the future.

Figure 35:
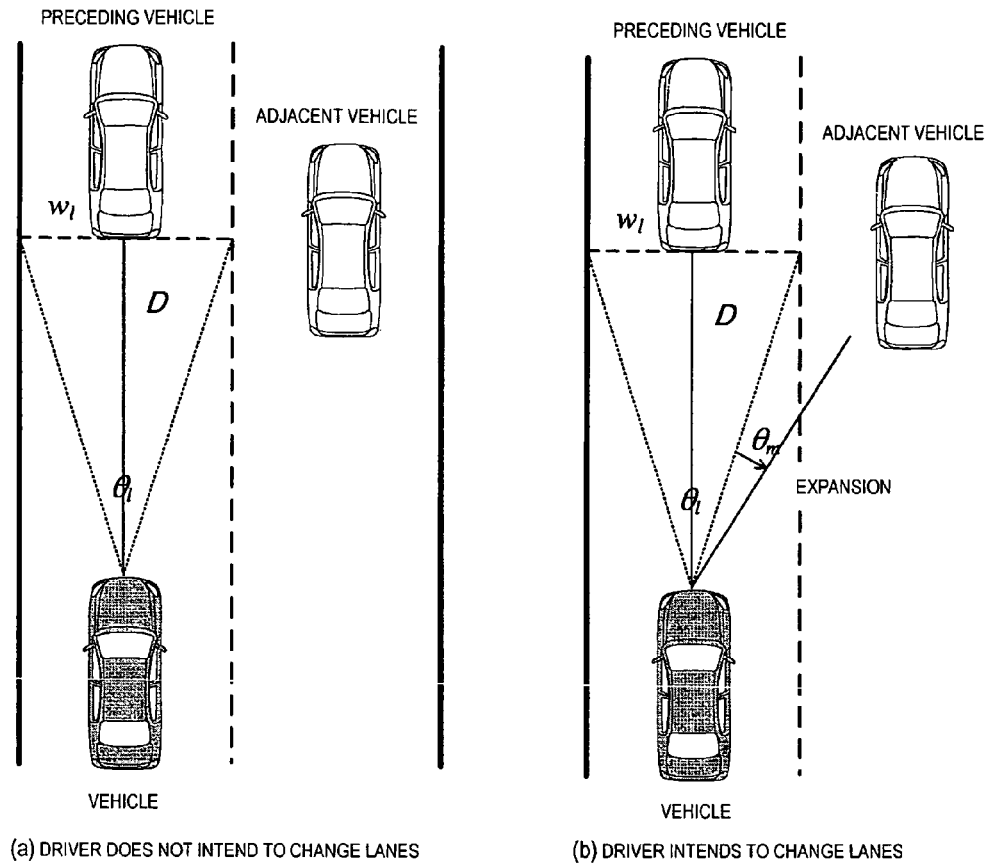
FIG. 35 is a pair of diagrams (a) and (b) illustrating how the method of selecting an obstacle that could become the targeted obstacle is changed depending on whether or not the driver intends to change lanes in accordance with the seventh embodiment of the present invention.

As shown in diagram (a) of FIG. 35, using the longitudinal center line of the vehicle as a reference (=0), obstacles for which the angle θ1 relative to the vehicle is within a prescribed angular range $\theta_1$ (i.e., $-\theta_1/2 \leq \theta_1 \leq +\theta_1/2$) are identified as obstacles that could become the targeted obstacle. The prescribed angular range $\theta_1$ can be calculated with the Equation 17 below using the width $W_1$ of the lane in which the vehicle is traveling and the following distance D between the host vehicle and the preceding vehicle.

$$\theta_1 = 2 arc \tan W_1/2D \quad \text{(Equation 17)}$$

When more than one obstacle exists within the prescribed angular range $\theta_1$, all of those obstacles are selected as obstacles that could become the targeted obstacle. The angular range within which the laser radar 10 can detect obstacles is quite a bit larger than the prescribed angular range $\theta_1$ expressed in Equation 17.

If the signal related to the operation of the turn signal from the lane change intent estimating device 97 indicates that the driver intends to change lanes, then the prescribed angular range $\theta_1$ is expanded in the direction of the lane change. For example, if it is estimated that the driver is about to change into the right-hand adjacent lane, then the controller 150 expands the prescribed angular range $\theta_1$ by a correction angle $\theta_m$ in the right-hand direction. Therefore, when it is estimated that the driver intends to change lanes, the prescribed angular range $\theta_1$ can be calculated with the Equation 18 shown below.

$$\theta_1 = 2 arc \tan W_1/2D + \theta m \quad \text{(Equation 18)}$$

The correction angle $\theta_m$ is set to, for example, approximately 10°.

When the prescribed angular range $\theta_1$ is expanded to the right as shown in diagram (b) of FIG. 35, adjacent vehicles that would not have been selected if there was no intent to change lanes (as shown in diagram (a) of FIG. 35) are selected as obstacles that could become the targeted obstacle. Thus, when it is estimated that the driver intends to change lanes, the prescribed angular range $\theta_1$ is expanded and, as a result, obstacles within a wider angular range can be detected as obstacles that could possibly become the targeted obstacle in the future.

In step S5030, the controller 150 checks the obstacles selected in step S5020 as obstacles that could become the targeted obstacle in the future and determines if there is an obstacle among them that is not the obstacle that is currently targeted by the reaction force control. For example, the adjacent vehicle shown in diagram (b) of FIG. 35 is not the obstacle currently targeted by the actuation reaction force control, but it could possibly become the targeted obstacle in the future. If such another vehicle is detected, the result of step S5030 will be positive and the controller 150 will proceed to step S5090. Meanwhile, if only the currently targeted obstacle is detected, i.e., if there is no other detected obstacle that could possibly become the targeted obstacle in the future, then the controller 150 proceeds to step S5040.

In step S5040, the controller 150 calculates the risk potential RP with respect to the currently targeted obstacle using the aforementioned Equation 3. In step S5050, the controller 150 calculates a reference point P2 of the image displayed on the display device 81. The method of calculating the reference point P2 is the same as in step S1040 of the flowchart shown in FIG. 3 (see FIGS. 6 to 8). In step S5060, the controller 150 calculates the size of the marker 82 corresponding to the targeted obstacle based on the respective risk potential RP calculated in step S5040. The size of the marker 82 is calculated, for example, using the aforementioned Equation 6 based on the degree of the risk potential RP of the obstacle over which the marker 82 will be displayed.

In step S5090, the controller 150 calculates the risk potentials RP of both the currently targeted obstacle and the obstacle(s) that could possibly become the targeted obstacle in the future. The risk potential RP of the currently targeted obstacle, e.g., a preceding vehicle existing in front of the host vehicle, is calculated using the aforementioned Equation 3. Regarding the obstacle(s) that could possibly become the targeted obstacle in the future, e.g., another vehicle existing in an adjacent lane, the risk potential RP is calculated with an equation similar to Equation 3 using the longitudinal distance between the vehicle and the other vehicle (corresponds to the following distance), the difference between the vehicle speed V and the speed of the other vehicle (corresponds to the relative velocity), and the vehicle speed V.

Additionally, regarding the obstacles that could possibly become the targeted obstacle in the future, the value obtained by multiplying the risk potential RP calculated with Equation 3 by a prescribed coefficient ko (ko<1) is used as the risk potential RP. The prescribed coefficient ko is set to, for example, approximately 0.2 in consideration of the degree to which an obstacle in a different lane affects the ability of the vehicle to continue traveling in comparison to the degree to which an obstacle in the same lane affects the ability of the vehicle to continue traveling.

In step S5100, the controller 150 calculates a reference point P2 of the image to be displayed on the display device 81 with respect to each of the obstacles for which a risk potential RP was calculated in step S5090 (i.e., the targeted obstacle and the obstacle(s) that could possibly become the targeted obstacle in the future). The method of calculating the reference points P2 is the same as in step S1040 of the flowchart shown in FIG. 3 (see FIGS. 6 to 8)

In step S5110, the controller 150 calculates the size of each of the markers 82 corresponding to each of the obstacles for which a risk potential RP was calculated in step S5090 (i.e., the targeted obstacle and the obstacle(s) that could possibly become the targeted obstacle in the future). The size of each marker 82 is calculated, for example, using the aforementioned Equation 6 based on the degree of the risk potential RP of the obstacle over which the marker 82 will be displayed.

In step S5070, the controller 150 sends a signal to the display control device 80 causing the marker(s) 82 to be displayed on the display device 81. When only the currently targeted obstacle is detected, the marker 82 whose size was set in step S5060 is displayed so as to be overlapping the targeted obstacle and centered on the reference point P2 calculated in step S5050. When an obstacle(s) that could possibly become the targeted obstacle in the future is detected, the markers 82 whose sizes were set in step S5110 are displayed so as to be overlapping the respective obstacles that could possibly become the targeted obstacle in the future and centered on the reference points P2 calculated in step S5100. The shape and color of the marker 82 displayed over the obstacle that could possibly become the targeted obstacle in the future is different from the shape and color of the marker 82 displayed over the currently targeted obstacle.

In step S5080, the controller 150 controls the actuation reaction force exerted by the accelerator pedal 72 based on the risk potential RP calculated with respect to the currently targeted obstacle in step S5040 or S5090. After the command values are sent, the current control loop ends.

Figure 36:
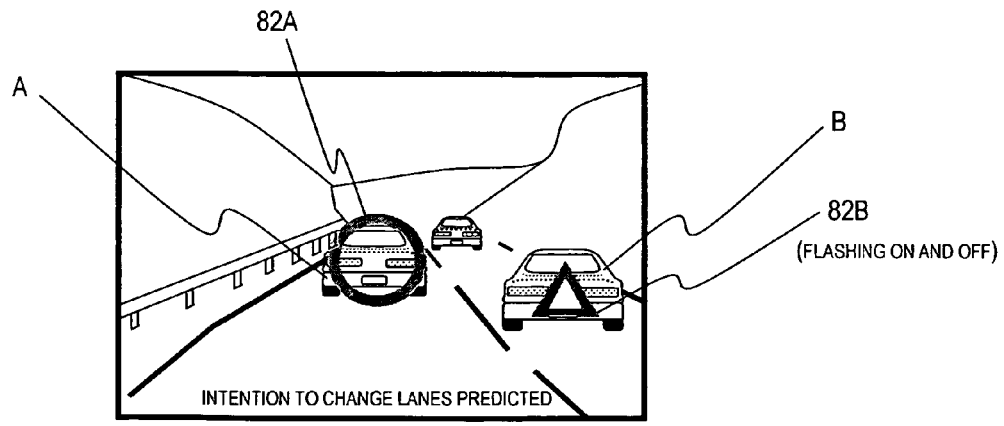
FIG. 36 illustrates an example of what is displayed in accordance with the seventh embodiment of the present invention.

FIG. 36 illustrates an example of how the markers 82 appear on the display device 81. FIG. 36 illustrates an example in which the system estimates that the driver intends to change lanes into the right-hand adjacent lane while the targeted obstacle A exists in front of the host vehicle and a vehicle that could possibly become the targeted vehicle in the future is detected in the right-hand adjacent lane. A circular marker 82A is displayed overlapping the targeted obstacle A.

A triangular marker 82B is displayed over the obstacle B traveling in the right-hand adjacent lane. The marker 82B is displayed in a different color than the marker 82A because both colors are determined in accordance with the risk potentials RP of the corresponding obstacles A and B. The marker 82A is illuminated constantly and the marker 82B is flashed on and off to indicate that the obstacle B could possibly become the targeted obstacle in the future.

The seventh embodiment just described can provide the following operational effects in addition to the effects provided by the fourth to sixth embodiments.

The vehicle driving assist system 3 is configured to detect a plurality of obstacles existing in front of the host vehicle in which the system 2 is installed and indicate the risk potential RP with respect to those detected obstacles that could possibly be the obstacle targeted by the actuation reaction force control in the future. As a result, the driver can be alerted to future targeted obstacles at an earlier stage. Additionally, as shown in FIG. 36, the marker 82B placed over the obstacle that could become the targeted obstacle in the future is displayed in such a fashion that it can be clearly distinguished from the marker 82A placed over the currently targeted obstacle. As a result, the driver can readily recognize which obstacle is currently targeted by the reaction force control and which obstacle could be targeted in the future.

Eighth Embodiment

Figure 37:
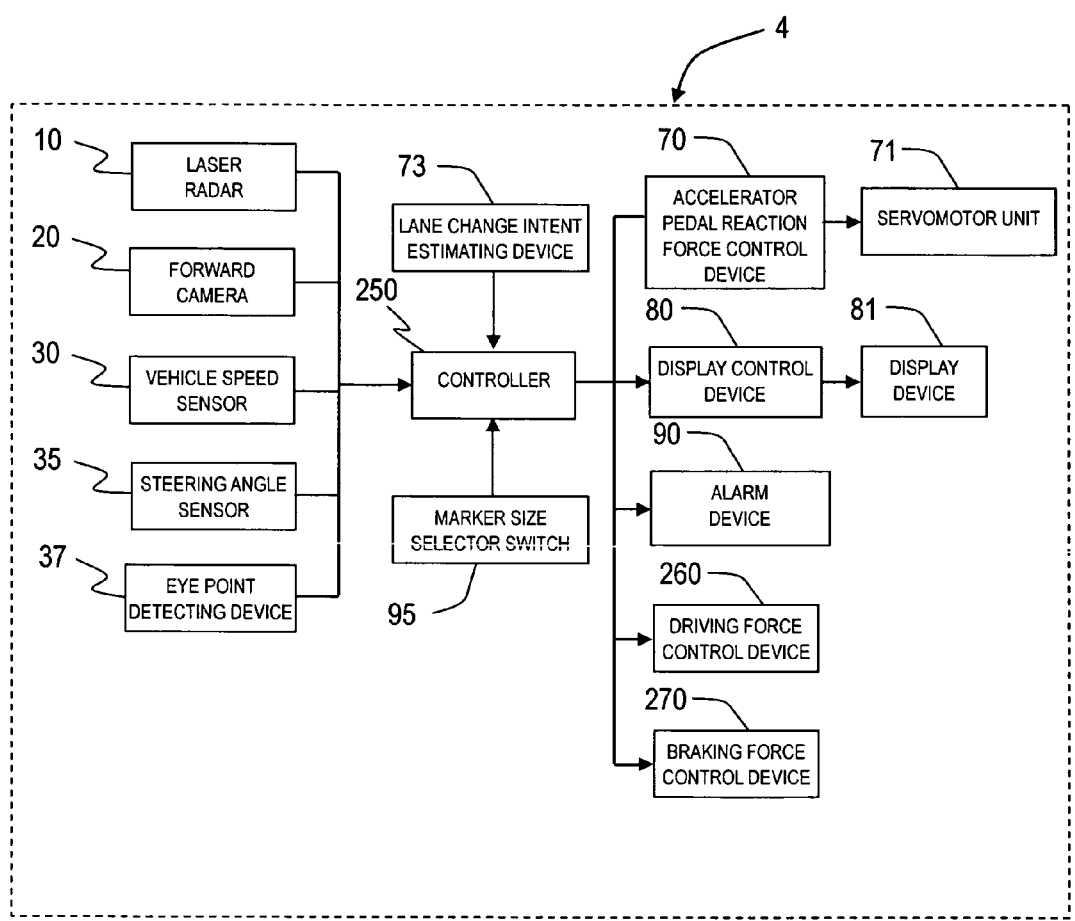
FIG. 37 is a system diagram of a vehicle driving assist system in accordance with an eighth embodiment of the present invention.

A vehicle driving assist system in accordance with an eight embodiment of the present invention will now be explained. FIG. 37 is a system diagram showing the constituent features of a vehicle driving assist system 4 in accordance with the eighth embodiment. In FIG. 37, parts having the same functions as the parts of the fourth embodiment shown in FIG. 20 are indicated with the same reference numerals. The eighth embodiment will be explained chiefly by describing its differences with respect to the fourth embodiment.

As shown in FIG. 37, the vehicle driving assist system 4 is further provided with a driving force control device 260 configured to control a driving force exerted against the vehicle, a braking force control device 270 configured to control a braking force exerted against the vehicle, and an accelerator pedal stroke sensor 73 configured to detect the depression amount (actuation amount) of the accelerator pedal 72.

Figure 38:
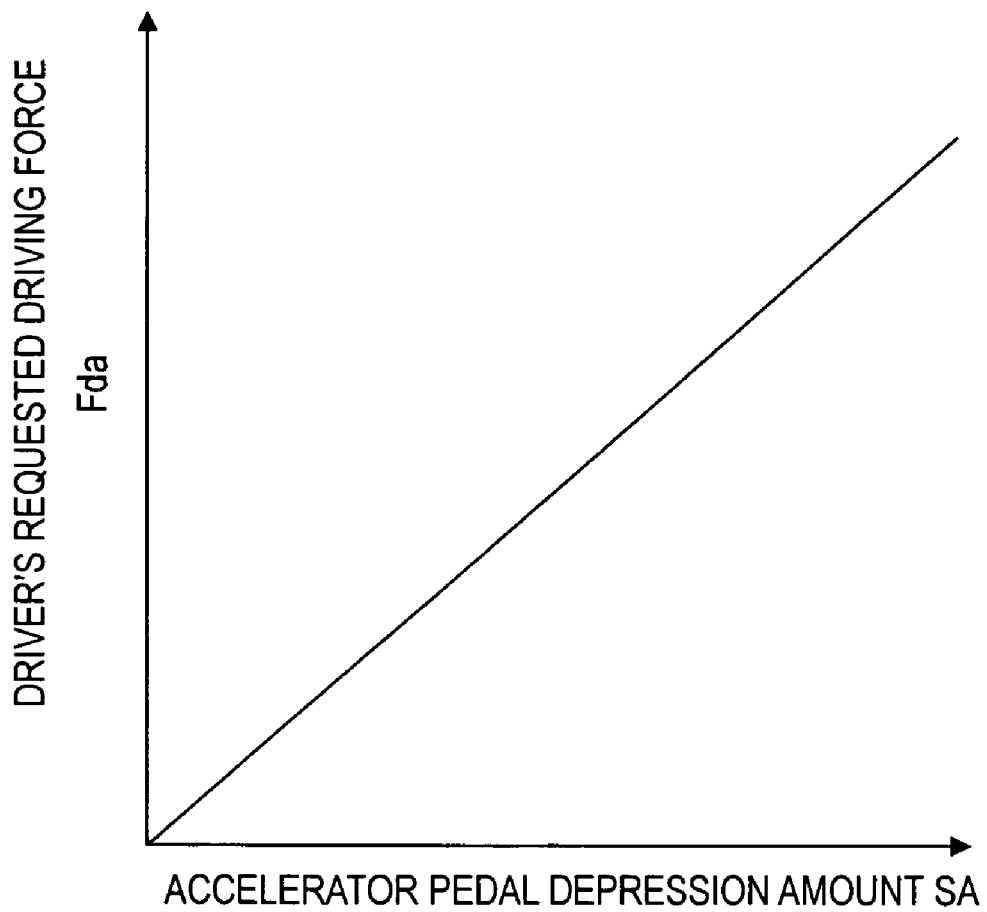
FIG. 38 is a graph that plots the driver's requested driving force versus the accelerator pedal depression amount in accordance with the eighth embodiment of the present invention.

The driving force control device 260 calculates a control command to be sent to the engine and controls the driving force exerted against the vehicle such that the vehicle decelerates at a target deceleration rate received from a controller 250. More specifically, the driving force control device 260 uses a relationship like that shown in FIG. 38 to calculate the driver's requested driving force drv_trq based on the accelerator pedal actuation amount SA. Then, the driving force control device 260 calculates the control command to be sent to the engine by subtracting a value equivalent to the target deceleration rate from the driver's requested driving force drv_trq. Additionally, during following cruise control in which the vehicle is controlled so as to follow a preceding vehicle at a substantially constant following distance, the driving force control device 26 executes acceleration control of the vehicle without regard to the accelerator pedal actuation amount SA in order to achieve a set target time to headway THW.

The driving force control device 270 calculates a brake fluid pressure command and controls the braking force exerted against the vehicle such that the vehicle decelerates at a target deceleration rate received from the controller 250.

Brake devices provided on the wheels of the vehicle operate in accordance with the command issued from the braking force control device 270.

The controller 250 is configured to control the actuation reaction force exerted by the accelerator pedal 72 based on the risk potential RP and convey the risk potential RP to the driver by causing the vehicle to decelerate, thereby alerting the driver (RP conveyance control). The controller 250 is also configured to control the acceleration/deceleration of the vehicle based on a target following time set by the driver such that a substantially constant distance is maintained between the vehicle and a preceding vehicle (following cruise control). When it decelerates the vehicle as part of the RP conveyance control, the controller 250 calculates the target deceleration rate based on the repelling force Fc of an imaginary elastic body 220 provided on the front of the host vehicle as shown in diagrams (a) and (b) of FIG. 23.

Thus, the controller 250 can execute a plurality of different controls that control the deceleration of the vehicle. When a situation occurs in which both RP conveyance control and following cruise control could be executed, the controller 250 gives priority to the following cruise control over the RP conveyance control. In other words, when both could be executed, only the following cruise control is executed. Meanwhile, if the driver depresses the accelerator pedal 72 and overrides the following cruise control while following cruise control is being given priority over RP conveyance control, then the controller 250 shifts to a state of executing RP conveyance control only. In short, the following cruise control is overridden by a driving operation executed by the driver.

Thus, if the accelerator pedal 72 is depressed under conditions in which both RP conveyance control and following cruise control could be executed, the control that is actually executed is switched from the following cruise control to the RP conveyance control. When the system switches from following cruise control to RP conveyance control in this manner, there is a possibility that the deceleration rate imposed on the vehicle will be increase due to the difference between the target deceleration rate set during the following cruise control and the new target deceleration rate set for the RP conveyance control. In such a case, the behavior of the vehicle may deviate greatly from the driver's intent because the driver is depressing the accelerator pedal 72 and attempting to accelerate.

In the eight embodiment, when the following cruise control is overridden and the system shifts to executing RP conveyance control only, the marker 82 indicating the obstacle targeted by the reaction force control is flashed on and off. As a result, the driver is informed that the following cruise control is being overridden.

Figure 39:
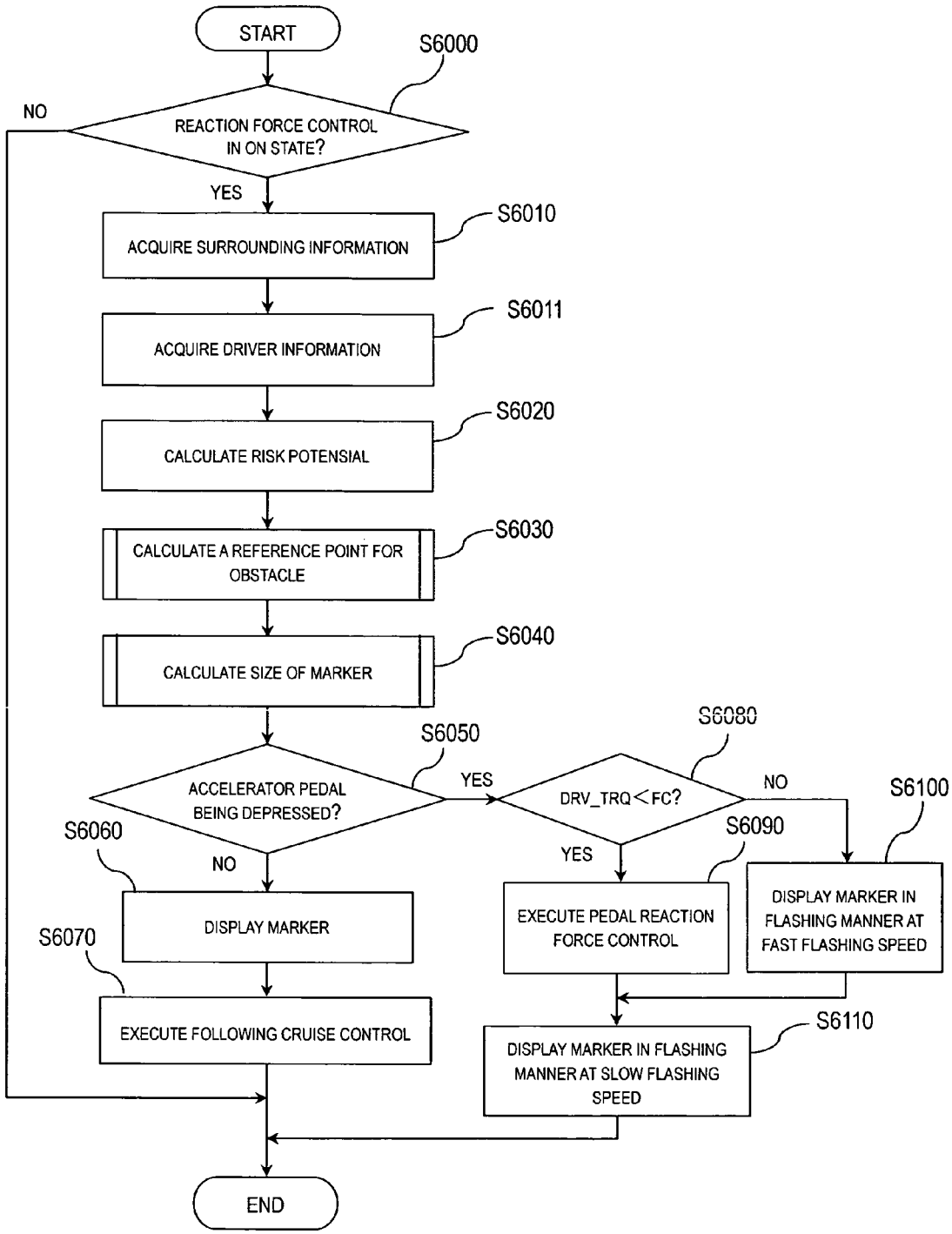
FIG. 39 is a flowchart showing the processing steps executed by a driving assistance control program in accordance with the eighth embodiment of the present invention.

The operation of a vehicle driving assist system 4 in accordance with the eighth embodiment will now be explained in detail with reference to FIG. 39. FIG. 39 is a flowchart showing the processing steps of a driving assistance control program executed by the controller 250. This control loop is executed continuously once per prescribed time period, e.g., every 50 msec. The processing of the steps S6000 to S6040 is the same as in steps S2000 to S2040 of the flowchart shown in FIG. 21 and explanations of these steps are omitted for the sake of brevity.

In step S6050, the controller 250 determines if the accelerator pedal 72 is being depressed. More specifically, the controller 250 determines if the accelerator pedal actuation amount SA detected by the accelerator pedal stroke sensor 73 is larger than 0. If so, the controller 250 determines that the accelerator pedal 72 is being depressed and proceeds to step S6080. The controller 250 also determines that the following cruise control is overridden due to the accelerator pedal 72 being depressed.

If the accelerator pedal actuation amount equals 0, then the controller 250 proceeds to step S6060. In step S6060, the controller 250 displays the marker 82 over the targeted obstacle such that the marker 82 is at the size set in step S6040 and centered on the reference point P2 calculated in step S6030. In step S6070, the controller 250 executes following cruise control by controlling the acceleration/deceleration of the vehicle based on a target following time set by the driver such that a substantially constant distance is maintained between the vehicle and a preceding vehicle.

In step S6080, the controller 250 compares the driver's requested driving force drv_trq corresponding to the accelerator pedal actuation amount SA to a repelling torque or force Fc. The repelling force Fc is calculated using the map of FIG. 25 as the repelling force of an imaginary elastic body 220 provided on the front of the host vehicle as shown in diagrams (a) and (b) of FIG. 23. If drv_trq<Fc, then the repelling force Fc set by the RP conveyance control is larger than the driver's requested driving force drv_trq and the vehicle does not accelerate even though the accelerator pedal 72 is being depressed. If such is the case, the result of step S6080 is positive and the controller 250 proceeds to step S6090.

In step S6060, the controller 250 displays the marker 82 over the targeted obstacle such that the marker 82 is at the size set in step S6040 and centered on the reference point P2 calculated in step S6030. The marker 82 is flashed slowly on and off in order to inform the driver that the following cruise control is being overridden and that the vehicle is not accelerating even though the accelerator pedal 72 is being depressed. The slow flashing is executed such that the marker 82 turns on and off at a low frequency, e.g., 0.8 Hz.

Meanwhile, if drv_trq≧Fc, then the driver's requested driving force drv_trq is larger than the repelling torque Fc set by the RP conveyance control. Therefore, the controller 250 determines that the vehicle is accelerating while RP conveyance control is being executed and proceeds to step S6100. In step S6100, the controller 250 displays the marker 82 over the targeted obstacle such that the marker 82 is at the size set in step S6040 and centered on the reference point P2 calculated in step S6030. The marker 82 is flashed rapidly on and off in order to inform the driver that the following cruise control is being overridden and that the vehicle is accelerating in response to, the accelerator pedal 72 is being depressed. The rapid flashing is executed such that the marker 82 turns on and off at a higher frequency, e.g., 2.0 Hz.

Then, in step S6110, the controller 250 controls the actuation reaction force exerted by (generated in) the accelerator pedal 72 based on the risk potential RP calculated in step S6020. After the command values are sent, the current control loop ends.

Figure 40:
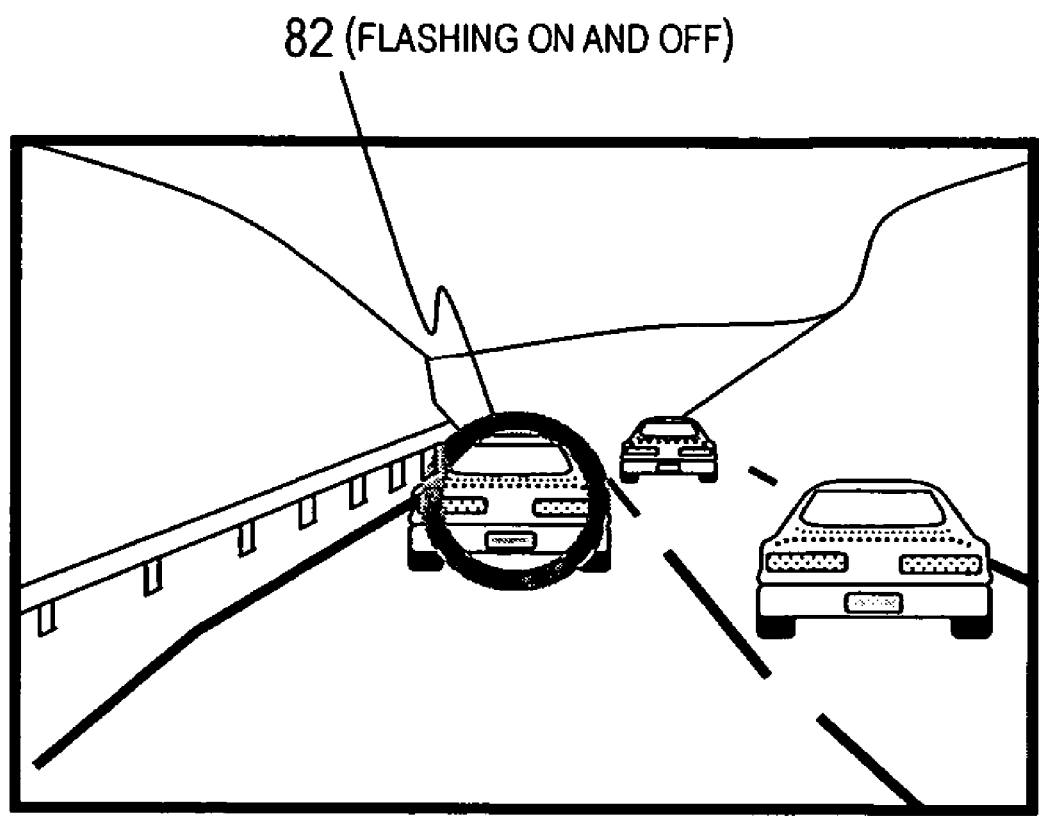
FIG. 40 a display illustrating an example of what is displayed in the eighth embodiment of the present invention.

FIG. 40 illustrates an example of how the markers 82 appear on the display device 81 when the following cruise control is overridden. When the accelerator pedal 72 is depressed and the following cruise control is overridden, the marker 82 overlapping the obstacle targeted by the reaction force control is displayed in a flashing manner. The frequency at which the marker 82 is flashed on and off is determined based on the relationship between the accelerator pedal actuation amount SA and the repelling force Fc at the point in time when the override occurred.

The eighth embodiment just described can provide the following operational effects in addition to the effects provided by the fourth to seventh embodiments.

The vehicle driving assist system 4 is configured to execute an actuation reaction force control in accordance with the risk potential RP, control the braking/driving force exerted against the vehicle based on the risk potential RP (first braking/driving force control section or device), and control the braking/driving force of the vehicle such that a following distance is maintained between the vehicle and the targeted obstacle (second braking/driving force control section). The system 4 is further configured to change the display format of the marker 82 indicating the risk potential RP when it detects that a following cruise control in which the following distance is maintained substantially constant has been overridden due to a driving operation executed by the driver. For example, the marker 82 overlapping the targeted obstacle is displayed in a constantly illuminated fashion when following cruise control is in progress and displayed in a flashing fashion, as shown in FIG. 40, when the following cruise control is overridden. As a result, the driver can be made aware of the execution state of the control executed by the vehicle driving assist system 4.

It is also possible to combine the fourth embodiment with the fifth embodiment. The fifth embodiment is configured to indicate a distribution of risk potentials RP with contour lines as shown in FIG. 28 and it is feasible to add the feature of displaying a marker 82 over the obstacle currently targeted by the reaction force control. The fifth embodiment can also be combined with the sixth or seventh embodiment.

The system can also be configured such that the brightness of the marker 82 is changed in accordance with the risk potential RP or other value when the marker 82 is displayed on the display device 81. The system can also be configured to change either the color or the brightness of the marker 82 in accordance with the risk potential RP or other value.

In the fourth to eighth embodiments, the laser radar 10 and forward camera 20 function as the obstacle detecting section of the system in these embodiments. The controller 100, 150 or 250 functions as the risk potential calculating section of the system in these embodiments. The controller 100 or 150 and the accelerator pedal reaction force control device 70 function as the haptic information conveying section of the system in these embodiments. The controller 100, 150 or 250, the display control device 80, and the display device 81 function as the visual information conveying section of the system in these embodiments. The controller 250, the driving force control device 260, and the braking force control device 270 function as the first braking/driving force control section, the second braking/driving force control section, and the braking/driving force control section of the system in these embodiments. However, the invention is not limited to using these particular sections or devices. For example, instead of the laser radar 10, a milliwave radar of a different format can be used as the obstacle detecting section.

The explanations presented above are merely examples. Thus, while only selected embodiments have been chosen to illustrate the present invention, it will be apparent to those skilled in the art from this disclosure that various changes and modifications can be made herein without departing from the scope of the invention as defined in the appended claims. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle driving assist system comprising:
   an obstacle detecting section configured to detect a preceding obstacle existing in front of a host vehicle and selectively output an obstacle detection result;
   a risk potential calculating section configured to calculate a risk potential indicative of a degree of risk potential of the host vehicle with respect to the preceding obstacle based on the obstacle detection result of the obstacle detecting section;
   a haptic information conveying section configured to convey the risk potential calculated by the risk potential calculating section to a driver as haptic information through a driver-operated driving operation device; and
   a visual information conveying section configured to convey visual information of the preceding obstacle to the driver that is targeted as a targeted obstacle based on the risk potential calculated by the risk potential calculating section, and to convey the degree of the risk potential with respect to the targeted obstacle as calculated by the risk potential calculating section,
   the visual information conveying section being further configured to overlay the targeted obstacle with a risk potential marker indicating the degree of the risk potential as calculated by the risk potential calculating section.

2. The vehicle driving assist system as recited in claim 1, wherein
   the haptic information conveying section includes an actuation reaction force control section that is configured to control an actuation reaction force exerted by the driver-operated driving operation device based on the risk potential calculated by the risk potential calculating section.

3. The vehicle driving assist system as recited in claim 1, wherein
   the visual information conveying section includes a head up display that is configured to display the risk potential marker in an overlapping manner at a position corresponding to the targeted obstacle on the head up display.

4. The vehicle driving assist system as recited in claim 1, further comprising
   an imaging section configured to obtain an image of a region in front of the host vehicle; and
   the visual information conveying section being further configured to display the risk potential marker in an overlapping manner at a position corresponding to the targeted obstacle displayed in the image of the region in front of the host vehicle obtained by the imaging section.

5. The vehicle driving assist system as recited in claim 4, wherein
   the visual information conveying section is further configured to display the image of the region in front of the host vehicle and the risk potential marker on a monitor device of a navigation system.

6. The vehicle driving assist system as recited in claim 1, wherein
   the visual information conveying section is further configured to selectively display a targeted obstacle image of the targeted obstacle as viewed from a rear position, from a side position, and from a top position, and display the risk potential marker such that the risk potential marker overlaps the targeted obstacle image of the targeted obstacle.

7. The vehicle driving assist system as recited in claim 1, wherein
the visual information conveying section is further configured to change a shape of the risk potential marker when the targeted obstacle changes.

8. The vehicle driving assist system as recited in claim 1, wherein
the visual information conveying section is further configured to change a degree of the risk potential marker in accordance with a change in the degree of the risk potential.

9. The vehicle driving assist system as recited in claim 1, wherein
the visual information conveying section is further configured to change a color of the risk potential marker in accordance with a change in the degree of the risk potential.

10. The vehicle driving assist system as recited in claim 1, wherein
the visual information conveying section is further configured to alternately flash the risk potential marker on and off to indicate a change in the degree of the risk potential.

11. The vehicle driving assist system as recited in claim 1, further comprising
a relative traveling state determining section configured to determine a relative traveling state of the host vehicle with respect to the targeted obstacle; and
the visual information conveying section being further configured to change a brightness of the risk potential marker to indicate the degree of the risk potential based on the relative traveling state determined by the relative traveling state determining section.

12. The vehicle driving assist system as recited in claim 1, further comprising
a convergence degree calculating section configured to calculate a degree of convergence between the host vehicle and the targeted obstacle; and
the visual information conveying section being further configured to offset a display position of the risk potential marker depending on the degree of convergence calculated by the convergence degree calculating section.

13. The vehicle driving assist system as recited in claim 12, wherein
the visual information conveying section is further configured to offset the risk potential marker downward relative to the targeted obstacle when the vehicle is approaching the targeted obstacle and offset the risk potential marker upward relative to the targeted obstacle when the vehicle is drawing farther away from the targeted obstacle.

14. A vehicle equipped with the vehicle driving assist system according to claim 1.

15. A vehicle driving assist system comprising:
an obstacle detecting section configured to detect a preceding obstacle existing in front of a host vehicle and selectively output an obstacle detection result;
a risk potential calculating section configured to calculate a risk potential indicative of a degree of risk potential of the host vehicle with respect to the preceding obstacle based on the obstacle detection result of the obstacle detecting section;
a haptic information conveying section configured to convey the risk potential calculated by the risk potential calculating section to a driver as haptic information through a driver-operated driving operation device; and
a visual information conveying section configured to convey visual information of the degree of the risk potential to the driver of the preceding obstacle that is targeted as a targeted obstacle,
the risk potential calculating section being further configured to calculate the risk potential with respect to each of a plurality of preceding obstacles existing in front of the host vehicle,
the visual information conveying section being further configured to display the degree of the risk potential of the host vehicle with respect to each of the preceding obstacles on a displaying section, and to display the degree of the risk potential of the host vehicle with respect to each of the preceding obstacles that has been predicted by the risk potential calculated by the risk potential calculating section as possibly becoming the targeted obstacle at a future time.

16. A vehicle driving assist system comprising:
an obstacle detecting section configured to detect a preceding obstacle existing in front of a host vehicle and selectively output an obstacle detection result;
a risk potential calculating section configured to calculate a risk potential indicative of a degree of risk potential of the host vehicle with respect to the preceding obstacle based on the obstacle detection result of the obstacle detecting section;
a haptic information conveying section configured to convey the risk potential calculated by the risk potential calculating section to a driver as haptic information through a driver-operated driving operation device; and
a visual information conveying section configured to convey visual information of the degree of the risk potential to the driver of the preceding obstacle that is targeted as a targeted obstacle,
the risk potential calculating section being further configured to calculate the risk potential with respect to each of a plurality of preceding obstacles existing in front of the host vehicle,
the visual information conveying section being further configured to display the degree of the risk potential of the host vehicle with respect to each of the preceding obstacles on a displaying section, and to display the risk potential of the host vehicle with respect to each of the preceding obstacles for which the risk potential is equal to or larger than a prescribed value.

17. A vehicle driving assist system comprising:
an obstacle detecting section configured to detect a preceding obstacle existing in front of a host vehicle and selectively output an obstacle detection result;
a risk potential calculating section configured to calculate a risk potential indicative of a degree of risk potential of the host vehicle with respect to the preceding obstacle based on the obstacle detection result of the obstacle detecting section;
a haptic information conveying section configured to convey the risk potential calculated by the risk potential calculating section to a driver as haptic information through a driver-operated driving operation device; and
a visual information conveying section configured to convey visual information of the degree of the risk potential to the driver of the preceding obstacle that is targeted as a targeted obstacle, and to display contour lines as a risk potential marker indicating the degree of the risk potential with respect to the targeted obstacle.

18. A vehicle driving assist system comprising:
an obstacle detecting section configured to detect a preceding obstacle existing in front of a host vehicle and selectively output an obstacle detection result;
a risk potential calculating section configured to calculate a risk potential indicative of a degree of risk potential of the host vehicle with respect to the preceding obstacle based on the obstacle detection result of the obstacle detecting section;
a haptic information conveying section configured to convey the risk potential calculated by the risk potential calculating section to a driver as haptic information through a driver-operated driving operation device; and
a visual information conveying section configured to convey visual information of the degree of the risk potential to the driver of the preceding obstacle that is targeted as a targeted obstacle, and to display a risk potential marker indicating the degree of the risk potential with respect to the targeted obstacle and to change a display format of the risk potential marker when the targeted obstacle changes.

19. A vehicle driving assist system comprising:
an obstacle detecting section configured to detect a preceding obstacle existing in front of a host vehicle and selectively output an obstacle detection result;
a risk potential calculating section configured to calculate a risk potential indicative of a degree of risk potential of the host vehicle with respect to the preceding obstacle based on the obstacle detection result of the obstacle detecting section;
a haptic information conveying section configured to convey the risk potential calculated by the risk potential calculating section to a driver as haptic information through a driver-operated driving operation device; and
a visual information conveying section configured to convey visual information of the degree of the risk potential to the driver of the preceding obstacle that is targeted as a targeted obstacle, and to display a risk potential marker indicating the degree of the risk potential with respect to the targeted obstacle and to change a size of the risk potential marker in accordance with an apparent surface area of the targeted obstacle, which changes as a following distance between the host vehicle and the targeted obstacle changes.

20. A vehicle driving assist system comprising:
an obstacle detecting section configured to detect a preceding obstacle existing in front of a host vehicle and selectively output an obstacle detection result;
a risk potential calculating section configured to calculate a risk potential indicative of a degree of risk potential of the host vehicle with respect to the preceding obstacle based on the obstacle detection result of the obstacle detecting section;
a haptic information conveying section configured to convey the risk potential calculated by the risk potential calculating section to a driver as haptic information through a driver-operated driving operation device; and
a visual information conveying section configured to convey visual information of the degree of the risk potential to the driver of the preceding obstacle that is targeted as a targeted obstacle, and to display a risk potential marker indicating the degree of the risk potential and to change a size of the risk potential marker in accordance with a following distance between the host vehicle and the targeted obstacle changes.

21. A vehicle driving assist system comprising:
an obstacle detecting section configured to detect a preceding obstacle existing in front of a host vehicle and selectively output an obstacle detection result;
a risk potential calculating section configured to calculate a risk potential indicative of a degree of risk potential of the host vehicle with respect to the preceding obstacle based on the obstacle detection result of the obstacle detecting section;
a haptic information conveying section configured to convey the risk potential calculated by the risk potential calculating section to a driver as haptic information through a driver-operated driving operation device;
a visual information conveying section configured to convey visual information of the degree of the risk potential to the driver of the preceding obstacle that is targeted as a targeted obstacle;
a first braking/driving force control section configured to control a braking/driving force exerted against the host vehicle based on the risk potential calculated by the risk potential calculating section;
a second braking/driving force control section configured to control the braking/driving force of the host vehicle such that a prescribed following distance is maintained between the vehicle and the targeted obstacle; and
an override detecting section configured to detect if operation of the second braking/driving force control section is in an overridden state based on a state of a driving operation executed by the driver,
the visual information conveying section being further configured to display a risk potential marker indicating the degree of the risk potential and to change a display format of the risk potential marker when the override detecting section detects that the second braking/driving force control section is in the overridden state.

22. A vehicle driving assist system comprising:
an obstacle detecting section configured to detect a preceding obstacle existing in front of a host vehicle and selectively output an obstacle detection result;
a risk potential calculating section configured to calculate a risk potential indicative of a degree of risk potential of the host vehicle with respect to the preceding obstacle based on the obstacle detection result of the obstacle detecting section;
a haptic information conveying section configured to convey the risk potential calculated by the risk potential calculating section to a driver as haptic information through a driver-operated driving operation device;
a visual information conveying section configured to convey visual information of the degree of the risk potential to the driver of the preceding obstacle that is targeted as a targeted obstacle; and
a braking/driving force control section configured to control a braking/driving force exerted against the host vehicle based on the risk potential calculated by the risk potential calculating section,
the visual information conveying section further including a display section that is configured to display a risk potential marker indicating the risk potential with the visual information conveying section being further configured to change a size of the risk potential marker in accordance with a control amount used by the braking/driving force control section to control the braking/driving force exerted against the host vehicle.

* * * * *